United States Patent
Nakayoshi et al.

(10) Patent No.: US 7,274,415 B2
(45) Date of Patent: Sep. 25, 2007

(54) DISPLAY DEVICE

(75) Inventors: Yoshiaki Nakayoshi, Ooamishirasato (JP); Kazuhiko Yanagawa, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 0 days.

(21) Appl. No.: 10/840,259

(22) Filed: May 7, 2004

(65) Prior Publication Data

US 2004/0223093 A1 Nov. 11, 2004

(30) Foreign Application Priority Data

May 9, 2003 (JP) .............................. 2003-132183

(51) Int. Cl.
*G02F 1/1335* (2006.01)

(52) U.S. Cl. ....................................... 349/65; 349/114

(58) Field of Classification Search ................ 349/114, 349/96, 106, 65
See application file for complete search history.

(56) References Cited

U.S. PATENT DOCUMENTS

| | | | |
|---|---|---|---|
| 6,172,724 B1 * | 1/2001 | Kato | 349/96 |
| 6,195,140 B1 * | 2/2001 | Kubo et al. | 349/44 |
| 6,501,521 B2 * | 12/2002 | Matsushita et al. | 349/106 |
| 6,611,304 B2 * | 8/2003 | Itoh et al. | 349/65 |
| 6,665,034 B2 * | 12/2003 | Suzuki | 349/129 |
| 2004/0046907 A1 * | 3/2004 | Ham et al. | 349/96 |

FOREIGN PATENT DOCUMENTS

| | | |
|---|---|---|
| JP | 2000-350805 | 12/2000 |
| JP | 2002-360842 | 12/2002 |

* cited by examiner

*Primary Examiner*—Toan Ton
(74) *Attorney, Agent, or Firm*—Antonelli, Terry, Stout & Kraus, LLP.

(57) ABSTRACT

In a game machine in which a display device is arranged at a portion of a surface in which nails are driven, the nails are driven also in the display device.

8 Claims, 37 Drawing Sheets

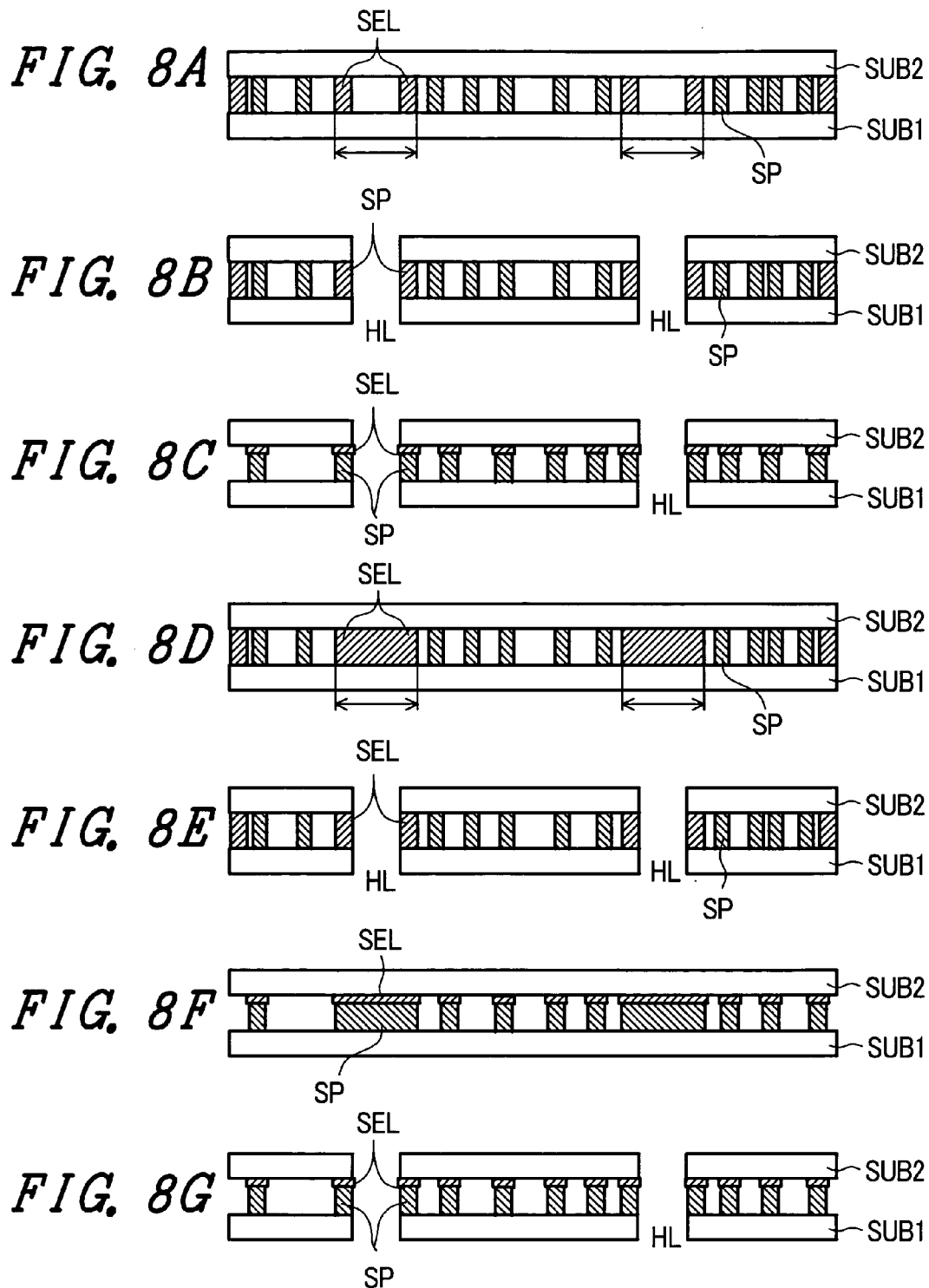

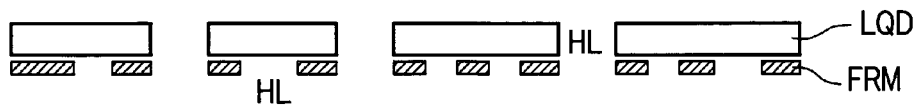
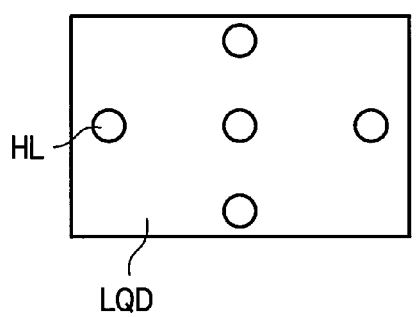
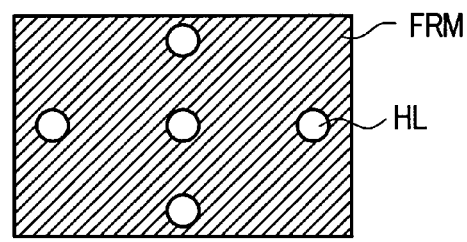
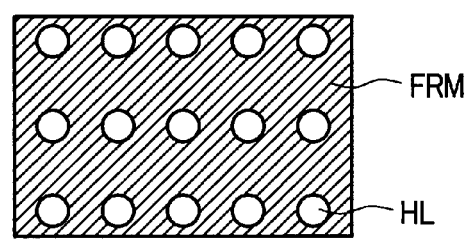

FIG. 31A  FIG. 31B  FIG. 31C
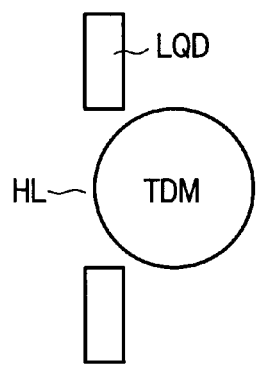
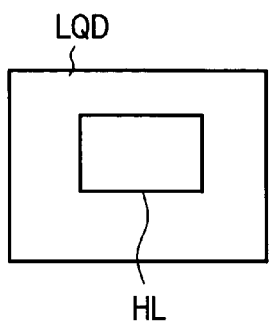
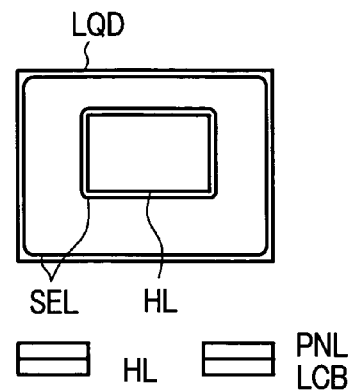
FIG. 31D  FIG. 31E  FIG. 31F
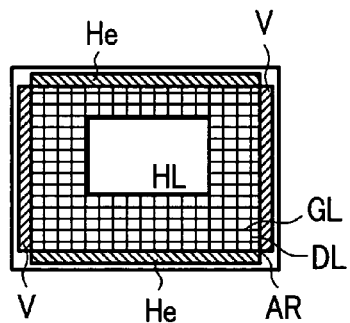
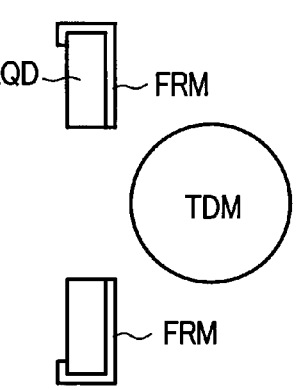
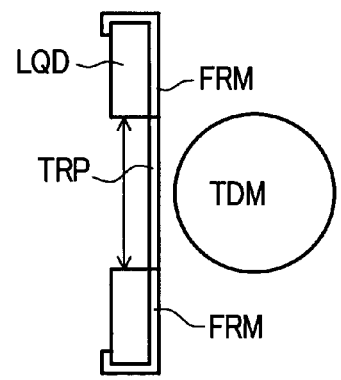

*FIG. 36A*     *FIG. 36B*     *FIG. 36C*
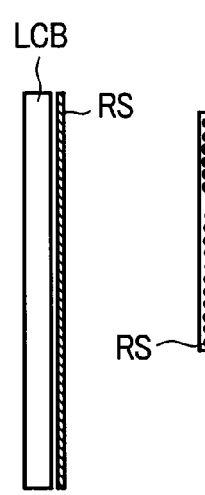
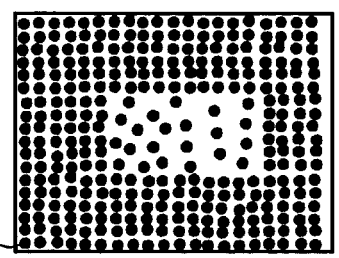
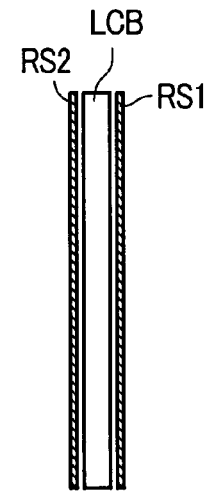
*FIG. 36D*     *FIG. 36E*
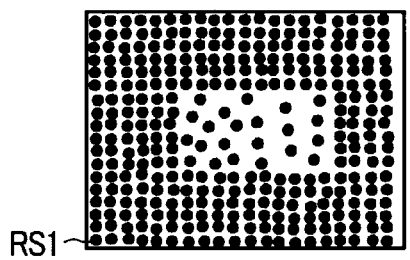
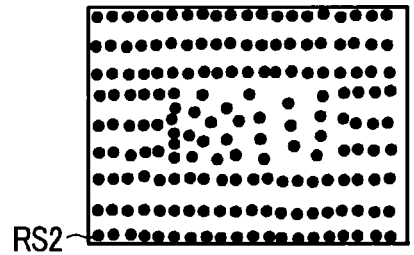
*FIG. 36F*     *FIG. 36G*
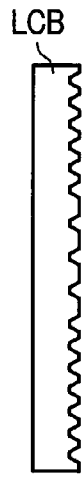

DISPLAY DEVICE

BACKGROUND OF THE INVENTION

The present invention relates to a display device and a game machine.

A pachinko game machine is a game machine in which, on a surface of a plate member, which is substantially arranged vertically, pachinko balls, which are hit by a player, are scattered on the plate member and fall though among a large number of nails driven in the plate member, and, in the course of movement, some pachinko balls enter lucky holes.

Recently, there has been a pachinko game machine in which a display device, such as a liquid crystal display device or the like, for example, is arranged at a center portion of the surface of the plate member on which the pachinko balls move, and a still image or a moving image is visualized by the display device thus attracting the interest of players.

Further, a slot-machine-type game machine is configured such that three rotary drums carried on rotary shafts aligned in the horizontal direction are provided at the center of a surface thereof which faces a player in an opposed manner; these rotary drums are rotated by pushing a start button; and, thereafter, these rotary drums are sequentially stopped by pushing stop buttons corresponding to the respective rotary drums.

Then, when symbols or patterns which are described on the outer surfaces of the respective rotary drums are, for example, aligned and stopped, the player gets a lucky chance and can acquire a large number of coins.

Recently, there has been also a slot-machine-type game machine in which a display device, such as a liquid crystal display device, for example, is arranged above the rotary drums and a still image or a moving image is visualized on the display device, thus attracting the interest of players.

SUMMARY OF THE INVENTION

However, the above-mentioned pachinko game machine is configured such that the pachinko balls can not pass through portions on which the display devices are arranged. In other words, the pachinko game machine is configured such that the nails are driven in regions except for the portions where the display devices are arranged and the pachinko balls can move while avoiding the display devices.

Accordingly, the range in which the pachinko balls can move is narrowed by the display devices; and, hence, the moving paths of the pachinko balls become monotonous, thus giving rise to a drawback that the enhancement of the interest of the players is impeded. This drawback becomes more apparent when the display device is of a large size.

In other words, there has been a drawback in that, when an attempt is made to make the moving paths of the pachinko balls complicated, it is inevitable that the screen of the display device will need to be reduced, and, hence, the enhancement of the interest of the players on the image display screen is limited. On the other hand, when an attempt is made to make the screen of the display device large in size, the moving paths of the pachinko balls inevitably become monotonous, and, hence, the enhancement of the interest of the players on a surface on which the player traces the movement of the pachinko balls is limited.

The present invention has been made under such circumstances in one aspect, wherein one advantage which can be realized by the present invention is to provide a pachinko game machine which can produce further enhancement of the interest of players. Further, as one application of the present invention, the present invention provides a display device suitable for the game machine.

A summary of representative Examples of the invention disclosed in this specification is as follows.

(1-1)
The pachinko game machine according to the present invention, for example, has a display device arranged at a portion on a surface in which nails are driven, wherein the nails are also driven in the display device.

(1-2)
The pachinko game machine according to the present invention is, for example, characterized in that a surface in which nails are driven constitutes a display screen of a display device.

(1-3)
The pachinko game machine according to the present invention is, for example, on the premise of the constitution (1-1) or the constitution (1-2), characterized in that the nails driven in the display device are arranged through holes formed in the display screen of the display device in a penetrating manner.

(1-4)
The pachinko game machine according to the present invention is, for example, a game machine in which a display device is arranged at a portion of a surface in which nails are driven, wherein holes are formed in at least a portion of a display screen of the display device.

(1-5)
The pachinko game machine according to the present invention is, for example, on the premise of the constitution (1-2), characterized in that the holes are formed in some portions of the display screen of the display device.

(1-6)
A display device according to the present invention is, for example, characterized in that, of the substrates which are arranged to face each other in an opposed manner with liquid crystal disposed therebetween, both the pixel electrodes and the counter electrodes are formed on a liquid-crystal-side surface of one substrate, and the liquid crystal display device includes holes formed in a display region.

(1-7)
A display device according to the present invention is, for example, characterized in that holes are formed in a display region of substrates which face each other in an opposed manner, and support columns which are formed on one substrate are provided as spacers.

(1-8)
The display device according to the present invention is, for example, on the premise of the constitution (1-7), characterized in that the spacers are more densely arranged in the periphery of a portion where the holes are formed than in other regions.

(1-9)
The display device according to the present invention is, for example, on the premise of the constitution (1-7), characterized in that the spacers are arranged to surround portions where the holes are formed.

(1-10)
The display device according to the present invention is, for example, on the premise of the constitution (1-9), characterized in that a sealing material is applied to side wall surfaces of the holes to cover the spacers.

(1-11)

The display device according to the present invention is, for example, on the premise of the constitution (1-9), characterized in that, with respect to the spacers which surround the portions where the holes are formed, a sealing material is interposed between a head portion and a substrate of each spacer.

(1-12)

The display device according to the present invention is, for example, on the premise of the constitution (1-9), characterized in that the spacers, which are formed in a state that the spacers surround portions where the holes are formed, are configured such that the holes are formed at substantially the center of a sealing material forming region which is formed between respective substrates.

(1-13)

A display device according to the present invention is, for example, characterized in that holes are formed in a display region of substrates which face each other in an opposed manner, a resin film which is formed on a liquid-crystal-side surface of at least one of the substrates is formed such that the resin film extends to side surfaces of the holes, and sealing materials are formed in the peripheries of the holes.

(1-14)

A display device according to the present invention is, for example, characterized in that a resilient plate or a resilient sheet is arranged over a display screen of the display device, and projecting portions are formed on a display-screen-side surface of the resilient plate or the resilient sheet.

(1-15)

A display device according to the present invention is, for example, characterized in that holes are formed in a display region of substrates which face each other in an opposed manner, a frame FRM is formed on a back surface of the substrate, and the frame FRM includes holes formed at positions corresponding to the holes formed in the display region and other holes which are formed in positions different from the holes formed at the corresponding positions.

(1-16)

A pachinko game machine according to the present invention, for example, has a surface in which nails are driven which constitutes a display screen of a display device, wherein the display device includes a frame FRM as one constitutional member thereof, and besides holes in which the nails are driven, other holes are formed in the frame FRM.

(1-17)

The display device according to the present invention is, for example, on the premise of the constitution (1-15), characterized in that the display device includes a light guide plate on which a light source LT is arranged on a side wall surface thereof as one constitutional member, and the light guide plate has holes which have the center axes thereof substantially aligned with the holes formed in the frame FRM.

(1-18)

A pachinko game machine according to the present invention is, for example, a game machine in which a display device is arranged in a portion of a surface in which nails are driven, wherein nails are also driven in the display device, the display device includes a light guide plate on which a light source is arranged on a side wall surface thereof as one constitutional member, and the nails are supported on the light guide plate.

(1-19)

A pachinko game machine according to the present invention, for example, having a surface in which nails are driven which constitutes a display screen of a display device, wherein the display device includes a light guide plate on which a light source LT is arranged at a side wall surface thereof as one constitutional member and the nails are supported on the light guide plate.

(1-20)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in the one direction are formed on either one of the substrates, signals are supplied to each gate signal line from both ends thereof and signals are supplied to each drain signal line from both sides thereof, and the holes are arranged such that one hole or less is allocated to each signal line.

(1-21)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in one direction are formed on either one of the substrates, scanning signal drive circuits are arranged at both sides of the respective gate signal lines, video signal drive circuits are arranged at both sides of the respective drain signal lines, and, within a display screen, another scanning signal drive circuit which is arranged in parallel to the scanning signal drive circuits and another video signal drive circuit which is arranged in parallel to the video signal drive circuits are provided, and in four regions which are surrounded by respective circuits, the holes are arranged such that one hole or less is allocated to each signal line.

(1-22)

The display device according to the present invention is, for example, on the premise of the constitution (1-21), characterized in that at least one of the other scanning signal drive circuit and other video signal drive circuit is divided into a plurality of signal drive circuits, and the respective divided signal drive circuits are arranged in a direction orthogonal to the longitudinal direction in a displaced manner.

(1-23)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in the one direction are formed on either one of the substrates, scanning signal drive circuits are respectively provided at both sides of the respective gate signal lines, video signal drive circuits are respectively provided at both sides of the respective drain signal lines, and around the holes, another scanning signal drive circuit and another video signal drive circuit are provided such that the drive circuits surround the holes.

(1-24)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in the one direction are formed on either one of the substrates, scanning signal drive circuits which are connected with the gate signal lines and the video signal drive circuits which are connected with the drain signal lines are provided to some or all crossing portions of the gate signal lines and the drain signal lines, and the display device includes a timing driver, wherein driving orders of the scanning signal drive circuits and video signal drive circuits are controlled by the timing driver, and holes are formed in some or all of portions where the scanning signal drive circuits and video signal drive circuits are formed.

(1-25)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in the one direction are formed on either one of the substrates, scanning signal drive circuits which are connected with the gate signal lines and the video signal drive circuits which are connected with the drain signal lines are provided to some or all crossing portions of the gate signal lines and the drain signal lines, and the display device includes a controller, wherein one data which is supplied by the controller is stored and used by the scanning signal drive circuit and the video signal drive circuit corresponding to the data, another data which comes next is transferred to another scanning signal drive circuit and video signal drive circuit by way of the scanning signal drive circuit and video signal drive circuit, holes are formed in some or all portions where the scanning signal drive circuits and video signal drive circuits are formed.

(1-26)

The display device according to the present invention is, for example, on the premise of the constitution (1-25), characterized in that the controller inputs gate control signals supplied from the controller to the scanning signal drive circuits from at least one-end side of the drain signal lines through the signal lines and also inputs drain control signals supplied from the controller to the video signal drive circuits from at least one end of the gate signal lines through the signal lines.

(1-27)

A display device according to the present invention is, for example, characterized in that a plurality of holes are formed in a display region of substrates which face each other in an opposed manner, gate signal lines which extend in one direction and are arranged in parallel in another direction and drain signal lines which extend in another direction and are arranged in parallel in the one direction are formed on either one of the substrates, and the display device includes scanning signal drive circuits and video signal drive circuits which are formed in portions of the display region where the holes are not formed.

(1-28)

A display device according to the present invention is, for example, characterized in that a plurality of holes are formed in a display region of substrates which are arranged to face each other in an opposed manner, regions where holes are not formed are provided in some portions of the display screen of the display region, and the region where the holes are not formed exhibits a higher resolution than the region where the holes are formed.

(1-29)

The display device according to the present invention is, for example, on the premise of the constitution (1-28), characterized in that at a portion which defines a high resolution region and another region or a portion in the vicinity of the portion, a signal drive circuit for high-resolution display is formed.

(1-30)

The display device according to the present invention is, for example, on the premise of the constitution (1-28), characterized in that at a portion which defines a high resolution region and another region or in the vicinity of the portion, a signal drive circuit is formed, and the signal drive circuit is configured to supply signals to other regions besides the region where the high resolution display is performed.

(1-31)

The pachinko game machine according to the present invention is, for example, on the premise of the constitution of either one of constitutions (1-29 and 1-30), characterized in that an ornamental member is arranged over a display surface such that the ornamental member covers a portion where the signal drive circuit is formed.

(1-32)

The display device according to the present invention is, for example, on the premise of the constitution (1-29), characterized in that gate signal lines which extend in one direction and are arranged in parallel in another direction and drain signal lines which extend in another direction and are arranged in parallel in the one direction are formed on either one of the substrates which are arranged to face each other in an opposed manner, at a portion which defines the region where a high resolution display is performed and another region or a portion in the vicinity of the portion, scanning signal drive circuits for high resolution are respectively provided at both ends of the gate signal lines and video signal drive circuits for high resolution are respectively provided at both ends of the drain signal lines, and in the respective scanning signal drive circuits and in the respective video signal drive circuits, wirings are formed which are connected to each other at the portion which defines the region where the high resolution display is performed and another region and in the vicinity of the portion, and signals are supplied through the wirings.

(1-33)

A pachinko game machine according to the present invention, for example, includes a display device, wherein nails are driven in the display device and a surface in which the nails are driven constitutes a display screen of the display device, wherein a large transparent plate having an area larger than an area of the display device is arranged on a player-side surface of the display device.

(1-34)

The pachinko game machine according to the present invention is, for example, on the premise of the constitution (1-33), characterized in that portions of the transparent plate on other regions except for the display region of the display device are colored.

(1-35)
The pachinko game machine according to the present invention is, for example, on the premise of the constitution of either one of constitutions (1-33) and (1-34), characterized in that the display device and the transparent substrate are integrally formed by a frame which is provided at the display device side.

(1-36)
The pachinko game machine according to the present invention is, for example, on the premise of the constitution (1-33), characterized in that the display device includes at least a light guide plate which has a light source LT on a side wall surface and a frame FRM for forming the display device into a module, and the frame FRM is connected with another frame FRM which covers the display-surface side surface of the transparent plate using a fixing member.

(1-37)
A pachinko game machine according to the present invention is, for example, a game machine which includes a display device, wherein the display device is constituted of a first display device which is arranged at a player side and is provided with holes at some portions thereof and a second display device which is arranged at a back surface side of the first display device, has the periphery thereof overlapped to the periphery of the holes of the first display device, and has an area which is smaller than the area of the first display device, an ornamental member is arranged in the peripheries of the holes of the first display device, and an extension portion thereof is fixed to a surface of the second liquid crystal display device in a state such that the extension portion is brought into contact with side wall surfaces of the holes.

(1-38)
A display device according to the present invention, for example, has at least a display panel which is formed into a module by a frame, wherein alignment marks which are formed in the display panel can be observed with the naked eye through holes formed in the frame.

(1-39)
A pachinko game machine according to the present invention includes a display device having the constitution (1-38), wherein the display device includes a display panel in which nails are driven in a display screen.

(1-40)
A display device according to the present invention is, for example, characterized by having a region of low resolution and a region of high resolution in a display region.

(1-41)
The display device according to the present invention is, for example, on the premise of the constitution (1-40), characterized in that a signal drive circuit for high resolution display is formed at a portion which defines the region of high resolution and the region of low resolution or in the vicinity of the portion.

(1-42)
The display device according to the present invention is, for example, on the premise of the constitution (1-41), characterized in that a signal drive circuit is formed at a portion which defines the region for high resolution and region for low resolution or a portion in the vicinity of the portion, and the signal drive circuit supplies signals to both the region for high resolution and the region for low resolution.

(1-43)
The game machine according to the present invention includes, for example, either one of the display devices (141) and (142), wherein an ornamental member is arranged on a display screen such that the ornamental member covers the portion where the signal drive circuit is formed.

(1-44)
A display device according to the present invention is, for example, characterized in that gate signal lines which extend in one direction and are arranged in parallel in another direction and drain signal lines which extend in another direction and are arranged in parallel in the one direction are formed on either one of a pair of substrates which are arranged to face each other in an opposed manner, at a portion which defines a region where a high resolution display is produced and another region or a portion in the vicinity of the portion, scanning signal drive circuits for high resolution are respectively provided at both ends of the gate signal lines and video signal drive circuits for high resolution are respectively provided at both ends of the drain signal lines, and in the respective scanning signal drive circuits and in the respective video signal drive circuits, wirings are formed which are connected to each other at the portion which defines the region where the high resolution display is produced and other region or a portion in the vicinity of the portion, and signals are supplied through the wirings.

(1-45)
A game machine according to the present invention is, for example, characterized by including any one of the display devices (1-6, 1-7, 1-8, 1-9, 1-10, 1-11, 1-12, 1-13, 1-14, 1-15, 1-17, 1-20, 1-21, 1-22, 1-23, 1-24, 1-25, 1-26, 1-27, 1-28, 1-29, 1-30, 1-38, 1-40, 1-41, 1-42, 1-43, 1-44).

(1-46)
The game machine according to the present invention is, for example, on the premise of the constitution (1-46), characterized in that the game machine is a pachinko game machine.

(1-47)
A game machine according to the present invention is, for example, characterized by including any one of the display devices (1-6, 1-7, 1-8, 1-9, 1-10, 1-11, 1-12, 1-13, 1-14, 1-15, 1-17, 1-20, 1-21, 1-22, 1-23, 1-24, 1-25, 1-26, 1-27, 1-28, 1-29, 1-30) and nails are provided to hole portions of the display device.

Here, the present invention is not limited to the above-described constitutions and various modifications can be made without departing from the technical concept of the present invention.

Further, in this specification, the following Examples are also included. That is, the following representative examples are further disclosed in this specification.

That is, a slot-machine-type game machine includes three rotary drums whose rotary shafts are aligned in the horizontal direction at a center of a surface thereof which faces a player, wherein when the player pushes a start button, these rotary drums are rotated and, thereafter, when the player pushes stop buttons corresponding to the respective rotary drums, the rotary drums are sequentially stopped.

Then, when symbols or patterns which are presented on the outer surfaces of the respective rotary drums are, for example, aligned and stopped, the player gets a lucky chance and can acquire a large number of coins.

Recently, a slot-machine-type game machine has been known in which a display device, such as a liquid crystal display device, for example, is arranged above the rotary drums and a still image or a moving image is visualized on the display device, thus inducing the interest of players.

However, in the slot-machine-type game machine having such a constitution, since the display device is arranged at a position relatively remote from the rotary drums, when the player plays a game while focusing his eyes on the rotary drums, his conscience or attention is not directed to the display on the display device, and, hence, there has been a drawback in that it is difficult for the display device to make the player have a feeling of integrity between the rotary drums and the display device.

Further, there has been also a drawback in that the rotary drums which the player observes through the display device become dark.

The present invention has been made under such circumstances, and it is an object of the present invention to provide a slot machine which can make a player have feeling of integrity between rotary drums and a display device, thus enhancing the interest of the player. As another application of the present invention, the present invention also provides a display device suitable for in a slot machine.

(2-1)
The display device according to the present invention is, for example, characterized in that the display device is a display device having a high-transmissivity region in a display region.

(2-2)
The display device according to the present invention is, for example, on the premise of the constitution (2-1), characterized in that the display device includes a pair of substrates which are arranged to face each other in an opposed manner with liquid crystal therebetween, polarizers are formed on surfaces of respective substrates opposite to the liquid crystal, and a polarization layer of at least one of the polarizers at a portion corresponding to the high transmissivity region is cut out.

(2-3) The display device according to the present invention is, for example, on the premise of the constitution (2-1), characterized in that the display device includes a pair of substrates which are arranged to face each other in an opposed manner with liquid crystal disposed therebetween, polarizers are formed on surfaces of the respective substrates opposite to the liquid crystal, color filters are formed on a liquid-crystal-side surface of one of the respective substrates, and a polarization layer of at least one of the polarizers and the color filters at a portion corresponding to the high transmissivity region are cut out.

(2-4)
The display device according to the present invention is, for example, on the premise of the constitution (2-1), characterized in that the display device is constituted of a liquid crystal display panel which forms an envelope using respective substrates which are arranged to face each other in an opposed manner with liquid crystal disposed therebetween, and pixels are not formed in a portion corresponding to the high transmissivity region.

(2-5)
The display device according to the present invention is, for example, on the premise of the constitution (2-1), characterized in that the display device includes a pair of substrates which are arranged to face each other in an opposed manner with liquid crystal disposed therebetween, polarizers are formed on surfaces of respective substrates opposite to the liquid crystal, color filters are formed on a liquid-crystal-side surface of one of the respective substrates, and the color filters at a portion corresponding to the high transmissivity region are cut out.

(2-6)
The display device according to the present invention is, for example, on the premise of the constitution (2-1), characterized in that the display device includes a pair of substrates which are arranged to face each other in an opposed manner with liquid crystal disposed therebetween, polarizers are formed on surfaces of respective substrates opposite to the liquid crystal, color filters are formed on a liquid-crystal-side surface of one substrate out of the respective substrates, and the color filters at a portion corresponding to the high transmissivity region are formed to have the film thickness smaller than a film thickness of the color filters in other regions.

(2-7)
The display device according to the present invention is, for example, on the premise of the constitution (2-1), characterized in that in the high transmissivity region, the size of the pixels is set to be larger than the size of the pixels in display regions other than the high transmissivity region.

(2-8)
The display device according to the present invention is, for example, on the premise of the constitution (2-7), characterized in that signal lines for pixels in the high transmissivity region are used in common with signal lines for pixels in regions other than high transmissivity region.

(2-9)
The display device according to the present invention is, for example, on the premise of the constitution (2-8), characterized in that the signal lines for pixels in the high transmissivity region have bent portions between the signal lines and the common signal lines in the regions other than the high transmissivity region such that the signal lines for pixels in the high transmissivity region are respectively positioned at one side of the pixels.

(2-10)
The display device according to the present invention is, for example, on the premise of the constitution (2-1), characterized in that the display device includes a pair of substrates which are arranged to face each other in an opposed manner with liquid crystal disposed therebetween, polarizers are formed on surfaces of respective substrates opposite to the liquid crystal, and at least one of the polarizers at a portion corresponding to the high transmissivity region has a number of layers which is smaller than the number of layers of the polarizer in the other region.

(2-11)
The display device according to the present invention is, for example, on the premise of the constitution (2-1), characterized in that the display device includes a pair of substrates which are arranged to face each other in an opposed manner with liquid crystal disposed therebetween, polarizers are formed on surfaces of respective substrates opposite to the liquid crystal, and the polarizers have UV light shielding layers which absorb an ultraviolet ray region and allow a visible light region to pass therethrough in a region which corresponds to the high transmissivity region.

(2-12)

The display device according to the present invention is, for example, on the premise of the constitution (2-11), characterized in that polarization layers of at least one of the polarizers at the portion corresponding to the high transmissivity region is cut out.

(2-13)

The display device according to the present invention is, for example, on the premise of any one of the constitutions (2-10), (2-11) and (2-12), characterized in that the display device includes color filters on the liquid-crystal-side surface of one substrate of the pair of substrates, and the film thickness of the color filters is reduced in the high transmissivity region.

(2-14)

The display device according to the present invention is, for example, on the premise of any one of the constitutions (2-10), (2-11) and (2-12), characterized in that the display device includes color filters on the liquid-crystal-side surface of one substrate of the pair of substrates, and the color filters are cut out in the high transmissivity region.

(2-15)

The display device according to the present invention is, for example, on the premise of the constitution (2-7), characterized in that at least one of the longitudinal size and the lateral size of the pixels of the high transmissivity region is set to a value which 3n times (n being an integer) larger than a corresponding size of the pixels in display regions other than the high transmissivity region.

(2-16)

The display device according to the present invention is, for example, on the premise of the constitution (2-15), characterized in that the longitudinal size and the lateral size of the pixels of the high transmissivity region are set to values which are 3n times (n being an integer) larger than the corresponding sizes of the pixels in display regions other than the high transmissivity region.

(2-17)

The display device according to the present invention is, for example, characterized in that in a display device which includes a display panel and a light source, the display device includes a light source for irradiating light to a display panel and a light source for irradiating light to a back surface side of the display device.

(2-18)

The display device according to the present invention is, for example, characterized in that the display device includes a light guide plate which has a light source on a side wall surface thereof as one constitutional member, and light is irradiated from the light guide plate to both a display panel side and a back surface side.

(2-19)

The display device according to the present invention is, for example, characterized in that in a display device which includes a display panel and a light guide plate having a light source on a side wall surface thereof, a reflection sheet or a reflection surface is formed on a back surface of the light guide plate, and the reflectance of the reflection sheet or the reflection surface is set lower than the reflectance of a portion of a display region which constitutes a portion other than the reflection sheet or the reflection surface.

(2-20)

The display device according to the present invention is, for example, on the premise of the constitution (2-19), characterized in that the portion of the display region is a center portion of the display region.

(2-21)

The display device according to the present invention is, for example, characterized in that the display device includes at least a display panel, a first backlight which is arranged at a back surface of the display panel and irradiates light to the display panel, and a second backlight which irradiates light to the back surface from the display device.

(3-1)

A game machine according to the present invention is, for example, a slot-machine-type game machine having a display device, wherein the display device is arranged on a whole region of a periphery of a region where rotary drums thereof are arranged.

(3-2)

A game machine according to the present invention is, for example, a slot-machine-type game machine having a display device, wherein respective rotary drums can be observed with the naked eye through holes formed in the display device.

(3-3)

The game machine according to the present invention is, for example, on the premise of the constitution (3-2), characterized in that the display device includes a frame at a back surface of a rotary drum side and holes which have center axes thereof aligned with center axes of the holes are formed in the frame.

(3-4)

The game machine according to the present invention is, for example, on the premise of the constitution (3-3), characterized in that the holes are plugged by transparent plates.

(3-5)

The game machine according to the present invention is, for example, on the premise of the constitution (3-2), characterized in that the display device forms an envelope using respective substrates which are arranged to face each other in an opposed manner with liquid crystal disposed therebetween, gate signal lines which extend in one direction and are arranged in parallel in another direction and drain signal lines which extend in another direction and are arranged in parallel in the one direction are formed on a liquid-crystal-side surface of either one of the substrates, and scanning signal drive circuits are respectively formed at both ends of the respective gate signal lines and video signal drive circuits are respectively formed at both ends of the respective drain signal lines.

(3-6)

A game machine according to the present invention is, for example, a slot-machine-type game machine which includes a display device and allows a player to observe respective rotary drums with the naked eye through holes formed in the display device or high transmissivity regions therein, wherein a light source which illuminates the rotary drums is provided to a rotary-drum-side surface of the display device.

(3-7)

A game machine according to the present invention is, for example, a slot-machine-type game machine which includes a display device and allows a player to observe respective rotary drums with the naked eye through holes formed in the display device or high transmissivity regions therein, wherein the display device includes a light guide plate which has a light source on a side wall surface thereof as one constitutional member and light is irradiated also to a rotary drum side from the light guide plate.

(3-8)

A game machine according to the present invention is, for example, on the premise of the constitution (3-7), characterized in that a reflection sheet or a reflection surface is arranged on a rotary-drum-side surface of the light guide plate, and the reflection sheet or the reflection surface sets the reflectance of a portion thereof, which allows light to pass therethrough to the rotary drum side, lower than the reflectance of portions thereof other than the portion.

(3-9)

A game machine according to the present invention is, for example, a slot-machine-type game machine which includes a display device and allows a player to observe respective rotary drums with the naked eye through holes in the display device or high transmissivity regions formed in the display device, wherein the display device includes at least a display panel, a first backlight which is dedicatedly used for the liquid crystal display panel and is arranged at a back surface of the display panel, and a second backlight which irradiates light to a rotary drum side.

(3-10)

A game machine according to the present invention is, for example, a slot-machine-type game machine which includes a display panel and rotary drums, wherein the display panel includes a first backlight which is arranged at a back surface of the display panel and irradiates light to a display panel side, and second backlight which irradiates light to a rotary drum side, and the display panel and the first and second backlights are formed into a module using a frame.

(3-11)

A game machine according to the present invention is, for example, characterized in that a display device is provided to a slot-machine-type game machine, the display device allows a player to observe respective rotary drums with the naked eye through high transmissivity regions formed in the display device, and the display device displays marks which can be focused along with lucky marks which move together with the rotation of the respective drums in the high transmissivity regions.

(3-12)

A game machine according to the present invention is, for example, characterized in that a display device is provided to a slot-machine-type game machine, the display device allows a player to observe respective rotary drums with the naked eye through high transmissivity regions formed in the display device, and the display device produces a color display in the high transmissivity regions which respectively face the respective rotary drums until the respective rotary drums are stopped.

(3-13)

A game machine according to the present invention is, for example, characterized in that a display device is provided to a slot-machine-type game machine, the display device allows a player to observe respective rotary drums with the naked eye through high transmissivity regions formed in the display device, and the display device performs a blinking display of the high transmissivity regions which respectively face the respective rotary drums until the respective rotary drums are stopped.

(3-14)

A game machine according to the present invention is, for example, characterized in that a display device is provided to a slot-machine-type game machine, the display device allows a player to observe respective rotary drums with the naked eye through high transmissivity regions formed in the display device, and when lucky marks appear on the respective rotary drums, images are displayed on the high transmissivity regions which face the rotary drums in an opposed manner.

(3-15)

A game machine according to the present invention is, for example, characterized in that a display device is provided to a slot-machine-type game machine, and the display device allows a player to observe respective rotary drums with the naked eye through high transmissivity regions formed in the display device.

Here, the present invention is not limited to the above-described constitutions and various modifications can be made without departing from the technical concept of the present invention.

Further, following Examples are also disclosed in this specification and drawings.

(4-1)

A display device according to the present invention is, for example, constituted of a first display device in which holes are formed on a display screen thereof and a second display device which is arranged with respect to the first display device such that the periphery thereof is overlapped to peripheries of the holes, and the first display device and the second display device perform display driving thereof independently from each other.

(4-2)

The display device according to the present invention is, for example, on the premise of the constitution (4-1), characterized in that the second display device produces a display of higher resolution than the first display device.

(4-3)

The display device according to the present invention is, for example, on the premise of the constitution (4-1), characterized in that the second display device includes a display drive circuit at a portion of a periphery thereof and wiring is pulled out from the display drive circuit to a back surface side of the first display device through the holes formed in the first display device.

(4-4)

The display device according to the present invention is, for example, on the premise of the constitution (4-1), characterized in that each of the first display device and the second display device includes at least a liquid crystal display panel and a backlight which is arranged on a back surface of the liquid crystal display panel.

(4-5)

The display device according to the present invention is, for example, on the premise of the constitution (4-1), characterized in that each of the first display device and the second display device is constituted of a liquid crystal display panel and a backlight is formed on a back surface of the first display device such that the backlight extends to a region where the holes are formed.

(4-6)

A game machine according to the present invention is, for example, a game machine having a display device, wherein the display device includes a first display device having a display surface in which holes are formed and a second display device which is arranged with respect to the first display device such that the periphery thereof is overlapped to peripheries of the holes at a player side, and a transparent ornamental board is arranged at the player side of the first display device and the second display device is arranged in a hole formed in the transparent ornamental board.

(4-7)

The game machine according to the present invention is, for example, on the premise of the constitution (4-6), characterized in that on a player-side surface of the second display device and a player-side surface of the transparent ornamental board, another ornamental board different from the transparent ornamental board is arranged.

(4-8)

The game machine according to the present invention is, for example, a pachinko game machine having the constitution (4-6) and nails are driven in the transparent ornamental board which is arranged on a player-side surface of the first display device.

(4-9)

The game machine according to the present invention is, for example, on the premise of the constitution (4-6), characterized in that an ornamental member is arranged in some portions or the whole of the periphery of the second display device in an overlapped manner.

(4-10)

The game machine according to the present invention is, for example, on the premise of the constitution (4-6), characterized in that a display drive circuit which produces a display on the second display device is formed on a periphery of the second display device to which an ornamental member is overlapped.

(4-11)

A game machine according to the present invention is, for example, a game machine having a display device, wherein the display device includes a first display device having a display surface in which holes are formed and a second display device which is arranged with respect to the first display device such that the periphery thereof is overlapped to peripheries of the holes at a side opposite to a player side, and the first display device and the second display device perform display driving thereof independently from each other.

(4-12)

The game machine according to the present invention is, for example, on the premise of the constitution (4-11), characterized in that an ornamental member is mounted on some portions or the whole portions of the peripheries of the holes formed in the first display device, and the ornamental member extends so as to come into contact with side wall surfaces of the holes.

(4-13)

The game machine according to the present invention is, for example, characterized by using any one of the display devices (4-1) to (4-5).

BRIEF DESCRIPTION OF THE DRAWINGS

FIGS. 8A and 8B are cross-sectional views showing another embodiment of the display device according to the present invention;

FIG. 13 is a diagram showing another embodiment of the display device according to the present invention;

FIGS. 14A to 14C are plan views showing one embodiment of the constitution of a frame of the display device according to the present invention;

FIGS. 31A to 31F are diagrams showing one embodiment of the display device according to the present invention;

FIGS. 36A to 36G are diagrams showing another embodiment of the display device according to the present invention;

FIGS. 39A to 39F are diagrams showing another embodiment of the display mode of the display device according to the present invention;

DESCRIPTION OF THE PREFERRED EMBODIMENTS

Respective embodiments of a display device and a game machine according to the present invention will be explained in conjunction with the drawings hereinafter.

In the explanation made hereinafter, the terms "(liquid crystal) display device" and "(liquid crystal) display panel" frequently appear and the former display device is a concept which includes the latter display panel as one constitutional member to define them exactly. However, in the specification, for example, there may be a case in which, even when reference is made to a (liquid crystal) display device, this term implies only the (liquid crystal) display panel; and, there may be also a case in which, even when reference is made to the (liquid crystal) display panel, this term implies the (liquid crystal) display device. This is because these terms are used differently merely from a view point so to which term is preferable for facilitating an understanding of the explanation. Further, the (liquid crystal) display device and the (liquid crystal) display panel may be applicable as the game machine or as the display device. Further, provided that substantially the same advantageous effects can be obtained, the display device may be a self-luminous light emitting type display device, such as an EL display device or the like, besides a liquid crystal display device.

Embodiment 1

Figure 1:
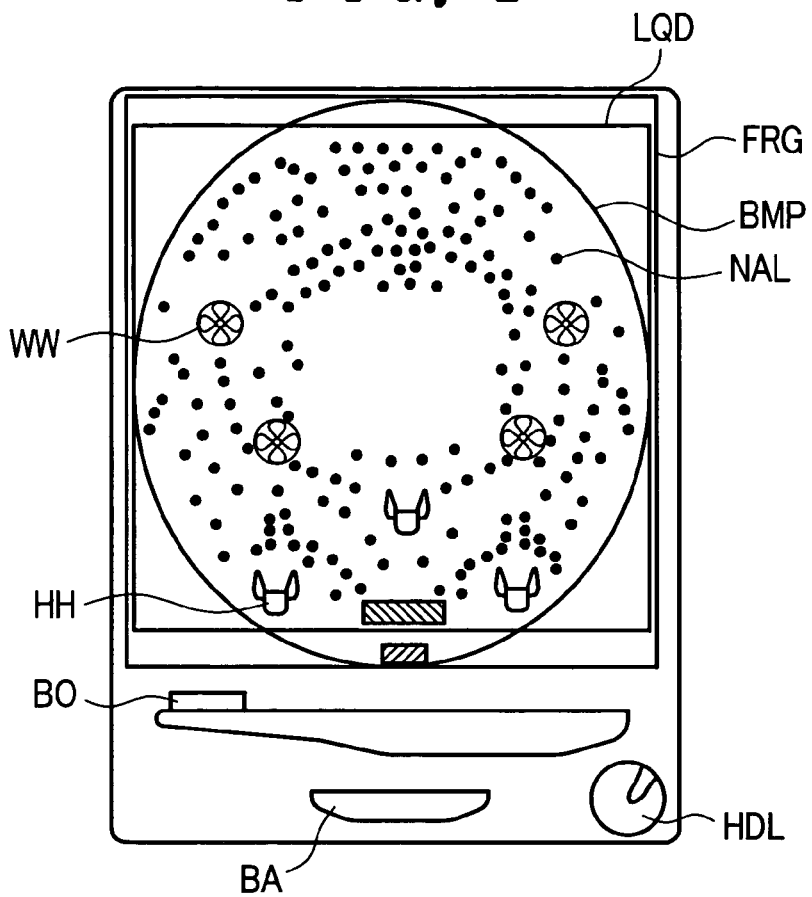
FIG. 1 is a front plan view showing one embodiment of a pachinko game machine according to the present invention.

FIG. 1 is a plan view showing one embodiment of the overall constitution of a pachinko game machine according to the present invention.

In the drawing, a manipulating portion, which is mainly constituted by a handle HDL, is provided at a lower portion of the pachinko game machine. In most of a region above the manipulating portion, pachinko balls which are hit by manipulation of the handle HDL move and fall through a large number of scattered nails NAL which are driven in a base board while bumping into these nails NAL.

The region in which the pachinko balls can move is surrounded by a vertically elongated elliptical wall BMP, for example. In the inside of the region, besides the nails NAL, there are windmills WW which guide the pachinko balls in unexpected directions, lucky holes HH which are formed in some key positions and the like.

When the pachinko ball enters the lucky hole HH, the player acquires a plurality of pachinko balls and these pachinko balls are stored in a ball receiving portion BA arranged at the manipulating portion by way of a ball discharge portion BO.

The base board in the region in which at least the pachinko balls can move constitutes a display part of a liquid crystal display device LQD and the pachinko player can enjoy a large image displayed on the liquid crystal display device LQD.

Here, the above-mentioned nails NAL and the windmills WW are arranged on the base board through holes formed in a display screen of the liquid crystal display device LQD, for example, and the lucky holes HH are guided to a back surface of the base board through holes formed in the liquid crystal display panel PNL.

Further, a portion above the manipulating portion including the region in which the pachinko balls can move is closed by a glass door FRG; and, hence, the pachinko balls are designed to move among routes defined by the above-mentioned nails NAL which are sandwiched by the liquid crystal display device LQD and the glass door FRG.

Embodiment 2

Figure 2:
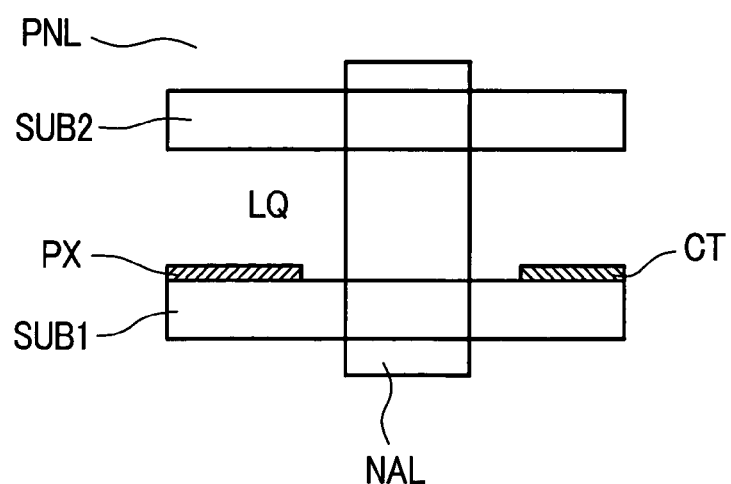
FIG. 2 is a cross-sectional view showing one embodiment of a pixel of a display device according to the present invention.

FIG. 2 is a cross-sectional view of the above-mentioned liquid crystal display device LQD showing one embodiment of the constitution in one portion of one pixel among a large number of pixels.

A portion which constitutes a display part among the liquid crystal display device LQD is a liquid crystal display panel PNL. The liquid crystal display panel PNL includes a transparent substrate SUB1 and a transparent substrate SUB2, which are arranged to face each other in an opposed manner with liquid crystal LQ disposed therebetween, wherein pixel electrodes PX and counter electrodes CT are formed on a liquid-crystal-side upper surface of the transparent substrate SUB1 in a spaced-apart-manner from each other, for example. An electric field is generated between the pixel electrode PX and the counter electrode CT, and the optical transmissivity of the liquid crystal is controlled in response to the electric-field components of such an electric field, which is disposed in parallel to a surface of the transparent substrate SUB1.

In case the pixel electrodes PX and the counter electrodes CT are formed on separate substrates, when the nails NAL which are made of a conductive material are formed, the pixel electrodes PX and the counter electrodes CT are easily short-circuited thus lowering the yield rate.

By applying coating made of an insulation material to the nails NAL, a countermeasure against short-circuiting can be realized. This countermeasure also constitutes one of the features of the present invention.

Further, by forming the pixel electrodes PX and the counter electrodes CT on the same substrate, such short-circuiting can be easily obviated thus enhancing the yield rate. This is because the distance between the pixel electrode PX and the counter electrode CT can be set independently from a liquid crystal gap, which is determined based on the distance between the substrates SUB1 and SUB2; and, hence, it is possible to set the distance between the pixel electrode PX and the counter electrode CT to be larger than the liquid crystal gap. This advantage cannot be realized by the constitution which mounts the pixel electrodes PX and the counter electrodes CT on different substrates. This is a structural advantageous effect.

In this case, particularly, as portions where the nails NAL are allowed to penetrate the liquid crystal display panel PNL from the front surface to the back surface, it is preferable to select regions between the pixel electrodes PX and the counter electrodes CT where the nails NAL which are made of a conductive material come into contact with neither the pixel electrodes PX nor the counter electrodes CT.

Due to such a constitution, the pixel electrodes PX and the counter electrodes CT can be configured such that the electrical connection of these electrodes with the nails NAL can be obviated, and, further, the electric field generated between the pixel electrode PX and the counter electrode CT is not influenced by the nails NAL.

Here, although FIG. 2 is depicted such that the nail NAL is directly driven into the liquid crystal display panel PNL, it is possible to drive the nail NAL as depicted, or holes may be preliminarily formed in the liquid crystal display panel PNL and the nails allowed to penetrate the holes.

Figure 3:
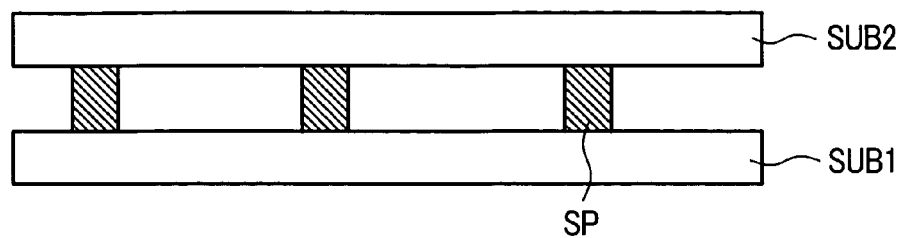
FIG. 3 is a cross-sectional view showing one embodiment of the display device according to the present invention.

Further, FIG. 3 shows that, as spacers for maintaining a uniform gap between the transparent substrate SUB1 and the transparent substrate SUB2 of the liquid crystal display panel PNL, thus setting the layer thickness of the liquid crystal to a uniform thickness, so-called columnar spacers SP are employed. These columnar spacers SP are formed such that a resin film, for example, is formed on a liquid-crystal-side upper-surface side of the transparent substrate SUB2, for example, and the resin film is made to remain on regions where the columnar spacers SP are formed, and in the other regions, the resin is selectively removed. These columnar spacers SP can be formed in any desired portions, and, at the same time, the columnar spacers SP can be fixed to the transparent substrate SUB2 side. It is needless to say that the columnar spacers SP can be formed on the transparent substrate SUB1 side.

Since the pachinko balls always impart an impact on the liquid crystal display panel PNL side, the liquid crystal display panel PNL is required to have a strong vibration impact resistance, and the above-mentioned columnar spacers SP satisfy such a demand.

Here, when bead-like parts are used as spacers, the spacers are moved due to the above-mentioned impact, thus giving rise to a drawback in that the reliability of the beads as spacers cannot be maintained. That is, it is necessary to use columnar spacers which are fixed to the substrate as spacers.

Figure 4A:
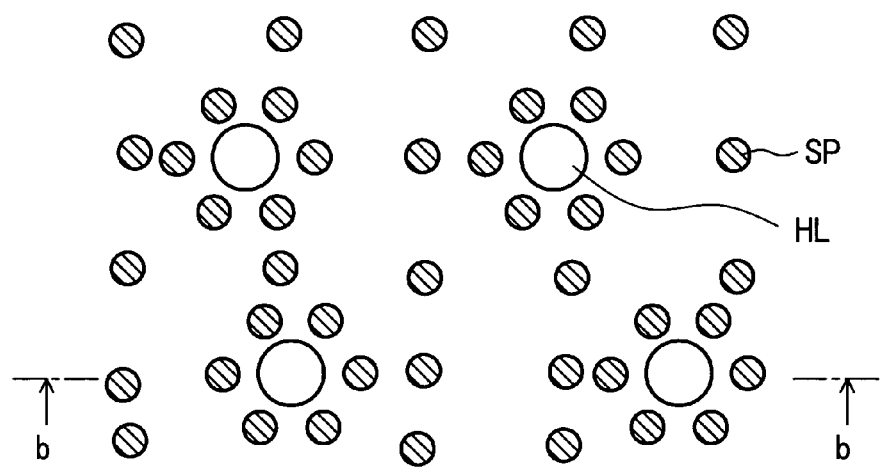
FIG. 4A is a top plan view and FIG. 4B is a cross-sectional view taken along line b-b in FIG. 4A, showing another embodiment of the display device according to the present invention.

Further, FIG. 4A shows a state in which the above-mentioned columnar spacers SP are arranged between the transparent substrate SUB1 and the transparent substrate SUB2. As shown in the drawing, at a portion of the liquid crystal display panel PNL where the nail NAL is made to penetrate therethrough, the columnar spacers SP are arranged with a higher arrangement density in the vicinity of the portion where the nails NAL reside than in other portions. This is because the portion which allows the nail NAL to pass therethrough receives a stronger impact by way of the nail NAL, and, hence, the density of the columnar spacers SP at the periphery of the portion is made larger than the density of the columnar spacers SP at other regions, whereby a further enhancement of the reliability against local vibration impact can be realized.

Figure 4B:
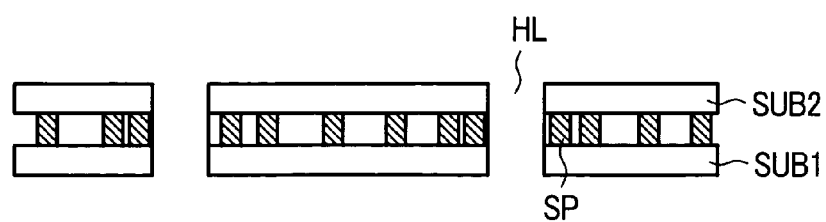

Here, a cross-sectional view taken along a line b-b in FIG. 4A is shown as FIG. 4B, and the portions which allow the nails NAL to pass therethrough are indicated as hole portions HL. It is needless to say that the nails NAL may be directly driven into the liquid crystal display panel PNL.

Embodiment 3

Figure 5A:
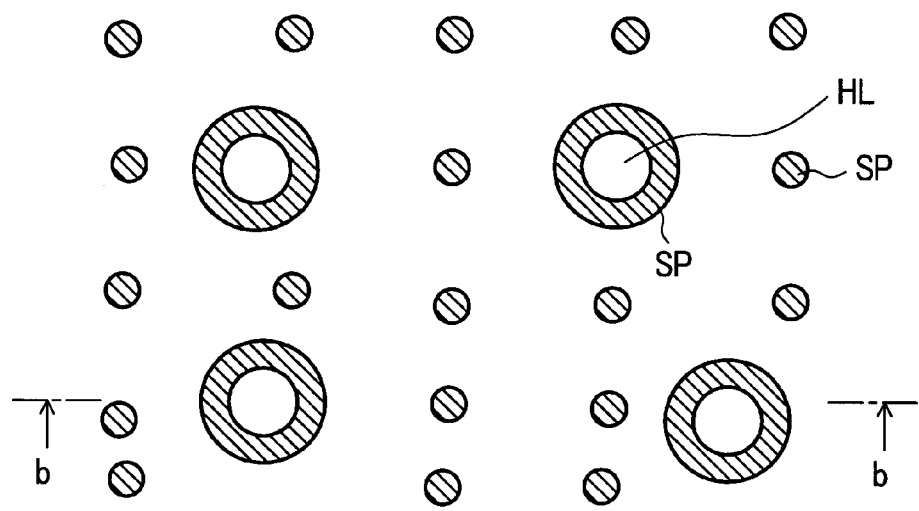
FIG. 5A is a top plan view and FIG. 5B is a cross-sectional view taken along line b-b in FIG. 5A, showing another embodiment of the display device according to the present invention.
Figure 5B:
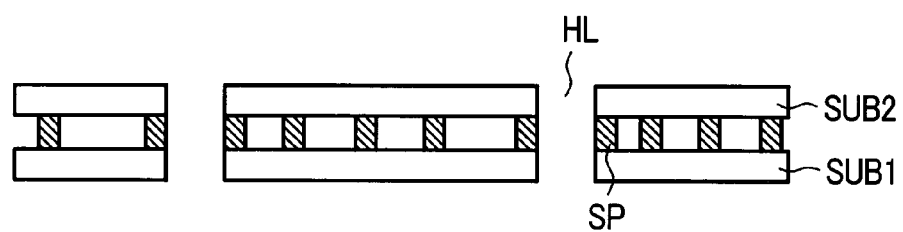

FIGS. 5A and 5B show another case in which the above-mentioned columnar spacers SP are formed between the transparent substrate SUB1 and the transparent substrate SUB2 of the liquid crystal display panel PNL, wherein columnar spacers SP are also formed on peripheries of the holes HL which allow the nails to pass therethrough such that the columnar spacers SP surround the holes HL.

An impact which is transmitted from the pachinko ball to the liquid crystal display panel PNL by way of the nails NAL can be largely attenuated by the above-mentioned columnar spacers SP which are formed in a state such that the columnar spacers SP surround the holes HL which allow the nails NAL to pass therethrough.

Here, FIG. 5A is a plan view and FIG. 5B is a cross-sectional view taken along a line b-b in FIG. 5A, wherein portions which allow the nails NAL to pass therethrough are indicated as hole portions HL.

Figure 6A:
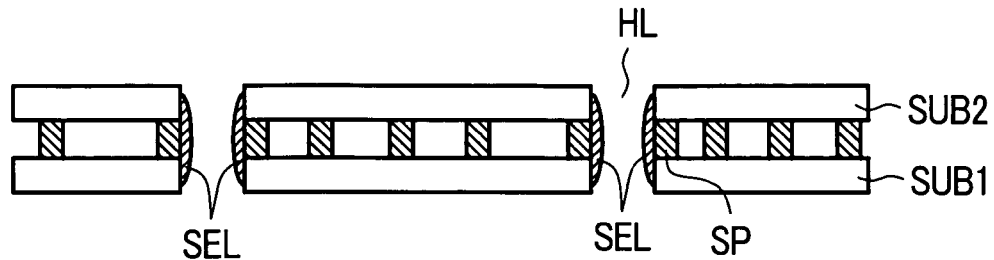
FIGS. 6A and 6B are cross-sectional views showing another embodiment of the display device according to the present invention.

In this case, as another embodiment, as shown in FIG. 6A, to portions corresponding to the inner peripheral walls of the holes NAL, a sealing material SEL is applied such that the sealing material SEL comes into contact with the columnar spacers SP. Alternatively, as shown in FIG. 6B, the sealing material SEL may be applied such that the sealing material SEL comes into contact with the transparent substrates SUB1 and SUB2, but does not come into contact with the columnar spacers SP.

As the sealing material SEL, a material which can sufficiently obviate leaking of the liquid crystal LQ from portions of the above-mentioned holes HL and can withstand friction between the holes HL and the nails which are allowed to penetrate the holes HL is selected.

Figure 6B:
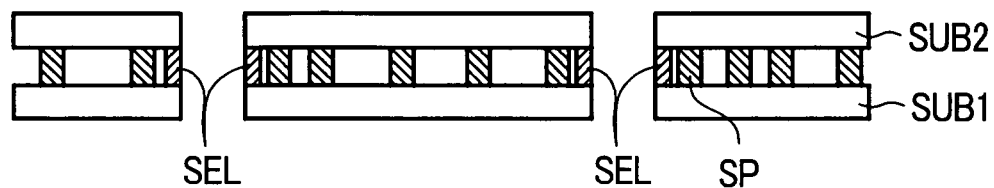

Here, FIG. 6A and FIG. 6B are respectively similar to the view provided by FIG. 5B.

Figure 7A:
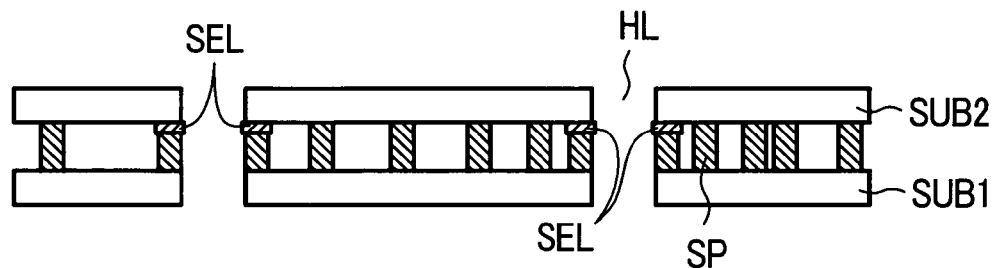
FIGS. 7A and 7B are cross-sectional views showing another embodiment of the display device according to the present invention.
Figure 7B:
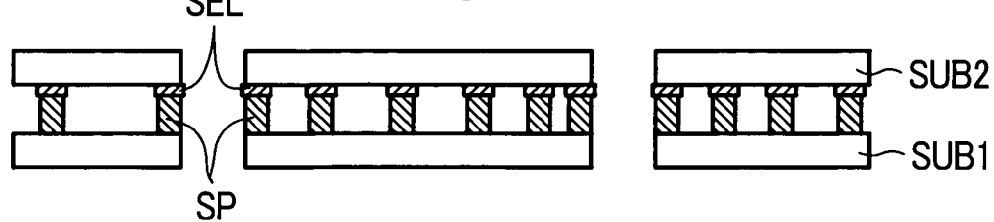

FIGS. 7A and 7B show another embodiment in which the above-mentioned sealing material SEL is used in the peripheries of the holes HL and are views similar to FIG. 5B.

In FIG. 7A, when the columnar spacers SP are formed in the periphery of the hole HL in a state such that the columnar spacers SP surround the hole HL, the sealing material SEL is interposed between the columnar spacers SP and at least one transparent substrate (transparent substrate SUB2 in the drawing) such that the sealing material SEL surrounds the hole HL.

While obviating leaking of the liquid crystal from a portion of the hole HL also with respect to the columnar spacers SP, it is also possible to facilitate an adjustment of the gap between the transparent substrate SUB1 and the transparent substrate SUB2 using the sealing material SEL. It is needless to say that the sealing material SEL also has a function of obviating the leaking of the liquid crystal.

Accordingly, it is preferable that the columnar spacers SP are formed on the transparent substrate SUB1 side and the sealing material SEL is formed between the columnar spacers SP and the transparent substrate SUB2. Further, when the columnar spacers SP are formed on the transparent substrate SUB1 side, it is preferable that the sealing material is formed between the columnar spacers SP and the transparent substrate SUB2.

Further, with respect to a case in which the gap adjustment function of the sealing material SEL is to be emphasized, as another embodiment, as shown in FIG. 7B, also with respect to other columnar spacers SP other than the columnar spacers SP which are formed in a state such that the columnar spacers SP surround the holes HL at the peripheries of the holes HL, the sealing material SEL may be interposed between the columnar spacers SP and one transparent substrate.

Embodiment 4

FIG. 8A shows another embodiment in which sealing material is provided at a portion of the liquid crystal display panel PNL which allows the nail NAL to pass therethrough. In this embodiment, a circular sealing material SEL which surrounds the penetrating portions is provided between the transparent substrates SUB1 and SUB2 along with the columnar spacers SP.

As shown in FIG. 8B, after completion of the liquid crystal display panel PNL, at the portion which is surrounded by the sealing material SEL, holes are formed in the transparent substrates SUB1 and SUB2 by the irradiation of laser beams or by melting the transparent substrates SUB1 and SUB2 using a chemical, and, thereafter, the nail is allowed to pass through the hole.

Here, when the transparent substrates SUB1 and SUB2 are formed of a material such as a resin or plastic, the holes can be easily formed by mechanical machining.

In this case, as shown in FIG. 8C, in place of the circular sealing material which surrounds the penetrating portions, the sealing material may be formed of the same material and have the same shape as the columnar spacers SP; and, the sealing material SEL is then interposed between the columnar spacers SP and the transparent substrate SUB2 together with other columnar spacers SP. In this case, the members which replace the circular sealing material SEL which surrounds the penetrating portions and other columnar spacers SP are formed on the transparent substrate SUB1 side. However, it is needless to say that the members and the columnar spacers SP may be formed on the transparent substrate SUB2 side and the sealing material interposed between the columnar spacers SP and the transparent substrate SUB1.

Further, although the sealing material SEL shown in FIG. 8A is formed to surround the portion where the nail NAL penetrates, the sealing material SEL is not limited to such a constitution. For example, as shown in FIG. 8D, it is needless to say that the sealing material may be formed in a state such that the sealing material does not surround the portion where the nail NAL penetrates, but is filled in such a portion. To form the hole, as shown in FIG. 8E, the hole is formed not only in the transparent substrates SUB1 and SUB2, but also in the sealing material SEL which is interposed between the transparent substrates SUB1 and SUB2, and circumferential wall surfaces of the holes HL are formed of the material.

Further, as shown in FIG. 8F, in place of the sealing material SEL which is formed at the penetrating portions and the peripheries thereof, it is possible that the sealing material SEL may be formed of members made of a material equal to the material of the columnar spacers SP; and having the same shape as the columnar spacers SP and, at the same time, the sealing material SEL is interposed between the members and the transparent substrate SUB2 together with other columnar spacers SP. Also, in this case, the columnar spacers SP which replace the penetrating portions and the sealing material SEL formed in the peripheries of the penetrating portions and other columnar spacers SP are formed on the transparent substrate SUB1 side. However, it is needless to say that the members and the columnar spacers SP may be formed on the transparent substrate SUB2 side and the sealing material SEL is interposed between the columnar spacers SP and the transparent substrate SUB1. Here, FIG. 8G shows a case in which holes which allow the nails to pass therethrough are formed.

Embodiment 5

With respect to the respective liquid crystal display panels PNL shown in FIGS. 8A to 8G, the holes HL which allow the penetration of the nails NAL therethrough need not be formed until the completion of the liquid crystal display panels PNL, and the holes HL may be formed when necessary after the completion of the liquid crystal display panel PNL or the nails NAL may be driven without forming the holes HL.

In such cases, to avoid the occurrence of cracks in the transparent substrates SUB1 and SUB2 of the liquid crystal display panel PNL as much as possible, it is preferable to select resin or plastic having resiliency as a material of the transparent substrates SUB1 and SUB2.

Figure 9A:
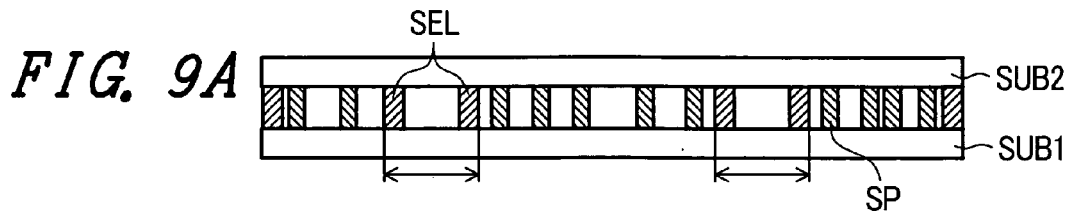
FIGS. 9A and 9B are cross-sectional views showing another embodiment of the display device according to the present invention.
Figure 9B:
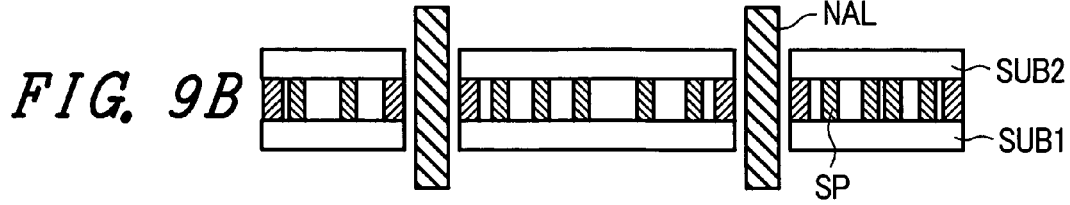
Figure 9C:
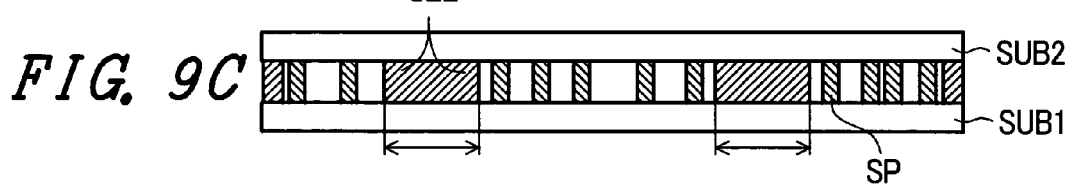
Figure 9D:
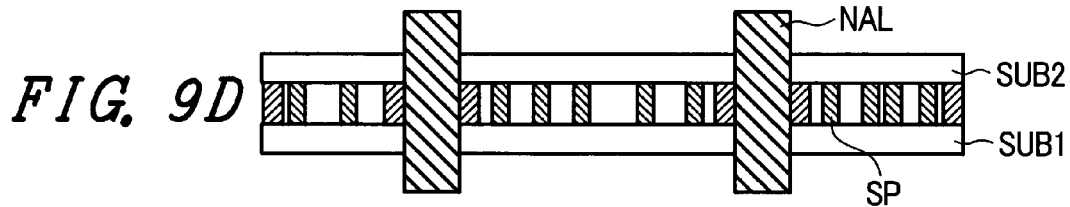
Figure 9E:
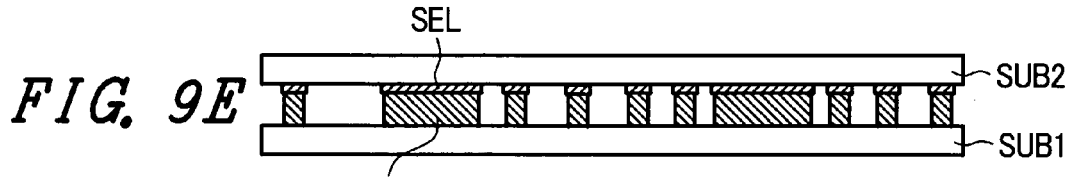
Figure 9F:
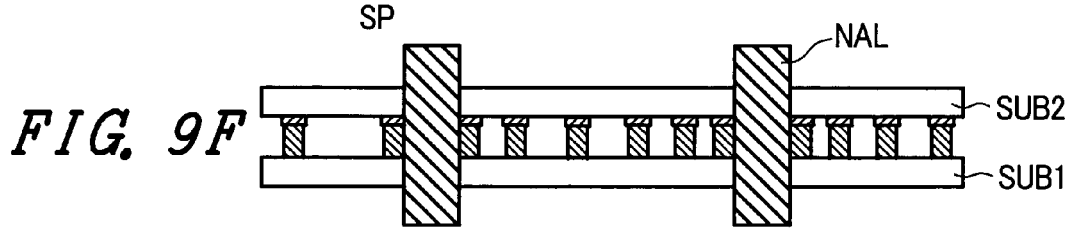

FIG. 9A shows the liquid crystal display panel PNL shown in FIG. 8A, and FIG. 9B is a view showing a state in which holes HL are formed in the liquid crystal display panel PNL by laser beams, for example, and the nails NAL are allowed to pass through the holes HL. Further, FIG. 9C shows the liquid crystal display panel PNL shown in FIG. 8D, and FIG. 9D is a view showing a state in which the nails NAL are made to directly penetrate the liquid crystal display panel PNL. Further, FIG. 9E shows the liquid crystal display panel PNL shown in FIG. 8F, and FIG. 9F is a view showing a state in which the nails NAL are made to directly penetrate the liquid crystal display panel PNL.

Further, with respect to the manufacture of the liquid crystal display panel PNL, in steps thereof, the holes HL may be formed in the liquid crystal display panel PNL and resin or the sealing material SEL may be filled in the holes HL thus providing the complete product. This is because, in driving the nails NAL, it is sufficient to make the nails NAL penetrate the resin or the sealing material SEL filled in the holes HL.

Figure 9G:
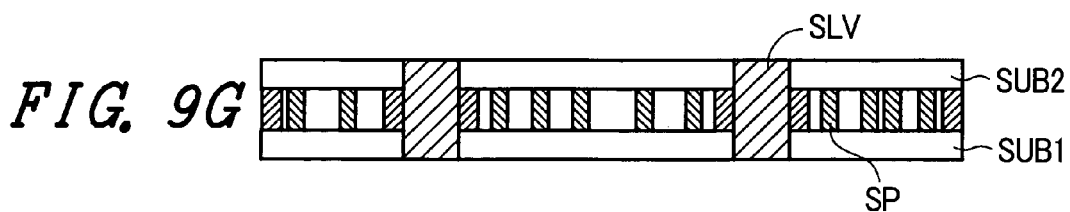

In this case, in place of the resin or the sealing material SEL, as shown in FIG. 9G, sleeves SLV formed of a material such as a resin having an excellent resiliency or a sponge may be filled in the holes HL. By making the sleeves SLV surround the nails NAL in a state in which the nails NAL are driven, when the nails NAL are driven or when the pachinko ball hits the nail NAL at the time of using the game machine, it is possible to attenuate the transfer of an impact generated at such a time to the liquid crystal display panel PNL.

Embodiment 6

Figure 10A:
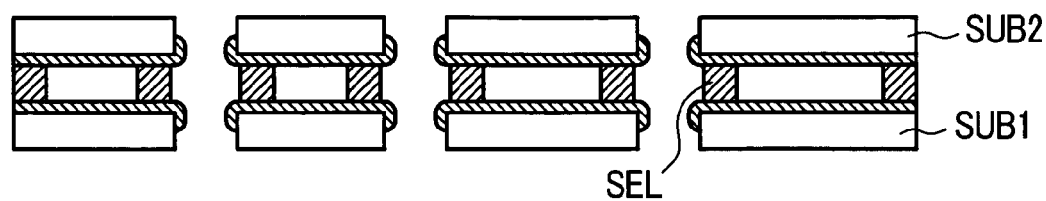
FIGS. 10A and 10B are cross-sectional views showing another embodiment of the display device according to the present invention.

FIG. 10A is a view showing a state in which the holes HL which allow the nails NAL to pass therethrough are already formed at the time of completion of the liquid crystal display panel PNL. That is, as another embodiment, on peripheral side walls of the holes HL formed in the transparent substrate SUB1 and the transparent substrate SUB2, a resin film RES, which is formed on a liquid crystal side of the transparent substrate SUB1, extends; and, the extension portions are applied to some portions of the peripheral side walls, and, at the same time, a resin film RES, which is formed on a liquid crystal side of the transparent substrate SUB2, extends, and the extension portions are applied to some portions of the peripheral side walls.

With respect to the above-mentioned resin film RES, it is not necessary to newly form the resin film RES. That is, a resin film which is necessary at the time of forming the liquid crystal display panel PNL, such as, for example, an overcoat film, a black matrix film, a color filter film, an orientation film or the like can be directly used as it is.

Due to such a constitution, an attenuation material is formed on some portions of the peripheral side walls of the holes HL, and, hence, the occurrence of cracks which are transmitted to the liquid crystal display panel PNL can be reduced as much as possible.

Here, in the peripheries of the holes formed in the liquid crystal display panel PNL which allows the penetration of the nails NAL therethrough, for example, the sealing material SEL is formed between the transparent substrates SUB1 and SUB2 such that the sealing material SEL surrounds the holes.

Figure 10B:
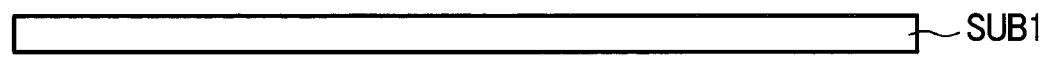
Figure 10C:
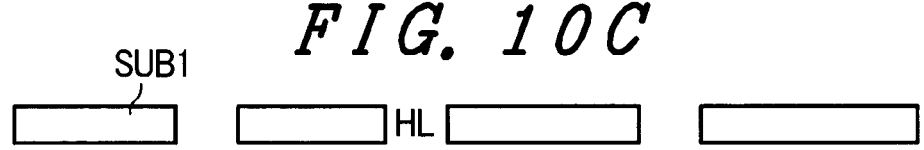
Figure 10D:
Figure 10E:
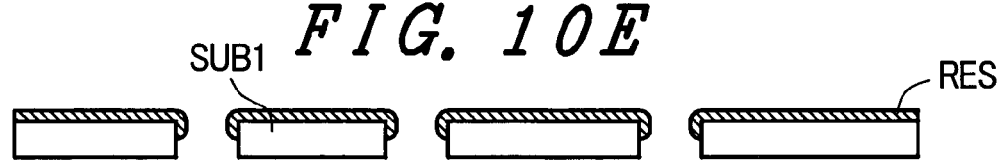

The formation of such a resin film will be explained by taking the transparent substrate SUB1 as an example. First of all, the transparent substrate SUB1 is prepared as shown in FIG. 10B and the holes HL are formed in desired portions of the surface of the transparent substrate SUB1 as shown in FIG. 10C. Thereafter, at a stage in which various layers are formed on the liquid-crystal-side surface of the transparent substrate SUB1, for example, at the time of forming the overcoat film, for example, as shown in FIG. 10D, the resin film RES is formed by coating. Although the resin film RES is formed such that the resin film RES covers the holes HL due to the tackiness thereof, due to heat treatment performed thereafter, as shown in FIG. 10E, holes are formed in the resin film RES at the hole HL portions as the resin film RES sags into the peripheral side walls of the holes HL.

Further, FIGS. 11A to 11E show the constitution which is formed based on the same concept as the embodiment shown in FIGS. 10A to 10E, wherein the above-mentioned resin film RES is formed by adding a new step.

Figure 11A:
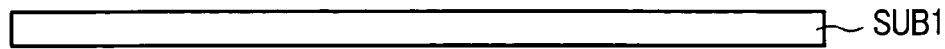
FIGS. 11A and 11B are cross-sectional views showing another embodiment of the display device according to the present invention.
Figure 11B:
Figure 11C:
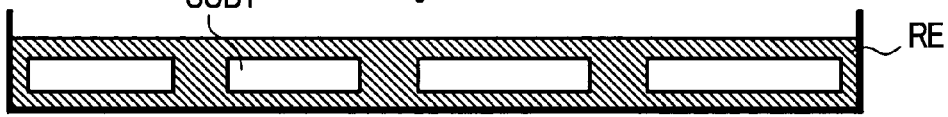
Figure 11D:
Figure 11E:
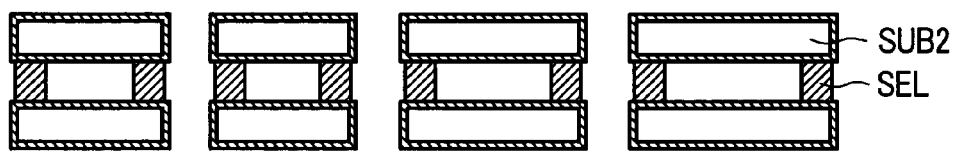

First of all, the transparent substrate SUB1 is prepared as shown in FIG. 11A and the holes HL are formed in desired portions of the surface of the transparent substrate SUB1 as shown in FIG. 11B. Thereafter, as shown in FIG. 11C, the transparent substrate SUB1 is immersed inside the resin RE in a liquid state. Accordingly, a thin resin film RES is applied to the surface of the transparent substrate SUB1 and the peripheral side walls of the holes and the resin film RES is dried by heating as shown in FIG. 11D. The transparent substrate SUB2 is formed in the same manner. Thereafter, as shown in FIG. 11E, the transparent substrates SUB1 and SUB2 are arranged to face each other in an opposed manner with the liquid crystal disposed therebetween.

With respect to the transparent substrates SUB1 and SUB2, not to mention the fact that the holes HL formed respectively in the transparent substrates SUB1 and SUB2 have the respective center axes thereof substantially aligned with each other, for example, the sealing material SEL is formed between the transparent substrates SUB1 and SUB2 in a state such that the sealing material SEL surrounds the holes HL.

Embodiment 7

Figure 12A:
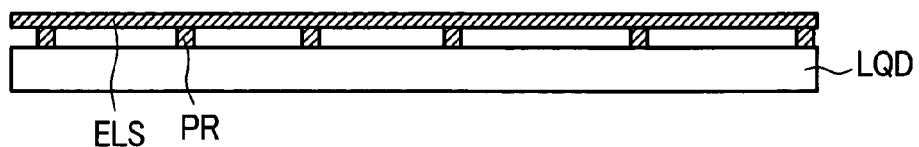
FIGS. 12A and 12B are cross-sectional views showing another embodiment of the display device according to the present invention.
Figure 12B:
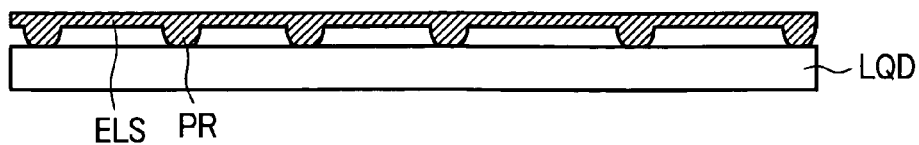

FIGS. 12A and 12B are directed to another embodiment. In this embodiment, a viewer-side surface of the above-mentioned liquid crystal display device LQD, that is, a surface at a side into which the pachinko ball bumps, is covered with a resilient material ELS formed of a light-transmitting resilient plate or resilient sheet. The resilient material ELS is provided for attenuating the transmission of impacts of the pachinko balls to the liquid crystal display device LQD side.

Further, projecting portions PR which are arranged in a scattered manner, for example, are provided between the resilient material ELS and the liquid crystal display device LQD, and, hence, a spaced-apart portion is formed between the resilient material ELS and the liquid crystal display device LQD over a large area. This provision is made to obviate the transmission of the impacts applied to the resilient material ELS to the liquid crystal display device LQD side as much as possible. Accordingly, it is not always necessary to scatter the projecting portions PR on the surface on which they are arranged, and the projecting portions PR may be formed in a grid array.

In this case, although the resilient material ELS and the projecting portions PR may be formed separately, they may be formed integrally.

Although the resilient material ELS may be formed on an upper surface of the polarizer which is formed on an upper surface of the liquid crystal display panel PNL, the resilient material ELS per se may be configured to have the function of a polarizer.

Embodiment 8

FIG. 13 shows another embodiment in which the above-mentioned liquid crystal display device LQD is formed into a module together with at least a frame FRM which is arranged on a back surface thereof. In this embodiment, holes HL which are at least aligned with the holes formed in the liquid crystal display device LQD for allowing the nails NAL to pass therethrough are also formed in the frame FRM.

The frame FRM is provided for mechanically reinforcing the liquid crystal display device LQD, wherein by preliminarily forming the holes HL in the frame FRM, it is possible to obtain an advantageous effect in that the penetration of the nails NAL is facilitated.

With respect to the holes HL formed in the liquid crystal display device LQD for allowing the penetration of the nails NAL therethrough, it is desirable to form holes HL for allowing nails NAL to pass therethrough in the future, besides the holes HL for allowing the nails NAL to pass therethrough actually. This is because the selection of the holes HL for allowing the nails NAL to pass therethrough differs depending on the specification or the like of the pachinko game machine. To cope with such a case, it is desirable that, also in the frame FRM, the holes HL which are aligned with portions where the nails NAL are expected to penetrate are formed besides the holes HL for allowing the nails NAL to penetrate therethrough actually. Further, the number of holes HL formed in the frame FRM may be set to be larger than the number of holes HL formed in the liquid crystal display device LQD. Also in this case, it is possible to cope with a plurality of specifications which differ as to the nail NAL forming position using the same frame FRM, and, hence, the enhancement of the mass production efficiency due to a reduction of the number of product types can be realized.

FIG. 14A shows the holes HL formed in the liquid crystal display device LQD which allow the nails NAL to actually pass therethrough and FIG. 14B indicates the frame FRM in which the holes HL are formed corresponding to the holes HL formed in the liquid crystal display device LQD. FIG. 14C indicates the frame FLM in which the holes HL which are aligned with portions where the nails NAL are expected to penetrate are formed besides the holes HL shown in FIG. 14B.

Figure 15A:
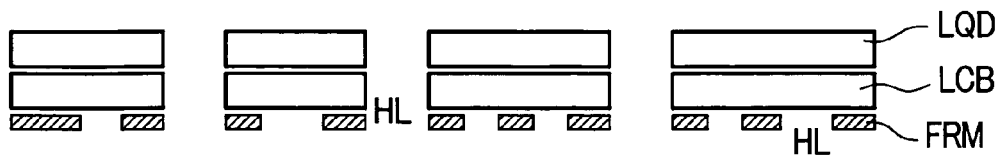
FIGS. 15A to 15C are diagrams showing one embodiment of the constitution of the frame with respect to a display panel and a light guide plate of the display device according to the present invention.
Figure 15B:
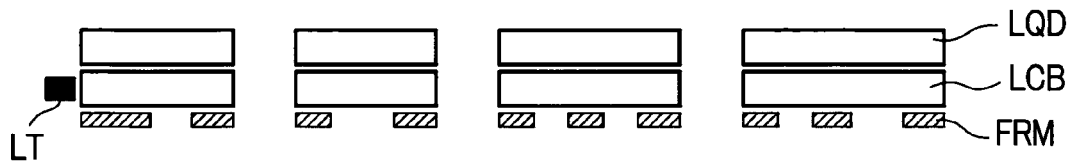

FIG. 15A shows a case in which the above-mentioned liquid crystal display device LQD is formed into a module by putting together a liquid crystal display panel PNL, a light guide plate LCB which is arranged on a back surface of the liquid crystal display panel PNL, and at least a frame FRM which is arranged on a back surface of the light guide plate LCB. In this embodiment, also in the light guide plate LCB, holes HL which allow the nails NAL to pass therethrough are formed. Here, the light guide plate LCB includes, as shown in FIG. 15B, a light source LT such as a cold cathode ray tube or the like on at least a one-side wall surface thereof and constitutes one member of the backlight for irradiating light from the light source LT to the liquid crystal display panel PNL.

As the holes HL formed in the light guide plate LCB, it is preferable to form only the holes HL for allowing the nails NAL to actually pass therethrough while forming no other holes HL. Due to such a constitution, it is possible to make the light from the light source LT properly irradiated to pixels which do not require the actual penetration of nails NAL.

Figure 15C:
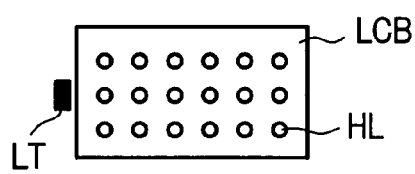

As the backlight, it is desirable to use a so-called side-light-type backlight having a light source LT such as a cold cathode ray tube on at least a one-side wall surface of the light guide plate LCB, as described above and shown in FIG. 15C. This is because a so-called direct type backlight which mounts the light source LT on the back surface of the liquid crystal display panel PNL is liable to easily generate interferences between the light source LT and the nail positions.

Embodiment 9

Figure 16A:
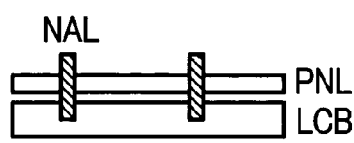
FIGS. 16A to 16D are diagrams showing another embodiment related to the arrangement of nails with respect to the display device according to the present invention.

FIG. 16A shows a case in which the liquid crystal display panel PNL is configured to include a board, and the board is used as a fixing member for fixing the nails NAL which penetrate the liquid crystal display panel PNL. In this case, it is needless to say that the fixing member may be configured to also perform the function of the light guide plate LCB. Further, it is desirable to set the thickness of the above-mentioned fixing member which also has the function of the light guide plate LCB to approximately 5 mm or more. This thickness is necessary to surely support the nails NAL.

Figure 16B:
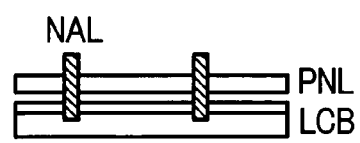

Further, FIG. 16B shows a case in which a layer is formed on a surface of the fixing member which faces the liquid crystal display panel PNL in an opposed manner and the layer has a hardness which is lower than the hardness of the material of the fixing member. This provision is made to obtain both easiness in driving the nails NAL and the supportability of the nails NAL.

Figure 16C:
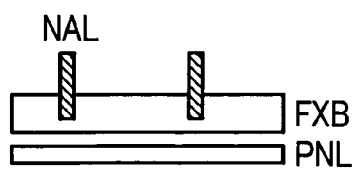

Further, FIG. 16C shows a case in which a light transmitting board FXB is arranged on a viewer-side surface of the liquid crystal display panel PNL and the board FXB is used as a fixing member in which the nails NAL are driven. In this case, it is unnecessary to make the nails NAL penetrate the liquid crystal display panel PNL, and, hence, it is possible to have an advantageous effect in that the liquid crystal display panel PNL having the usual constitution is used.

Figure 16D:
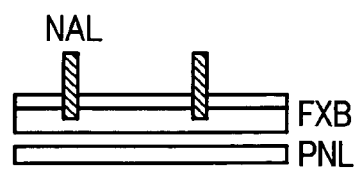

FIG. 16D shows a case in which a layer is formed on a surface of the fixing member and the hardness of the layer is set to be smaller than the hardness of the fixing member. This provision is made to obtain both easiness in driving the nails NAL and supportability of the nails NAL.

Embodiment 10

Figure 17:
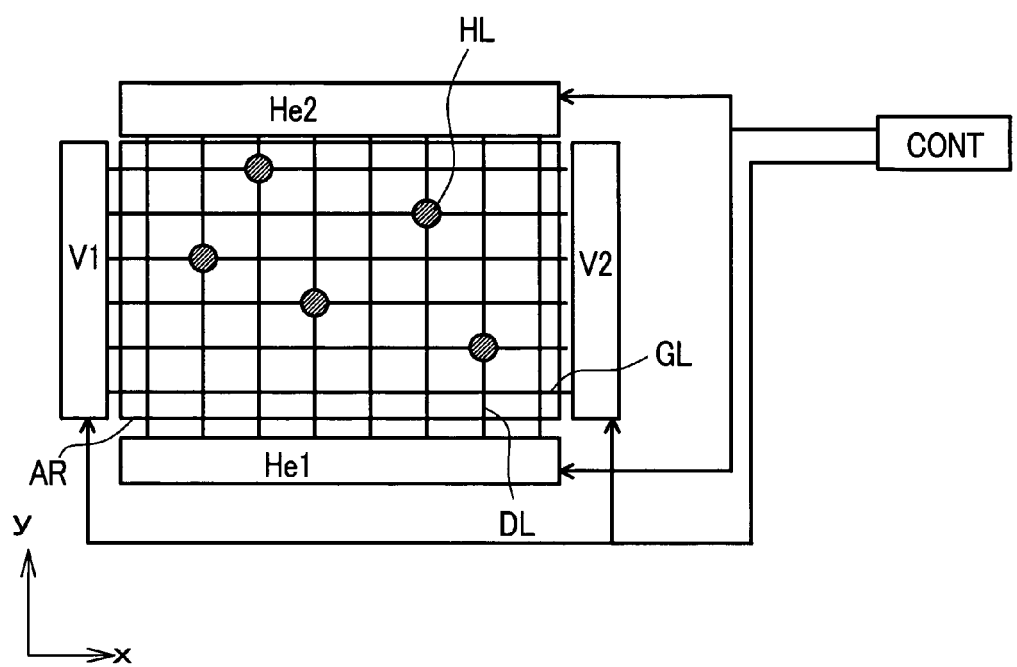
FIG. 17 is a schematic diagram showing another embodiment of the display device according to the present invention.

FIG. 17 is a plan view showing one embodiment of the constitution of the above-mentioned liquid crystal display panel PNL. The liquid crystal display panel PNL constitutes an envelope using the respective substrates SUB1, SUB2 which are arranged to face each other in an opposed manner with the liquid crystal disposed therebetween.

Then, on the liquid-crystal-side surface of one substrate SUB1 of the respective substrates, gate signal lines GL extend in the x direction and are arranged in parallel in the y direction as seen in the drawing and drain signal lines DL extend in the y direction and are arranged in parallel in the x direction in the drawing, wherein portions surrounded by these signal lines constitute pixel regions. An array of these respective pixel regions constitute a display region AR.

Each pixel region, although not shown in the drawing, includes at least a thin film transistor which is turned on in response to a scanning signal from the one-side gate signal line GL and a pixel electrode to which a video signal from a one-side drain signal line DL is supplied through the thin film transistor, and a counter electrode which generates an electric field between the counter electrode and the pixel electrode.

The respective gate signal lines GL are provided with scanning signal drive circuits V1, V2 which scan and supply scanning signals to the gate signal lines GL from both sides thereof, while the respective drain signal lines DL are provided with video signal drive circuits He1, He2 which supply video signals to the drain signal lines DL from both sides thereof. To these scanning signal drive circuits V1, V2 and the video signal drive circuits He1, He2, signals are supplied from a controller CONT.

In the liquid crystal display panel PNL having such a constitution, on a surface of the liquid crystal display panel PNL, the holes HL which allow nails to penetrate therethrough are arranged such that one hole or less HL is allocated to the gate signal line GL or the drain signal line DL. Due to such a constitution, even when a disconnection occurs on the gate signal line GL or the drain signal line DL due to the hole HL, it is possible to normally supply the scanning signal and the video signal to the other pixels, except for the pixel at the position relevant to the hole HL.

As described above, by arranging the holes HL such that one hole or less HL is allocated to the gate signal line GL or the drain signal line DL, the liquid crystal display panel PNL can be normally operated. For example, if two holes were to be arranged on one gate signal line GL, the scanning signal could not be supplied to the gate signal line located between these two holes.

Embodiment 11

Figure 18A:
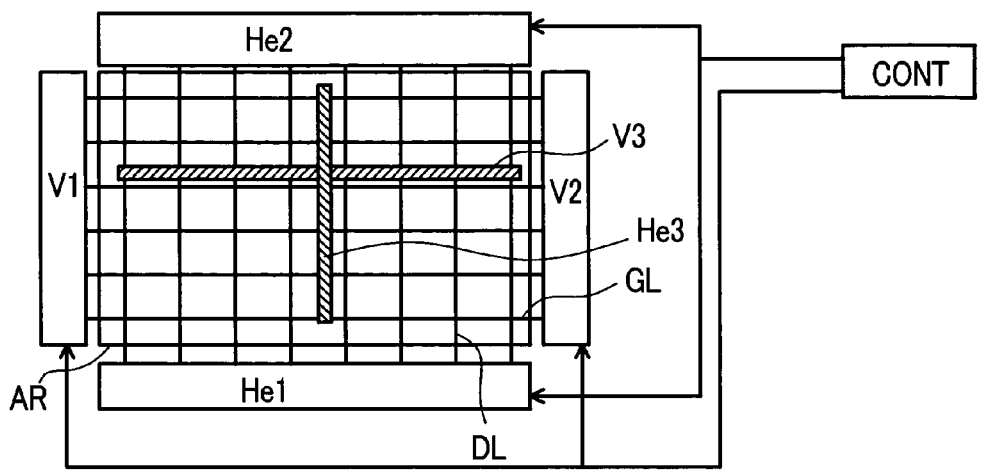
FIGS. 18A and 18B are schematic diagrams showing another embodiment of the display device according to the present invention.

FIG. 18A shows another embodiment of the liquid crystal display device which includes the respective scanning signal drive circuits V1, V2 at both ends of the respective gate signal lines GL and the respective video signal drive circuits He1, He2 at both ends of the respective drain signal lines DL, as described in connection with the above-mentioned embodiment. In this embodiment, a scanning signal drive circuit V3 and a video signal drive circuit He3 are formed also in the inside of the display region AR.

The scanning signal drive circuit V3 and the video signal drive circuit He3 in the inside of the display region AR are respectively arranged along the gate signal lines GL and the drain signal lines DL and are formed in a cruciform shape on a liquid-crystal-side surface of the transparent substrate SUB1. The scanning signal drive circuit V3 and the video signal drive circuit He3 in the inside of the display region AR are, in the same manner as the drive circuits located outside the display region AR, constituted of a large number of MIS (Metal Insulator Semiconductor) transistors, wherein semiconductor layers are formed of, for example, polysilicon (p-Si) which can be formed at a low temperature.

In this case, in the inside of the display region AR, the region surrounded by the respective drive circuits is divided into four regions and one hole or less can be formed with respect to the gate signal line GL or the drain signal line DL in each divided region. Accordingly, the tolerance of selection of portions where the holes are formed can be largely increased.

In view of the above, by providing the scanning signal drive circuits V3 and the video signal drive circuits He in plural numbers respectively in the inside of the display region AR without limiting them to a single circuit, the tolerance of selection of portions where the holes HL are formed can be further largely increased.

Figure 18B:
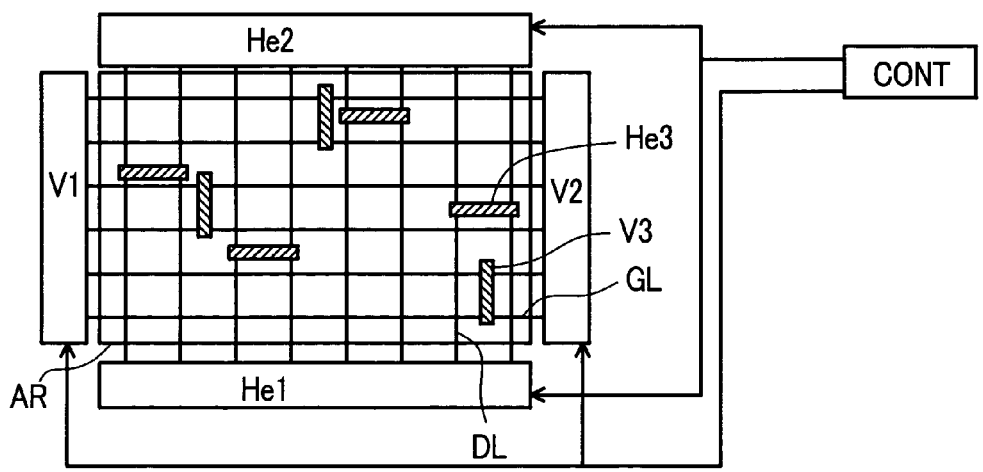

Further, FIG. 18B shows the modification of the above-mentioned constitution shown in FIG. 18A. In this modification, the scanning signal drive circuit V3 in the inside of the display region AR shown in FIG. 18A is divided into a plurality of circuits and the respective divided scanning signal drive circuits V3 are arbitrarily displaced in the extending direction of the gate signal lines GL; and, at the same time, the video signal drive circuit He3 is also divided into a plurality of circuits and the respective divided video signal drive circuit He3 are arbitrarily displaced in the extending direction of the drain signal lines DL.

The modification is configured to overcome the drawback that the signal drive circuits are formed on portions where the holes HL are formed by displacing the signal drive circuits.

Embodiment 12

Figure 19A:
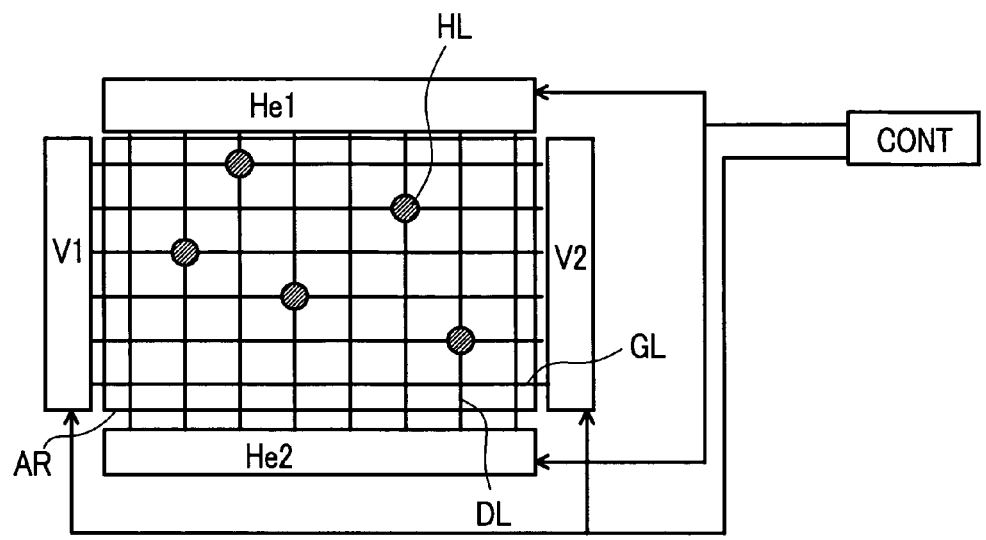
FIG. 19A is a schematic diagram and FIG. 19B is a cross-sectional view showing another embodiment of the display device according to the present invention.
Figure 19B:
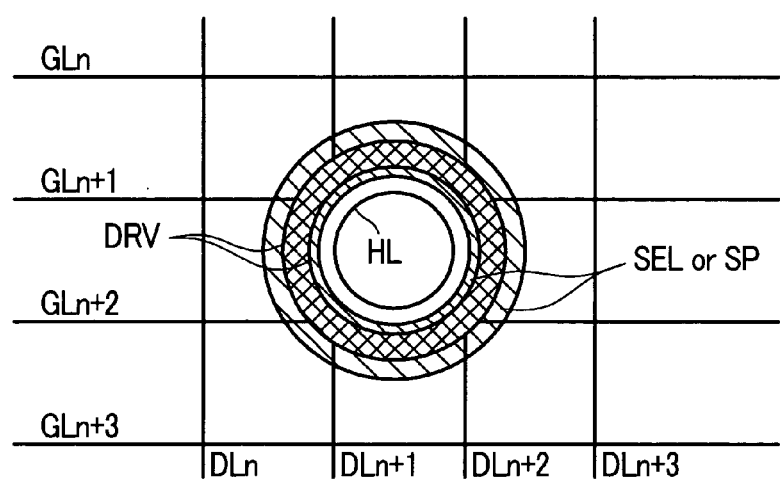

As an example of this embodiment, the holes HL are formed in the display region of the liquid crystal display panel PNL as shown in FIG. 19A. In this embodiment, as shown in FIG. 19B, a signal drive circuit DRV is formed around the periphery of the hole HL in a circular shape. The signal drive circuit DRV includes, for example, the scanning signal drive circuit V and the video signal drive circuit He and these circuits respectively supply the scanning signal to the gate signal lines GL which cross the hole HL and supply the video signal to the drain signal lines DL which -cross the hole HL.

The above-mentioned signal drive circuit DRV which is formed in a circular shape at the periphery of the hole HL is surrounded by sealing members SEL or columnar spacers SP which are respectively formed at an inner surface side and at an outer surface side of the signal drive circuit DRV.

In this case, it is needless to say that in each one of signal lines which are formed between the signal drive circuit DRV formed in the inside of the display region AR and the respective scanning signal drive circuits V1, V2 and the respective video signal drive circuits He1, He2 formed outside the display region AR, one new hole or less, that is, a hole which is not provided with a signal drive circuit at the periphery thereof, can be formed.

Embodiment 13

Figure 20:
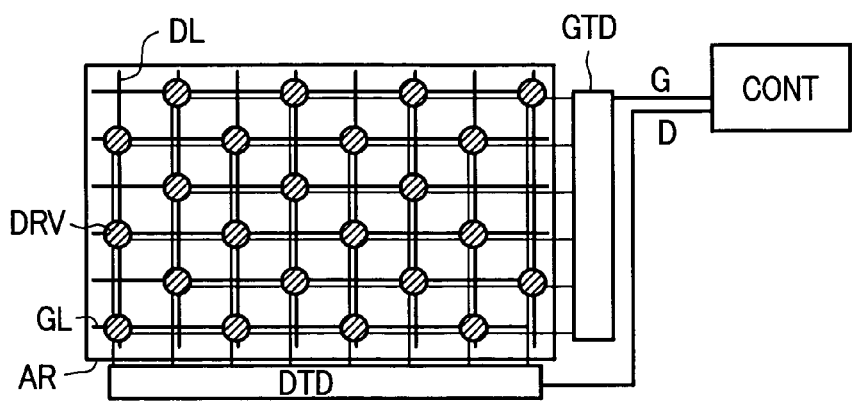
FIG. 20 is a schematic diagram showing another embodiment of the display device according to the present invention.

FIG. 20 shows a case in which a signal drive circuit DRV is formed at the periphery of each hole HL formed in the display region AR of the liquid crystal display panel PNL described above. That is, in this embodiment, using only these signal drive circuits DRV, the scanning signal is supplied to the respective gate signal lines GL and the video signal is supplied to the respective drain signal lines DL. That is, the respective signal drive circuits DRV are configured to respectively supply the scanning signal and the video signal to the gate signal lines GL and the drain signal lines DL which cross the respective signal drive circuits DRV.

In this case, since the respective signal drive circuits DRV are arranged in a scattered manner in the inside of the display region AR, it is necessary to specify the driving order. Accordingly, the respective signal drive circuits DRV are controlled by a gate timing driver GTD and a drain timing driver DTD which are formed outside the display region AR and the driving timing of these drivers is set. The supply of control signals from the respective timing drivers GTD, DTD to the signal drive circuits DRV is performed through signal lines which are formed on a liquid-crystal-side surface of the transparent substrate SUB1 on which, for example, the gate signal lines GL, the drain signal lines DL and the like are formed.

Here, each portion where the signal drive circuit DRV is formed is configured such that the nail NAL penetrates a center portion thereof. However, it is not always necessary to make the nails NAL penetrate all portions and it may be possible to make the nails NAL penetrate some selected arbitrary portions.

Embodiment 14

Figure 21:
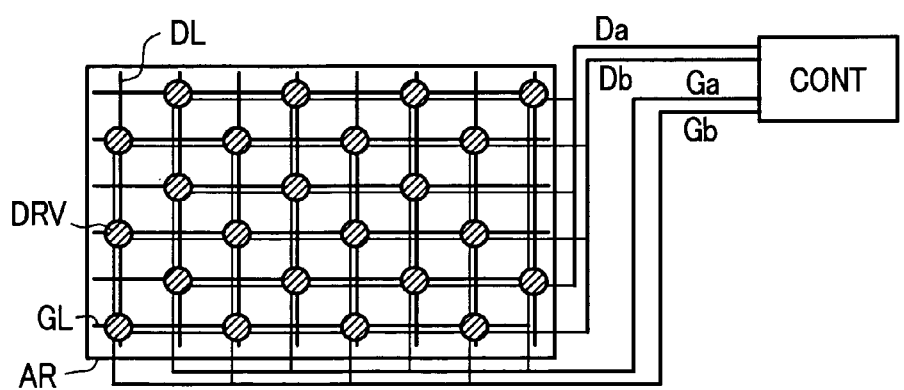
FIG. 21 is a schematic diagram showing another embodiment of the display device according to the present invention.

FIG. 21 shows another embodiment in which the liquid crystal display panel PNL has substantially the same constitution as the liquid crystal display panel PNL shown in FIG. 20. However, in this embodiment, the liquid crystal display panel PNL is not provided with the timing drivers GTD, DTD.

As shown in FIG. 21, to respective signal drive circuits DRV which are formed on respective gate signal lines GL, control signals Ga, Gb are supplied from a controller CONT. The control signal Ga is supplied to the respective signal drive circuits DRV formed on every other one of the drain signal lines DL and the control signal Gb is supplied to the respective signal drive circuits DRV formed on the other drain signal lines DL.

Further, to respective signal drive circuits DRV which are formed on respective drain signal lines DL, drain control signals Da, Db are supplied from the controller CONT. The control signal Da is supplied to the respective signal drive circuits DRV formed on every other one of the gate signal lines GL and the control signal Db are supplied to the respective signal drive circuits DRV formed on the other gate signal lines GL.

That is, the drain control signals Da, Db are supplied to the display region AR from the side which crosses the drain signal lines DL, while the gate control signals Ga, Gb are supplied to the display region AR from the side which crosses the gate signal lines GL. This method is completely opposite to the conventional method in which the drain signal is supplied from extended ends of the drain signal lines DL and the gate signal is supplied from extended ends of the gate signal lines GL.

In such a constitution, each signal drive circuit DRV in the inside of the display region AR can sequentially transfer the data to the next signal drive circuit DRV connected by the signal line. The signal drive circuit DRV stores the first arrived data as data for display in response to its own signal drive circuit and supplies the data including the data to be displayed by the next signal drive circuit DRV to the signal line as it is.

Accordingly, to the respective signal drive circuits DRV which are formed in the inside of the display region AR, the signals which correspond to the portions where the signal drive circuits DRV are positioned can be supplied respectively.

In this manner, by supplying the drain control signals from the direction which crosses the drain signal lines DL, it is possible to supply the proper data to all signal drive circuits DRV in the inside of the display region AR. In the same manner, by supplying the gate control signals from the direction which crosses the gate signal lines GL, it is possible to supply the proper data to all signal drive circuits DRV in the inside of the display region AR.

Here, with respect to the signal drive circuits DRV in the inside of the display region AR, by respectively positioning the signal drive circuits DRV on all lines, the respective gate signal lines GL are assembled into one bus line and the respective drain signal lines DL are assembled into one bus line, and, hence, the signals from the controller CONT can be supplied through these bus lines.

Due to such a constitution, the timing drivers GTD, DTD which are indicated in the embodiment shown in FIG. 20 become no longer necessary, and, hence, it is possible to realize a reduction of the cost, an enhancement of the yield rate and a reduction of the external display region space.

Further, when the signal drive circuits are provided for every one of the plural other lines (n other lines) (two other lines in the case shown in FIG. 21), the signal lines are assembled into n bus lines and the signals are supplied from the controller CONT by properly displacing the respective timings. When one signal drive circuit DRV in the inside of the display region AR controls plural lines, the reduction of the bus lines can be realized corresponding to the number of plural lines.

Further, it is needless to say that this concept is not limited to the case in which the hole HL is formed in the center of each signal drive circuit DRV and is applicable to a case in which these signal drive circuits DRV are arranged in a scattered manner including the signal drive circuits DRV which are not expected to be provided with holes HL.

Here, in the above-mentioned constitution, with respect to the drain control signals Da and Db and the gate control signals Ga, Gb, the respective data are outputted alternately. Accordingly, even when the signal drive circuits DRV are arranged every n other lines, it is possible to properly supply the data to the respective signal drive circuits DRV. It is needless to say that the usual scanning signal drive circuit V and the video signal drive circuit He are formed outside the display region AR and the signal may be supplied using the signal drive circuits DRV and these drive circuits V, He in combination.

Embodiment 15

Figure 22A:
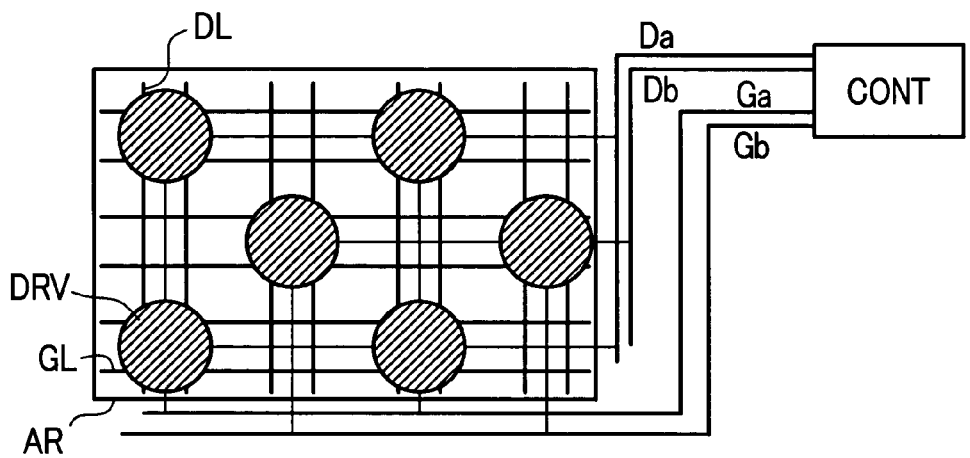
FIGS. 22A and 22B are schematic diagrams showing another embodiment of the display device according to the present invention.

FIG. 22A shows another embodiment in which the signal drive circuits DRV are arranged in the display region AR of the liquid crystal display panel PNL in a scattered manner. In this embodiment, each signal drive circuit DRV is configured to be allocated to supply signals to a plurality of signal lines. In the drawing, for example, one signal drive circuit DRV is allocated to two gate signal lines GL and two drain signal lines DL.

Further, with respect to the respective signal drive circuits DRV, to a group of signal drive circuits which is arranged in the x direction as seen in the drawing (extending direction of the gate signal lines GL), the drain control signal Da is supplied from the controller CONT to every other one with respect to another similar group of signal drive circuits, while to another similar group of signal drive circuits, the drain control signal Db is supplied from the controller CONT. Here, the signal lines which supply the drain control signals Da, Db are configured to be arranged substantially parallel to the gate signal lines GL.

Still further, with respect to the respective signal drive circuits DRV, to a group of signal drive circuits which is arranged in the y direction as seen in the drawing (extending direction of the drain signal lines DL), the gate control signal Ga is supplied from the controller CONT to every other one with respect to another similar group of signal drive circuits, while to another similar group of signal drive circuits, the gate control signal Gb is supplied from the controller CONT. Here, the signal lines which supply the gate control signals Ga, Gb are configured to be arranged substantially parallel to the drain signal lines DL.

In such a constitution, when each signal drive circuit DRV is allocated to m signal lines, first of all, data for m lines is inputted to the signal control circuit DRV from the drain control signal Da supplied from the controller CONT, and, thereafter, data for m lines is inputted to another signal drive circuit DRV from the drain control signal Db. Accordingly, the drain control signals Da, Db are alternately outputted for every data for m lines.

Further, after completion of scanning of m lines in response to the gate control signal Ga from the controller CONT, m lines are scanned in response to the gate control signal Gb for the next signal drive circuit DRV, and, thereafter, the scan data for m lines is again supplied in response to the gate control signal Ga.

Figure 22B:
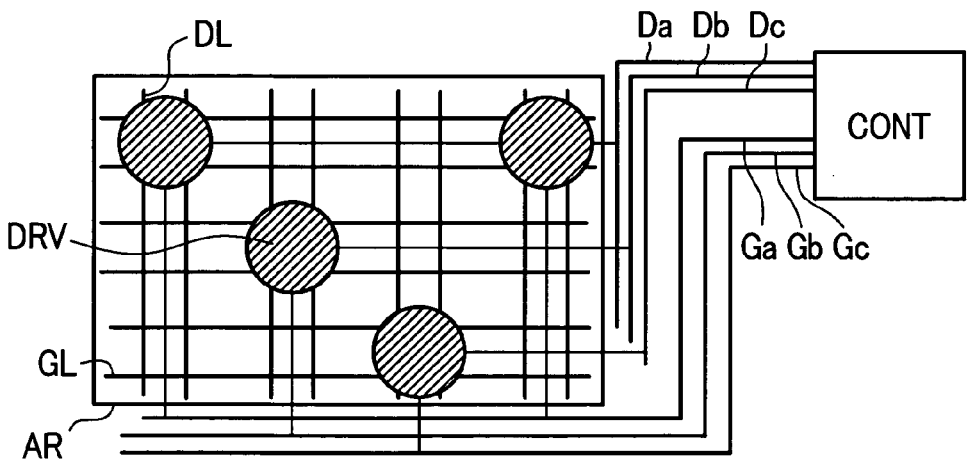

FIG. 22B shows the constitution of a modification of the embodiment shown in FIG. 22A. With respect to the respective signal drive circuits DRV, to a group of signal drive circuits which is arranged in the x direction as seen in the drawing (extending direction of the gate signal lines GL), the drain control signal Da is supplied from the controller CONT to every two other with respect to another similar group of signal drive circuits, while to one of the other remaining similar groups of signal drive circuits, the drain control signal Db is supplied from the controller CONT and to another of other remaining similar groups of signal drive circuits, a drain control signal Dc is supplied from the controller CONT.

Further, with respect to the respective signal drive circuits DRV, to a group of signal drive circuits which is arranged in the y direction as seen in the drawing (extending direction of the drain signal lines DL), the gate control signal Ga is supplied from the controller CONT to every two other with respect to the other group of signal drive circuits, while to one of the other remaining similar groups of signal drive circuits, the gate control signal Gb is supplied from the controller CONT and to another of the other remaining similar groups of signal drive circuits, a gate control signal Gc is supplied from the controller CONT.

In view of the above-mentioned constitution, the drain control signals and the gate control signals are not limited with respect to the number of data contained therein.

Embodiment 16

Figure 23A:
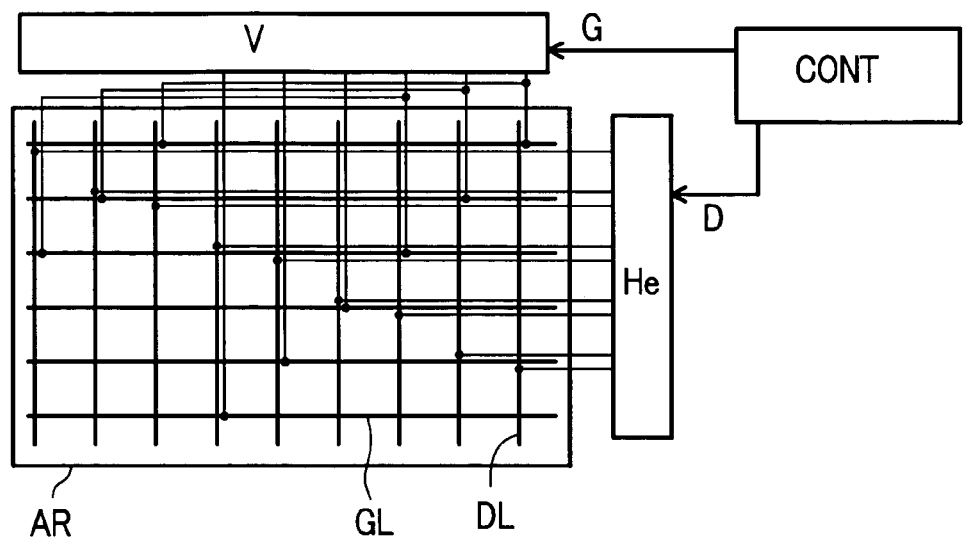
FIGS. 23A and 23B are schematic diagrams showing another embodiment of the display device according to the present invention.

FIG. 23A shows another embodiment in which the supply of the scanning signal to the respective gate signal lines GL formed in the liquid crystal display panel PNL is also performed by the scanning signal drive circuit V which is arranged parallel to the gate signal lines GL outside the display region AR and the supply of the video signal to the respective drain signal lines DL formed in the liquid crystal display panel PNL is also performed by the video signal drive circuit He which is arranged parallel to the drain signal lines DL outside the display region AR.

Here, in FIG. 23A, although not shown in the drawing, as shown in FIG. 17, for example, the scanning signal drive circuits V1, V2 are formed at both ends of the gate signal lines GL and the video signal drive circuits He1, He2 are formed at both ends of the drain signal lines DL.

The supply of the signal to one gate signal line GL from the scanning signal drive circuit V is performed at different portions in the inside of the display region AR through a plurality of signal lines, while the supply of the signal to one drain signal lines DL from the video signal drive circuit He is performed at different portions in the inside of the display region AR through a plurality of signal lines.

In such a case, to one gate signal line GL or to one drain signal line DL, the signal is supplied from four portions which are positioned different from each other, and, hence, when the holes HL are formed in the liquid crystal display panel PNL, the degree of freedom in the arrangement of the holes HL can be enhanced.

Figure 23B:
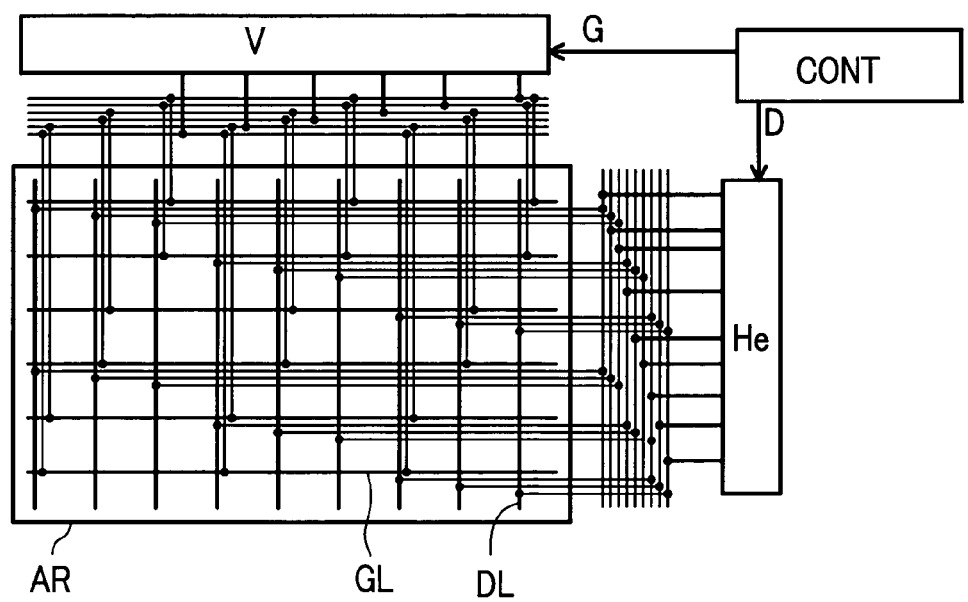

FIG. 23B shows an embodiment which is obtained by further modifying the constitution shown in FIG. 23A. Between the display region AR and the above-mentioned scanning signal drive circuit V, as well as between the display region AR and the above-mentioned video signal drive circuit He, a plurality of wiring layers which are arranged parallel to each other are formed. Through these wiring layers, the signal is supplied to the respective gate signal lines GL from the scanning signal drive circuit V at a plurality of portions and the signal is supplied to the respective drain signal lines DL from the video signal drive circuit He at a plurality of portions.

Due to such a constitution, it is possible to increase the number of signal supply portions which are positioned differently from each other for supplying the signals to the respective signal lines GL and DL.

Embodiment 17

Figure 24A:
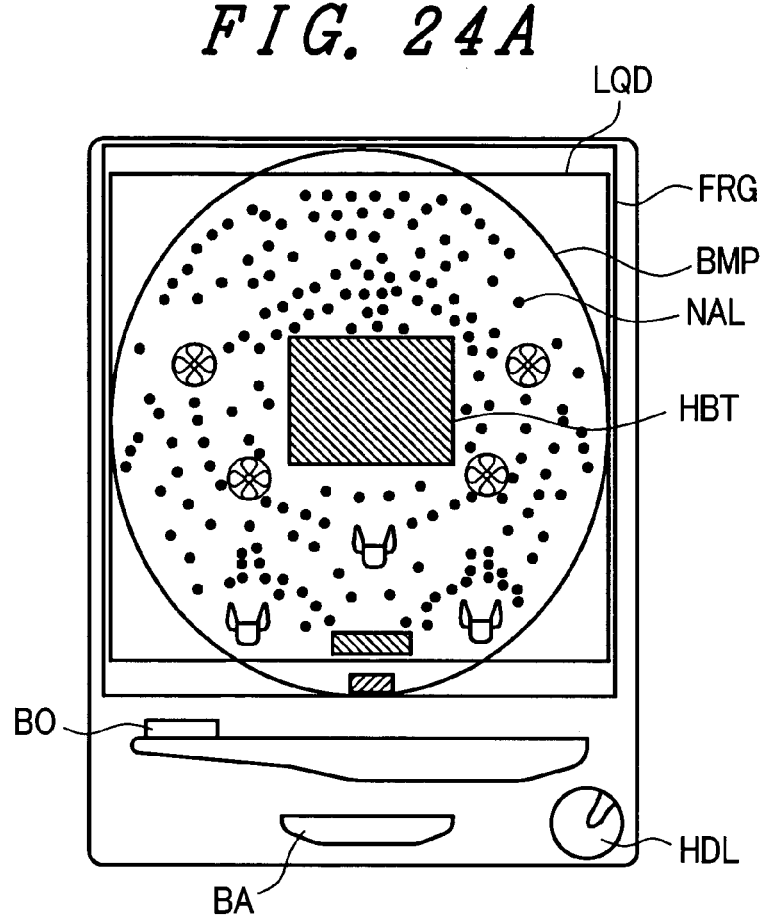
FIG. 24A is a front plan view and FIG. 24B is a diagram of a display portion thereof showing another embodiment of the pachinko game machine according to the present invention.
Figure 24B:
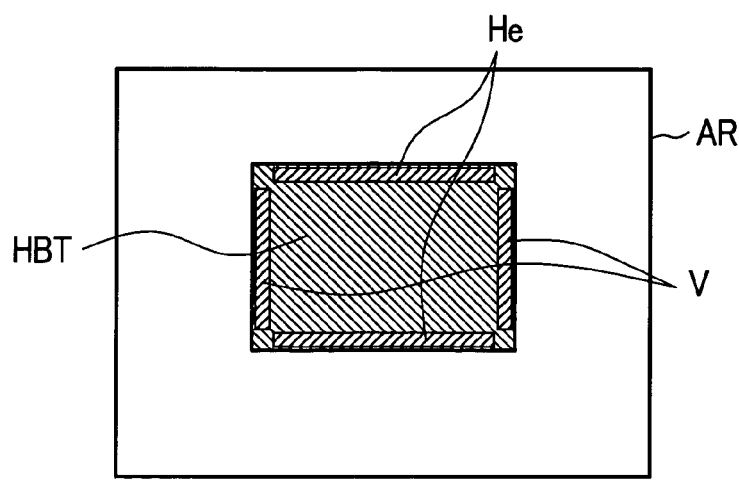

FIG. 24A shows a pachinko game machine in which there is a liquid crystal display device LQD which allows nails NAL to penetrate therethrough. In this embodiment, as shown in the drawing, a region which inhibits the penetration of the nails NAL(hole forming inhibition region HBT) is formed at a substantially center portion of the liquid crystal display device LQD. With respect to a portion of the liquid crystal display device LQD which corresponds to such a region, as shown in FIG. 24B, scanning signal drive circuits V and video signal drive circuits He are formed on a liquid crystal display panel PNL at a side of a surface of a substrate on which signal lines and the like are formed.

In this case, when the hole forming inhibition region HBT has a rectangular shape, the scanning signal drive circuits V are respectively formed along the respective y-direction sides and the video signal drive circuits He are respectively formed along the respective x-direction sides.

Due to such a constitution, it is possible to obtain an advantageous effect in that the scanning signal drive circuits V and the video signal drive circuits He can be respectively formed without being subjected to influence by the holes HL.

In this case, by also forming a scanning signal drive circuit and a video signal drive circuit outside the display region AR of the liquid crystal display panel PNL and by performing the display driving using these circuits and the scanning signal drive circuits V and the video signal drive circuits He inside the display region AR in combination, it is also possible to obtain an advantageous effect in that the liquid crystal display device LQD has a redundant structure.

Embodiment 18

Figure 25:
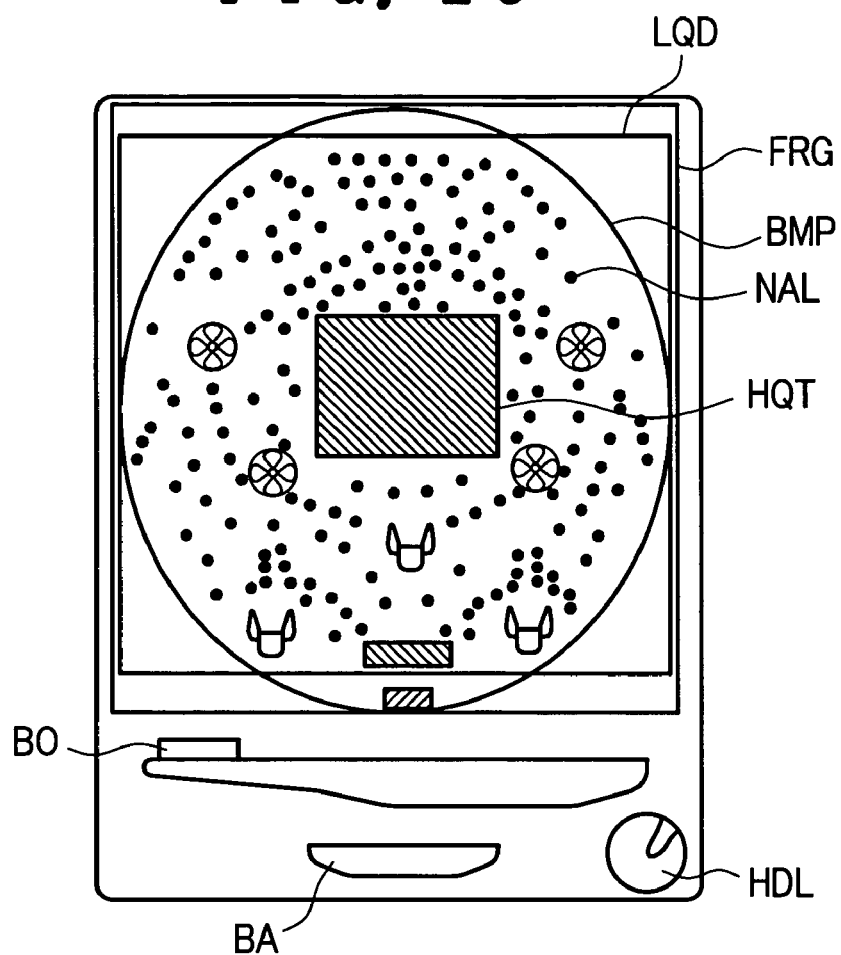
FIG. 25 is a front plan view showing another embodiment of the pachinko game machine according to the present invention.

FIG. 25 shows another embodiment. In the constitution shown in FIG. 24A, the region which is formed at a substantially center portion of the liquid crystal display device LQD and which does not include penetration of the nails NAL (hole forming inhibition region HBT) is formed as a region which can perform a display of higher resolution (high resolution region HQT) compared other peripheral regions.

In the pachinko game machine, a region which exhibits images and symbols of luckiness and unluckiness is preliminarily set and a player usually enjoys the game focusing his attention to such region. Accordingly, it is desirable that the information quantity that the region can display is large.

On the other hand, the information on other regions forms a kind of background, and, hence, an information quantity comparable to the information quantity of the high resolution region is unnecessary. Rather, it is more important to increase the yield rate and to reduce the cost by lowering the resolution of the other regions.

Further, the formation of holes and the driving of nails in the regions where the resolution is lowered can easily suppress the influence attributed to the holes and the nails.

Accordingly, it is extremely desirable to have a high resolution region and a low resolution region. Further, it is particularly preferable that the high resolution region is arranged in the low resolution region from the point of view of producing a feeling of integrity by making the low resolution region function as a background.

Here, an advantageous effect of this embodiment can be obtained by providing the high resolution region in the low resolution region. Accordingly, the embodiment is applicable to a display device or a game machine which has no holes in the low resolution region.

Embodiment 19

Figure 26A:
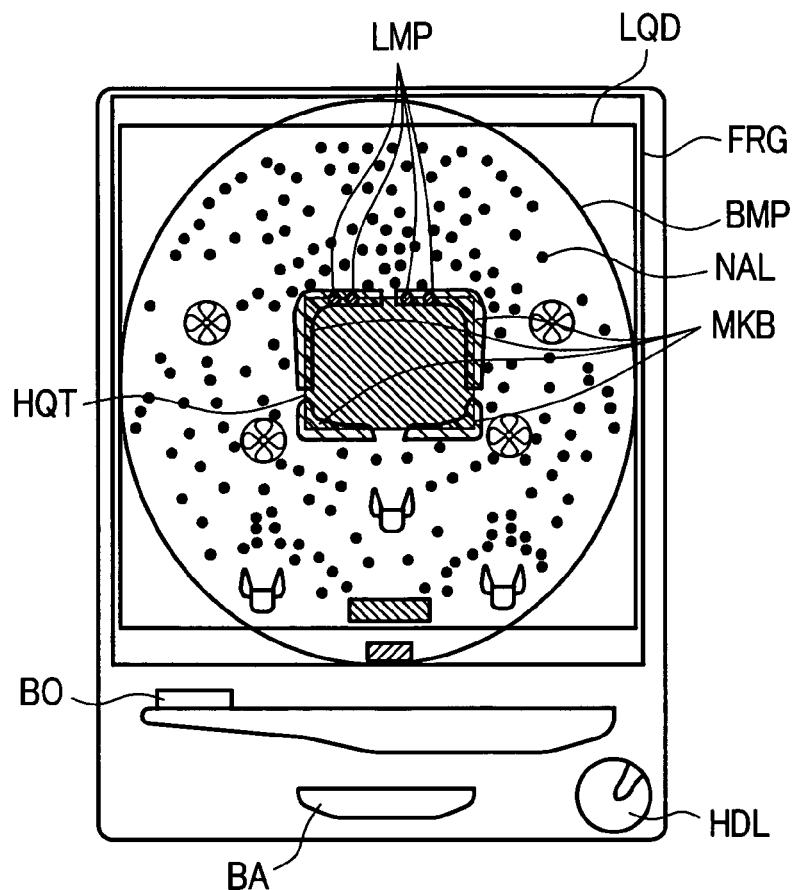
FIG. 26A is a front plan view and FIG. 26B is a diagram of a display portion thereof showing another embodiment of the pachinko game machine according to the present invention.
Figure 26B:
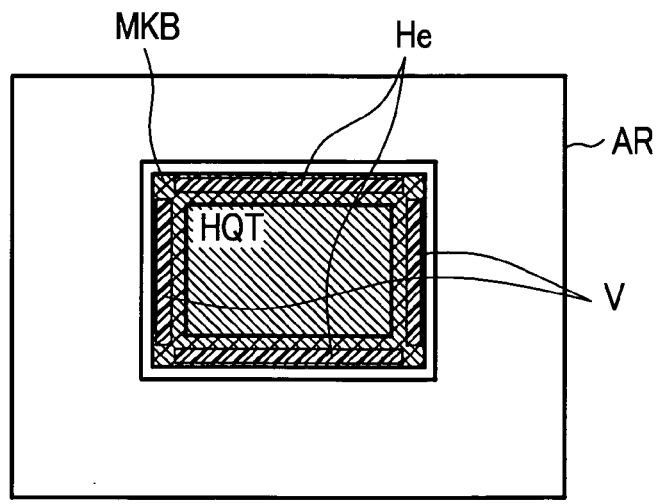

Further, FIG. 26A shows another embodiment in which, in the constitution shown in FIG. 25, an ornamental member MKB is provided to a boundary portion between the high resolution region HQT and the low resolution region LQT. Due to such a constitution, the connecting line between regions can be concealed by the ornamental member MKB, and, hence, it is possible to make it difficult for a player to be aware of the difference in resolution. As shown in FIG. 26B, in the inside of the liquid crystal display panel PNL disposed below the ornamental member MKB, the scanning signal drive circuits V and the video signal drive circuits He are arranged. It is more desirable that the ornamental member MKB is arranged to conceal the scanning signal drive circuits V and the video signal drive circuits He, thus concealing the non-display region constituted of the signal drive circuits. Further, it is possible to form the ornamental member MKB in a stereoscopic manner so as to control the movement of pachinko balls in case of a pachinko board or to incorporate a ball number display lamp LMP or the like into the ornamental member.

Here, in this embodiment, the high resolution region HQT is arranged at substantially the center of the liquid crystal display device LQD. However, it is needless to say that the embodiment is not limited to such a constitution and the high resolution region HQT may be arranged at a position which is displaced in the upper or lower direction or in the left or right direction from the center.

Embodiment 20

Figure 27A:
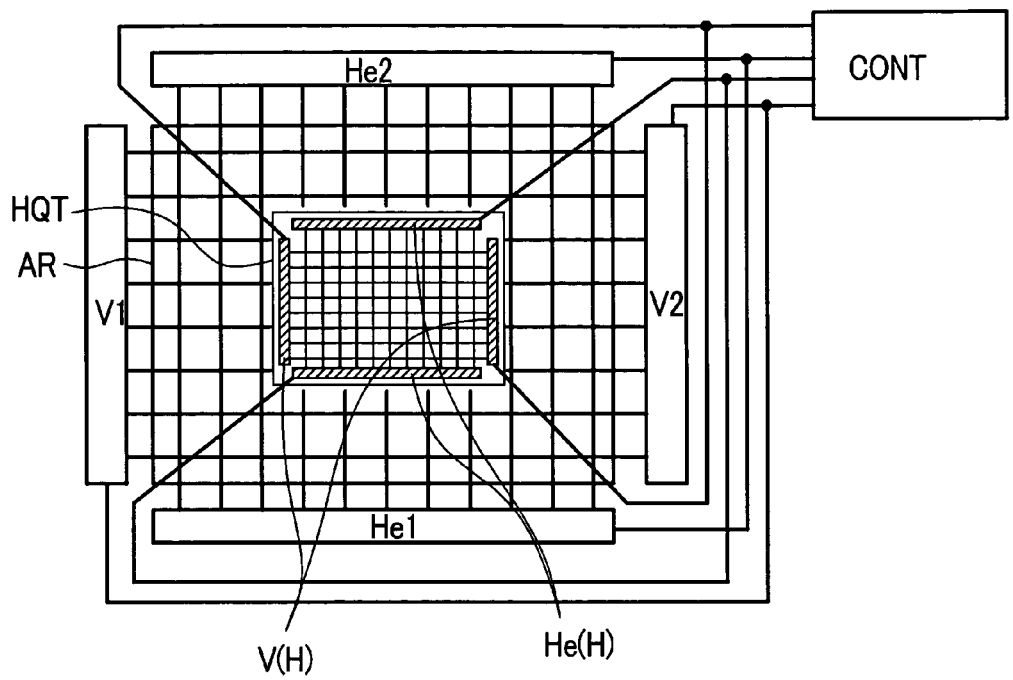
FIGS. 27A and 27B are schematic diagrams showing another embodiment of the display device according to the present invention.

FIG. 27A shows another embodiment. In the above-mentioned embodiment, the scanning signal drive circuit V(H) and the video signal drive circuit He(H) which perform the display driving of the portion of the high resolution region HQT and the scanning signal drive circuits V1, V2 and the video signal drive circuits He1, He2 which perform the display driving of the portion of low resolution region LQT are driven independently from each other.

As mentioned above, when the high resolution region HQT has a rectangular shape, the display driving of the high resolution region HQT is performed by the scanning signal drive circuits V(H) which are respectively formed along the respective y-direction sides and the video signal drive circuits He(H) which are respectively formed along the respective x-direction sides.

That is, from the controller CONT, the low resolution signal is supplied to the scanning signal drive circuits V1, V2 and the video signal drive circuits He1, He2 which are arranged outside the display region AR so as to drive the scanning signal drive circuits V1, V2 and the video signal drive circuit He1, He2, while the high resolution signal is supplied to the scanning signal drive circuits V(H) and the video signal drive circuit He(H) which are arranged inside the display region AR so as to drive the scanning signal drive circuits V(H) and the video signal drive circuit He(H).

Here, the area of a pixel of the high resolution region HQT is formed to be smaller than the area of a pixel of the low resolution region. Accordingly, the pitch between respective gate signal lines GL and the pitch between respective drain signal lines DL in the high resolution region HQT are set to be smaller than corresponding pitches in the low resolution region.

In the case shown in FIG. 27A, in the high resolution region HQT, the scanning signal drive circuits V1, V2 are respectively provided at both ends of the gate signal lines GL, the video signal drive circuits He1, He2 are respectively provided at both ends of the drain signal lines DL, and the signals are supplied to the respective signal drive circuits from the controller CONT.

Figure 27B:
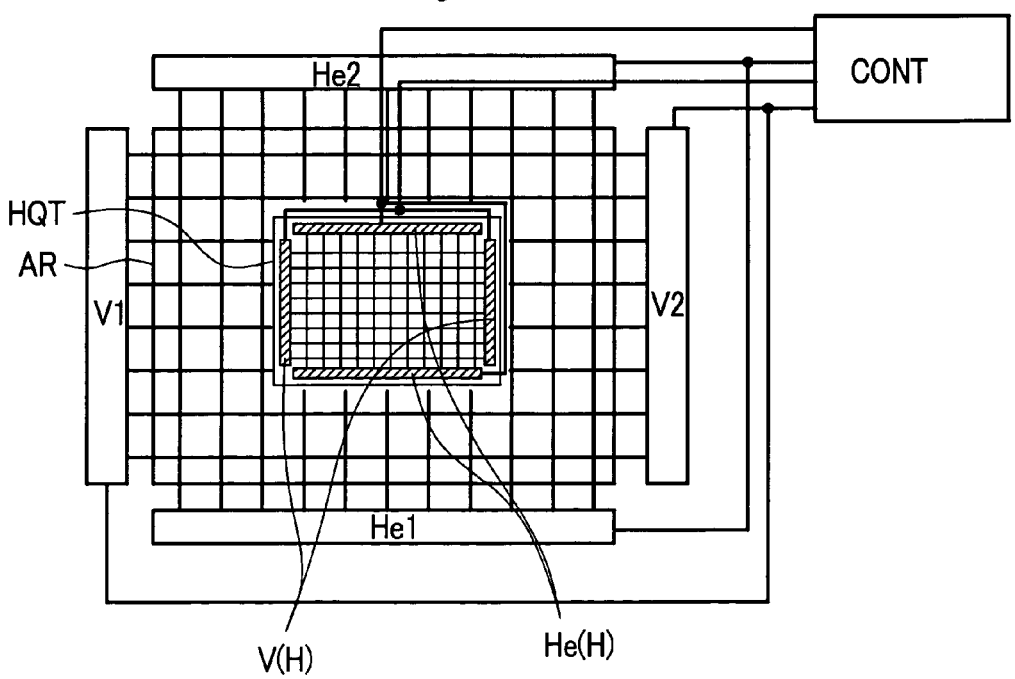

However, as shown in FIG. 27B, in the high resolution region HQT, a wiring layer which connects two scanning signal drive circuits V(H) and a wiring layer which connects two video signal drive circuits He(H) may be formed in the inside or in the vicinity of the high resolution region HQT, and the signals are supplied to the respective wiring layers from the controller CONT.

In such a case, as wiring layers (lead lines) which start from the controller CONT and cross the low resolution region for supplying the signal to the respective wiring layers, it is sufficient to provide only two wiring layers, and, hence, the cross capacitances generated by these two wiring layers and other wiring layers which cross two wiring layers can be reduced.

To the respective signal drive circuits of the high resolution region HQT, the signals having a frequency higher than the frequency of the signals to the gate signal lines GL and the drain signal lines DL in the low resolution region are transmitted, and, hence, the influence of the cross capacitances at the time of signal transmission is large. By adopting the above-mentioned constitution, it is possible to obtain a stable operation of the respective signal drive circuits in the high resolution region HQT.

Further, since lowering of the transmissivity attributed to the lead lines can be reduced or the non-display region can be reduced, it is possible to provide a constitution in which it is difficult to recognize the low resolution region with the naked eye.

Further, the region where the wiring layers to which the corresponding signal drive circuits of the high resolution region HQT are connected are formed may be formed into an ornamental region. For example, a wiring layer forming region may be used as a region where a mark which guides the pachinko balls is printed. In this case, the influence of the wiring layers on the display can be completely eliminated.

As another technique, a light shielding layer which defines the respective pixels may be formed in the inside of the liquid crystal display panel PNL, the light shielding layer may be formed in a shape which can shield the region where the wiring layers are arranged from light, and the shape is repeated to form a pattern which constitutes the light shielding layer on the low resolution region. This is because the numerical aperture of the low resolution region can be increased basically, and, hence, the influence of the light shielding layer is relatively small compared to the high resolution region HQT. In this case, the influence of the wiring layers on the display can be completely eliminated.

Here, it is preferable to set the pitch of respective pixels in the low resolution region to an integer times as large as the pitch of respective pixels in the high resolution region. This is because, based on the signal for high resolution region, it is possible to prepare the signal for low resolution region by merely discarding a portion of the data. Accordingly, the signal processing at the controller can be simplified, and, hence, the circuit size of the controller can be made compact whereby the enhancement of a yield rate and the reduction of cost can be realized.

Embodiment 21

FIGS. 28A to 28E are directed to another embodiment in which a transparent plate member TPB having a size larger than the size of the liquid crystal display device LQD is arranged on an upper surface of the liquid crystal display device LQD used in a pachinko game machine, a portion of the transparent plate member TPB corresponding to the display region AR of the liquid crystal display panel PNL in the liquid crystal display device LQD is made transparent (indicated by TR in the drawing) and the periphery of the transparent plate member TPB excluding the portion is colored (indicated by EC in the drawing).

Figure 28A:
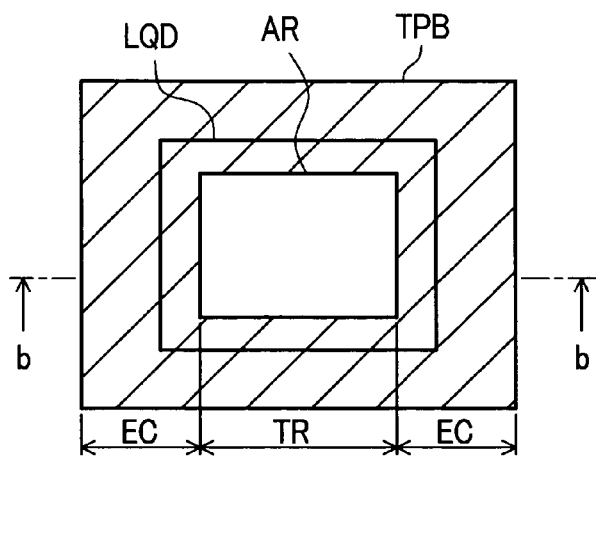
FIGS. 28A to 28E are diagrams showing another embodiment of the display device according to the present invention.
Figure 28C:
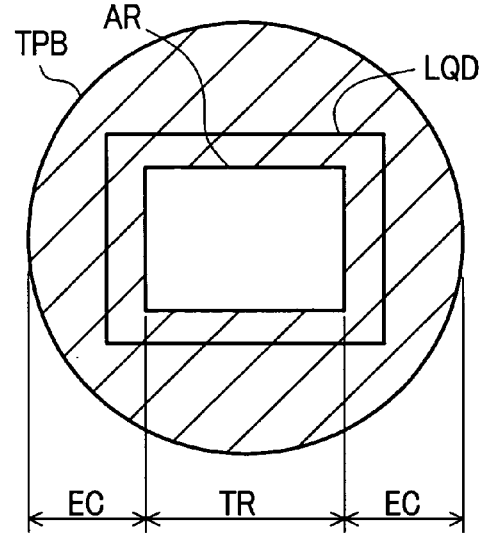
Figure 28B:
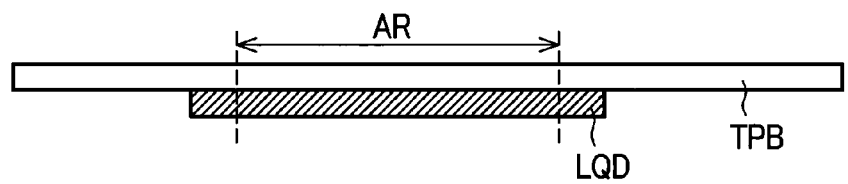

FIG. 28A is a plan view and FIG. 28B is a cross-sectional view taken along a line b-b in FIG. 28A.

The transparent plate member TPB is provided for making a player recognize that the display region AR and other portions around the display region AR constitute a plane which has no stepped portion. This is because that when a stepped portion exists in a boundary portion between the display region AR and the peripheries thereof in a surface to which the pachinko balls hit, it is difficult to provide the game machine that gives a continuous integral feeling.

Accordingly, by adopting the above-mentioned constitution, in appearance, the display region AR and the peripheral portion thereof are recognized as an integral body, and, hence, the drawback that the stepped portion is recognized with the naked eye can be overcome.

Further, by forming the colored portion at the periphery of the display region AR, the visual integral feeling of the display region AR and the periphery thereof can be enhanced. Further, it is also possible to have an advantageous effect in that the movement of the pachinko balls becomes smooth. Still further, even when the above-mentioned constitution is applied to a display device for exhibition, besides a game machine, a visual integral feeling can be obtained.

Here, when the constitution described in this embodiment is used for a display device or for a game machine, such as a pachinko game machine, the constitution is not always limited to the constitution which allows the nails to penetrate the liquid crystal display panel PNL. This is because that the above-mentioned advantageous effect can be also obtained by the constitution which inhibits the penetration of the nails through the liquid crystal display panel PNL.

In the case shown in FIG. 28A, the transparent plate member TPB uses a rectangular plate in the same manner as the liquid crystal display device LQD. However, it is needless to say that the transparent plate member TPB may have a circular shape, as shown in FIG. 28C.

Figure 28D:
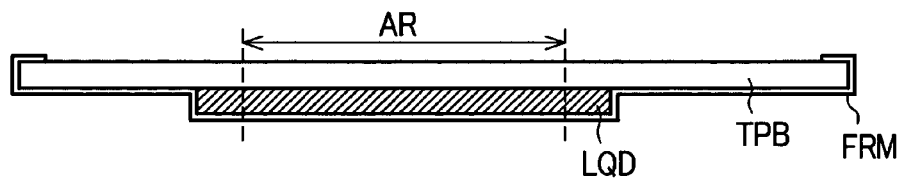

FIG. 28D shows a case in which, in the constitution shown in FIG. 28B, to fix and support the liquid crystal display device LQD to the transparent plate member TPB, they are integrally joined using a frame FRM. The frame FRM is arranged such that the frame FRM covers the liquid crystal display device LQD and a surface of the transparent plate member TPB at a side where the liquid crystal display device LQD is arranged, and a periphery of the frame FRM extends to a periphery of a viewer-side surface of the transparent plate member TPB and has an extended portion thereof caulked to the transparent plate member TPB.

Figure 28E:
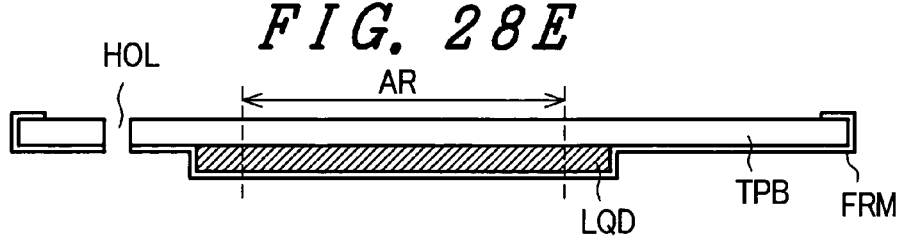

In this case, with respect to a member obtained by forming the liquid crystal display device LQD and the transparent plate member TPB into a module, since it is necessary to mount the one member to the other member, a hole HOL must be formed in the transparent plate member TPB. In this case, as shown in FIG. 28E, a hole HOL having the axis thereof aligned with the axis of a hole HOL may be preliminarily formed in the frame FRM.

Further, in this embodiment, the liquid crystal display device LQD is arranged on a back surface of the transparent plate member TPB. However, it is needless to say that the liquid crystal display panel PNL may be arranged on a back surface of the transparent plate member TPB. Further, it is also needless to say that the display device is not limited to a liquid crystal display device.

Embodiment 22

Figure 29A:
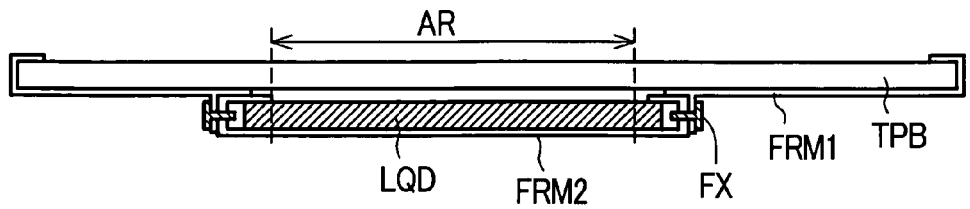
FIGS. 29A to 29C are cross-sectional views showing another embodiment of the display device according to the present invention.

FIG. 29A shows another embodiment which modifies the constitution shown in FIG. 28D. In this embodiment, a frame FRM2 which covers the side surfaces and the back surface of the liquid crystal display panel PNL and a frame FRM1 which covers regions of the side surfaces and the back surface of the transparent plate member TPB except for a region on which the liquid crystal display panel PNL is arranged are separately formed and, thereafter, the frame FRM2 and the frame FRM1 are connected using fixing members.

In this case, the connecting portions are set such that opposing portions are formed at portions of the frame FRM1 which covers the transparent plate member TPB and the opposing portions are connected to the frame FRM2 which covers the side surfaces of the liquid crystal display panel PNL, for example, using the fixing members FX, such as bolts.

Due to such a constitution, it is possible to facilitate the assembling of the liquid crystal display panel PNL and the transparent plate member TPB and the same liquid crystal display panel PNL can be used for various transparent plate members TPB.

Further, since impacts of the pachinko balls to the transparent plate member TPB can be transmitted to the liquid crystal display panel PNL by way of the fixing members FX, the attenuation of the impacts to the liquid crystal display panel PNL can be realized.

Figure 29B:
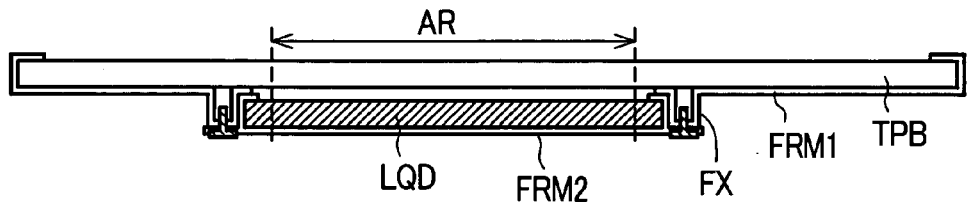

FIG. 29B shows another embodiment of the connecting portions between the frame FRM1 for covering the transparent plate member TPB and the frame FRM2 for covering the liquid crystal display panel PNL which are formed separately in the constitution shown in FIG. 29A.

With respect to the portions of the frame FRM2 for covering the transparent plate member TPB which covers the side surfaces of the liquid crystal display panel PNL, the frame FRM2 is folded at least at three portions to form planar surfaces which become parallel to a surface of the transparent plate member TPB. On the other hand, also with respect to the frame FRM2 which covers the liquid crystal display panel PNL, the surface thereof which is arranged parallel to the surface of the transparent plate member TPB is, for example, formed into extension portions of the frame FRM2. The extension portions are arranged to face the above-mentioned planar surfaces formed on the frame FRM1 for covering the transparent plate member TPB and the opposing portions are fixed to the frame FRM1 by the fixing members FX such as bolts, for example.

Figure 29C:
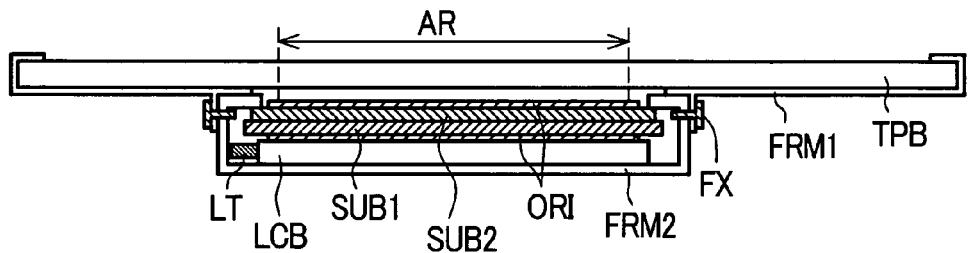

FIG. 29C shows another embodiment in which, in the constitution shown in FIG. 29A, the liquid crystal display panel PNL includes a backlight which is formed on the back surface thereof and the backlight is covered with the above-mentioned frames FRM1, FRM2.

The liquid crystal display panel PNL is configured such that an envelope is formed of the transparent substrates SUB1, SUB2 with liquid crystal (not shown in the drawing) disposed therebetween, an orientation film ORI is applied to a surface of the transparent substrate SUB1 opposite to the liquid crystal, and an orientation film ORI is applied to a surface of the transparent substrate SUB2 opposite to the liquid crystal. Further, the backlight is constituted of a light guide plate LCB having a size substantially equal to the size of the liquid crystal display panel PNL and, for example, a linear light source LT which extends along at least one of the side wall surfaces of the light guide plate LCB in the longitudinal direction of the side wall surface.

Further, it is needless to say that the display device is not limited to a liquid crystal display device. It is possible to obtain substantially the same advantageous effects by applying this embodiment to a self-luminous type display device, such as an EL display device.

Embodiment 23

Figure 30:
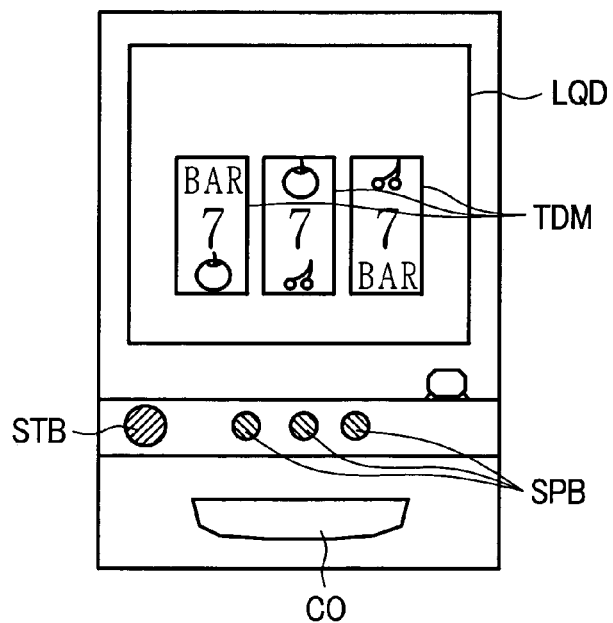
FIG. 30 is a front plan view showing one embodiment of a slot machine according to the present invention.

FIG. 30 is a front view showing one embodiment of a slot-machine-type game machine according to the present invention.

In the slot-machine-type game machine, three rotary drums are arranged at a center portion thereof in a state such that three drums TDM have rotary shafts which are coaxial in the horizontal direction. Accordingly, a player can observe only portions of the outer surface of the respective rotary drums TDM with the naked eye.

When the player pushes a start button TB which is provided at a lower portion of the game machine, the respective rotary drums TDM are rotated and the surfaces thereof are moved; and, thereafter, when the player pushes three stop buttons SPB arranged in the vicinity of the start button STB, the rotary drums TDM corresponding to the respective stop buttons SPB are stopped.

In a stage that the respective rotary drums are stopped, when marks which are depicted on side surfaces of the respective rotary drums TDM are all equal (7, 7, 7, as seen in the drawing), a large number of coins are discharged from a coin discharge opening CO which is provided at a lower portion of the slot-machine-type game machine.

Here, in this embodiment, a liquid crystal display device LQD is arranged within a range which extends outwardly from a portion where the respective rotary drums TDM are arranged. In other words, the liquid crystal display device LQD having a relatively large area is arranged on the whole surface of the slot-machine-type game machine and a see-through window is formed in one portion of the region of the liquid crystal display device LQD except for at least a periphery thereof, and the side surfaces of the rotary drums TDM can be observed through the see-through window with the naked eye.

Information containing images and letters or the like can be displayed on the liquid crystal display panel PNL.

Due to such a constitution, it is possible to have an advantageous effect that although the player focuses his attention to the side surfaces of the respective rotary drums TDM in the midst of the game, the player can extremely easily observe also the information of the liquid crystal display device LQD displayed in the periphery of the respective rotary drums TDM. That is, since the positions of the information which are displayed by the respective rotary drums TDM and the liquid crystal display device LQD are extremely close to each other, the viewer can recognize these information with a feeling of integrity.

Embodiment 24

FIG. 31A shows another embodiment of the liquid crystal display device LQD and the rotary drums TDM which are arranged on the back surface of the liquid crystal display device LQD of the slot-machine-type game machine shown in FIG. 30. That is, FIG. 31A is a cross-sectional view as viewed from a rotary axes side of the rotary drums TDM.

Although the outer surfaces of the rotary drums TDM can be observed through the see-through window formed in the liquid crystal display device LQD with the naked eye, in this embodiment, the see-through window is formed of a hole HL formed in the surface of the liquid crystal display device LQD.

FIG. 31B is a view showing the hole HL formed in the liquid crystal display device LQD. As shown in FIG. 31C, due to the provision of the hole HL, a liquid crystal filling region in the inside of the liquid crystal display device LQD becomes an annular region except for the above-mentioned hole HL portion. FIG. 31C shows a state in which a sealing material SEL (or a spacer) which defines the annular region is interposed in the inside of the liquid crystal display panel PNL, that is, between the transparent substrates SUB1 and SUB2. Here, in drawings arranged below FIG. 31C, the liquid crystal display panel PNL is depicted as a liquid crystal display panel having a light guide plate LCB which constitutes one constitutional member of a backlight at the back surface thereof.

In this manner, by forming the hole HL as the see-through window for observing the side surfaces of the rotary drums TDM of the liquid crystal display device LQD, it is possible to arrange the rotary axes of the rotary drums TDM close to the liquid crystal display device LQD side and hence, it is possible to obtain an advantageous effect that the player can observe the side surfaces of the rotary drums TDM at a position close to his eyes.

FIG. 31D shows a state in which, even when the hole HL is formed in the liquid crystal display device LQD, it is possible to normally operate pixels of the liquid crystal display panel PNL in the periphery of the hole HL. By providing a pair of video signal drive circuits He which face each other in an opposed manner with the hole HL sandwiched therebetween and a pair of scanning signal drive circuits V which face each other in an opposed manner with the hole HL sandwiched therebetween, even in a state that the gate signal lines GL which connect the respective scanning signal drive circuits V to both ends thereof and the drain signal lines DL which connect the respective video signal drive circuits He to both ends thereof are disconnected by the holes HL, it is possible to normally operate the respective pixels in the region except for the region of the hole HL. The same goes for a case in which holes are provided for allowing nails to penetrate a liquid crystal display panel PNL of a pachinko game machine.

FIG. 31E shows a constitution in which, for example, a backlight is arranged on a back surface of the liquid crystal display panel PNL, and these parts are formed into a module using a frame FRM which is arranged on a back surface of the backlight. In this case, a hole HL which has a center axis thereof aligned with the center axis of the hole HL formed in the liquid crystal display panel PNL is also formed in the frame FRM.

Further, FIG. 31F shows a constitution in which, in the constitution shown in FIG. 31E, the hole HL portion of the frame FRM is plugged by a transparent member TRP.

Embodiment 25

Figure 32A:
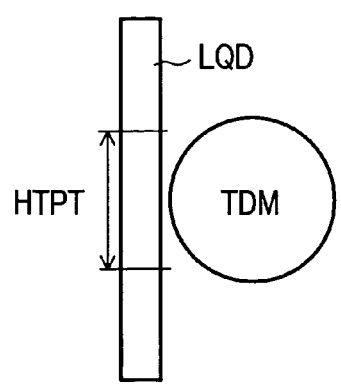
FIG. 32A is a diagram and FIGS. 32B to 32E are cross-sectional viewsshowing another embodiment of the display device according to the present invention.

FIG. 32A shows another embodiment of the portion of the liquid crystal display device LQD through which the outer surfaces of the rotary drums TDM can be observed with the naked eye. This portion constitutes a portion of the liquid crystal display device LQD and, at the same time, the portion constitutes a region having high transmissivity (high transmissivity region HTPT).

In the liquid crystal display device LQD having such a constitution, it is no longer necessary to form the hole HL which is formed in the previously-mentioned embodiment and hence, the reliability of the liquid crystal display device LQD per se can be enhanced.

Figure 32B:
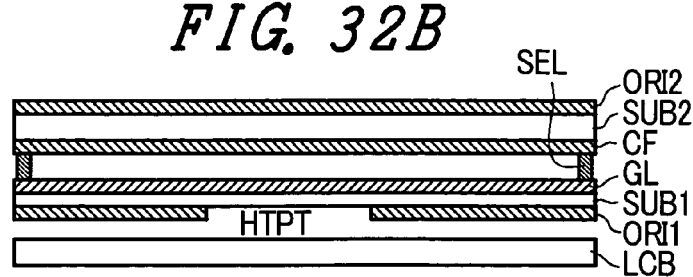

FIG. 32B is a cross-sectional view showing the above-mentioned liquid crystal display device LQD per se or the high transmissivity region HTPT of the liquid crystal display panel PNL assembled into the liquid crystal display device LQD, wherein they are shown together with a light guide plate LCB which constitutes one constitutional member of a backlight.

The liquid crystal display panel PNL forms an envelope using transparent substrates SUB1, SUB2 which are arranged to face each other in an opposed manner with liquid crystal disposed therebetween. Then, a polarizer ORI2 is formed on a player-side surface of the transparent substrate SUB2 and color filters CF are formed on a liquid-crystal-side surface of the transparent substrate SUB2, while an electronic circuit including signal lines and the like is formed on a liquid-crystal-side surface of the transparent substrate SUB1.

Further, although a polarizer ORI1 is formed on a surface of the transparent substrate SUB1 opposite to the liquid crystal, the polarizer ORI1 is configured such that in a region through which the above-mentioned rotary drums TDM are observed with naked eyes is, polarizer ORI1 cut out.

That is, in the liquid crystal display panel PNL having the usual constitution, by cutting out the polarizer ORI at one substrate side, a region formed by cutting can constitute the high transmissivity region HTPT and the normal pixel display is performed on regions other than the high transmissivity region HTPT.

Figure 32C:
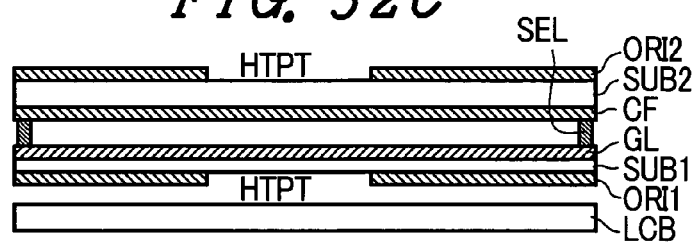

FIG. 32C shows another embodiment of the high transmissivity region HTPT of the liquid crystal display panel PNL. In this embodiment, besides the cut-out portion formed in the polarizer ORI at one substrate side, a cut-out portion which has a center axis thereof aligned with a center axis of the cut-out portion formed in one substrate side is formed in the polarizer ORI at the other substrate side. Due to such a constitution, it is possible to constitute the high transmissivity region having the transmissivity approximately twice as large as the transmissivity of the high transmissivity region of the constitution shown in FIG. 32B.

According to this embodiment, by cutting out the polarizer, it is possible to realize the partially high transmissivity region in the display device. Here, the whole layers of the polarizer may be cut out. However, the polarizer also has a function of preventing ultraviolet rays from giving adverse influence to the liquid crystal layer besides the object to polarize the light. Accordingly, when the whole layers are simply cut out, although the high transmissivity region may be realized, it is necessary to change the material of the liquid crystal to a material which exhibits strong resistance to ultraviolet rays to ensure a life of the liquid crystal which is equal to the life of liquid crystal in the conventional liquid crystal display device.

Accordingly, in place of cutting out the whole layers, by adopting a method which simply reduces the number of layers of the polarizer, it is possible to obtain the absorption of the ultraviolet rays while enhancing the transmissivity. Further, these advantageous effects can be obtained by reducing a thickness of the polarizer in place of cutting out the polarizer at the high transmissivity region. In this case, the maintenance of an image display can be realized. Further, even when the polarizer is cut out, by providing a UV ray shielding layer which substantially absorbs light in the ultraviolet-ray band and allows light in a visible range to pass therethrough to the polarizer, both of the absorption of ultraviolet rays and the enhancement of the transmissivity can be realized. The UV ray shielding layer may be constituted of any one of layers of the polarizer. Further, the UV ray shielding layer may be formed as a member separately from the polarizer.

Still further, in place of cutting out the polarizer, the polarization degree of the polarizer may be lowered at the high transmissivity region.

These structures can be easily understood and depicted on the drawing based on the above-mentioned explanation.

Figure 32D:
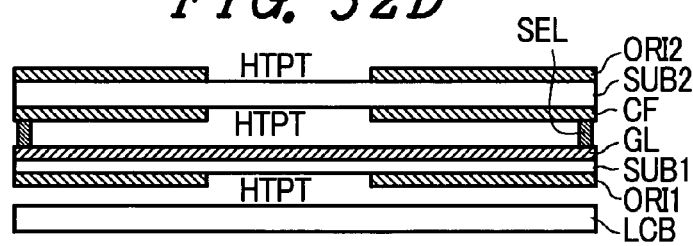

FIG. 32D is a view which shows an improvement of the constitution shown in FIG. 32C. For example, the color filters CF which are formed on the liquid-crystal-side surface of the transparent substrate SUB2 are also cut out at a portion corresponding to the high transmissivity region HTPT.

A large number of pixels are arranged in the high transmissivity region HTPT and these pixels include the color filters CF of respective colors consisting of red (R), green (G), blue (B), wherein the color filter CF of one color, for example, R has a function of absorbing colors G and B. Accordingly, due to the presence of the color filters CF, the brightness is reduced to one third or less. In view of the above, the cut-out region of the color filter CF exhibits the brightness three times as large as the brightness of the non-cut-out portion of the color filter CF and hence, the high transmissivity can be realized.

Figure 32E:
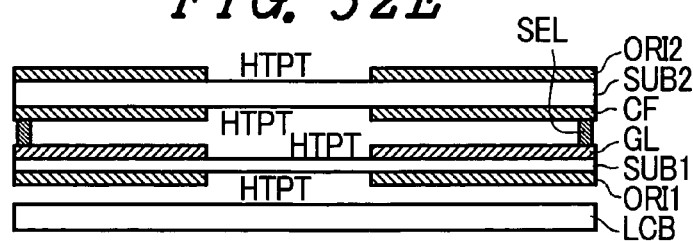

FIG. 32E is a view which shows an improvement of the constitution shown in FIG. 32D. That is, on a liquid-crystal-side surface of the transparent substrate SUB1, at a portion corresponding to the high transmissivity region HTPT, the pixels per se including signal lines and electrodes are not formed. Due to the non-presence of the signal lines, the electrodes and the like, the brightness is enhanced whereby the high transmissivity in the high transmissivity region HTPT is further enhanced.

In this case, by providing a pair of video signal drive circuits He which face each other in an opposed manner with the high transmissivity region HTPT therebetween and a pair of scanning signal drive circuits V which face each other in an opposed manner with the high transmissivity region HTPT therebetween, even in a state that the gate signal lines GL which connect the respective scanning signal drive circuits V to both ends thereof and the drain signal lines DL which connect the respective video signal drive circuits He to both ends thereof are disconnected by the high transmissivity region HTPT, it is possible to normally operate the respective pixels in the region except for the region of the high transmissivity region HTPT.

Embodiment 26

Figure 33A:
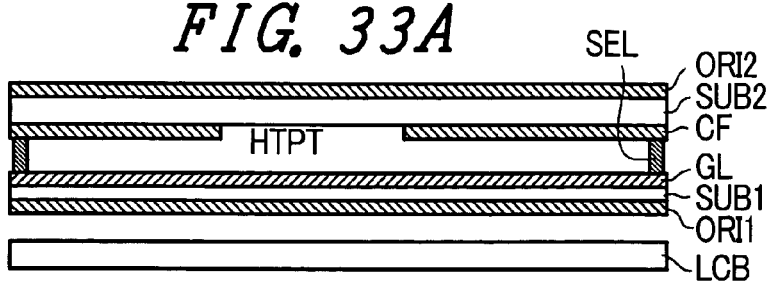
FIGS. 33A, 33B and 33D are cross-sectional views

FIG. 33A shows another embodiment of the high transmissivity region HTPT of the liquid crystal display panel PNL through which the side surfaces of the rotary drums TDM can be observed with naked eyes and corresponds to FIG. 32E.

In this drawing, there is a constitution in which only the color filters CF in the region of the transparent substrate SUB2 corresponding to the high transmissivity region HTPT are cut out.

When the polarizer ORI is cut out as in the case of the previous embodiment, it is impossible to obviate a drawback that the display cannot be produced in the cut-out region. In the production of a feeling of visual integrity with the rotary drums TDM and in the realization of various image effects, to enable the display of the portion increases the versatility in view of the nature of the game.

Accordingly, as described above, in the portion corresponding to the high transmissivity region HTPT, by cutting out only the color filter CF, the maintenance of the display and the increase of brightness three times are realized.

In this case, by cutting out the color filter CF, the region becomes a white-and-black display. However, it is possible to realize various image effects such as a blinking effect by changing the brightness of the screen.

Figure 33B:
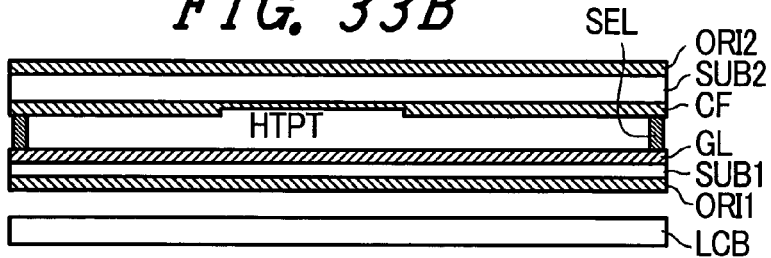

Further, as shown in FIG. 33B, without completely cutting out the color filter CF in the high transmissivity region HTPT, the thickness of the color filter CF may be decreased compared to other regions. In this case, it is possible to realize additional various effects, and, hence, it is possible to obtain both of the enhancement of brightness and the versatility of the visual effects.

Figure 33C:
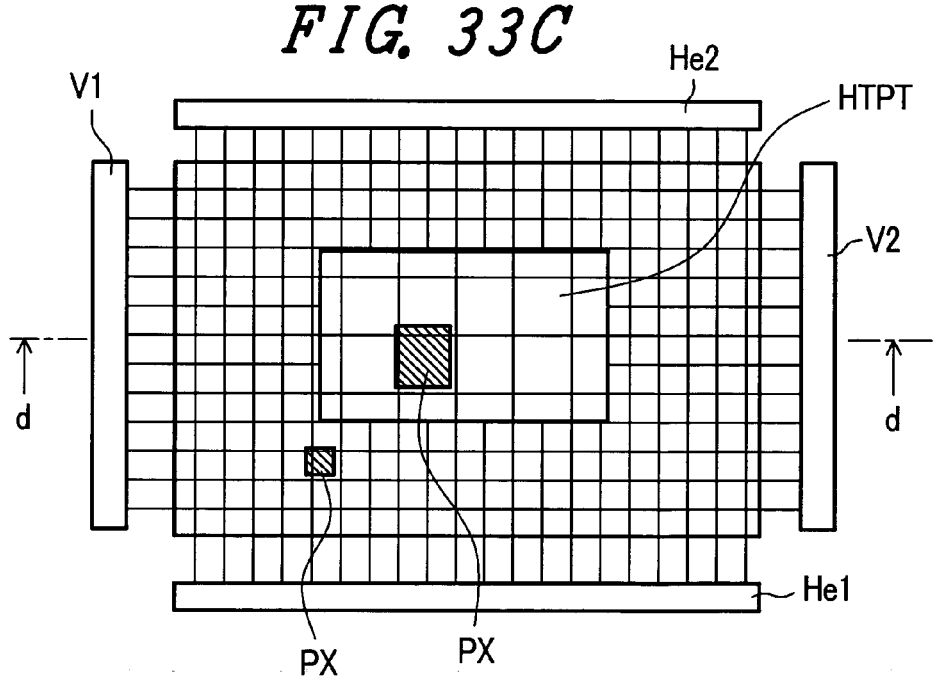

FIG. 33C is a plan view showing another embodiment in which the high transmissivity region HTPT is formed in the portion of the liquid crystal display panel PNL.

In the drawing, the size of the pixels in regions of the liquid crystal display panel PNL other than the abovementioned high transmissivity region HTPT has a normal size and is set larger than the size of the pixels in the high transmissivity region HTPT.

Accordingly, in the high transmissivity region HTPT of the liquid crystal display panel PNL, an interval between the gate signal lines GL and an interval between the drain signal lines DL are set larger than corresponding intervals in other regions.

Further, in more detail, the gate signal lines GL and the drain signal lines DL in the high transmissivity region HTPT are formed by directly extending the gate signal lines GL and the drain signal lines DL in other regions except for the high transmissivity region HTPT every several other lines.

Figure 33D:

Here, in this embodiment, as shown in FIG. 33D, which is a cross-sectional view taken along a line d-d in FIG. 33C, the polarizers ORI and the color filters CF are not cut out. However, it is needless to say that, as explained in conjunction with the previous embodiment, when necessary, the polarizers ORI or the color filters CF in the high transmissivity region HTPT may be cut out.

In this manner, by setting the size of the pixels in the high transmissivity region HTPT larger than the size of the pixels in other regions, the number of lines and electrodes which constitute light shielding objects can be reduced and hence, a so-called numerical aperture can be enhanced whereby the transmissivity of the region can be enhanced.

In this case, it is desirable that an expansion rate of the pixel is set equal with respect to the direction of the drain signal lines DL and the direction of the gate signal lines GL.

Here, in the region where the size of the pixels is large, it is possible to properly perform a color display by changing the arrangement of the color filters CF in conformity with the size of the pixels.

Embodiment 27

Figure 34A:
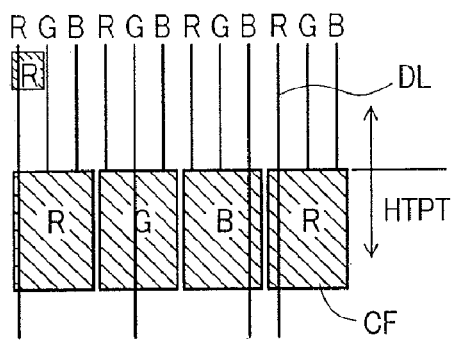
FIGS. 34A to 34F are diagrams showing another embodiment of the display device according to the present invention.

FIG. 34A is a view showing, in the constitution shown in FIG. 33C, the positional relationship between the respective color filters CF of red (R), green(G), blue(B) in each pixel in the high transmissivity region HTPT and the drain signal lines DL in regions other than the high transmissivity region HTPT. Here, the drawing also shows the pixel (for example, the pixel which is allocated to red(R)) to which the video signal is supplied from the drain signal lines DL in other regions except for the high transmissivity region HTPT.

In this embodiment, the size of the respective pixels is set such that the drain signal line DL which is allocated to at least one or more red (R) is extended to the pixel allocated to red (R) in the high transmissivity region HTPT, the drain signal line DL which is allocated to at least one or more green (G) is extended to the pixel allocated to green (G) in the high transmissivity region HTPT, and the drain signal line DL which is allocated to at least one or more blue (B) is extended to the pixel allocated to blue (B) in the high transmissivity region HTPT.

Then, the video signals are supplied to the respective pixels in the high transmissivity region HTPT through the drain signal lines HL to which the video signals of colors corresponding to the respective pixels are supplied.

Due to such a constitution, in the respective pixels in the high transmissivity region HTPT, it is possible to perform the normal display of the respective colors consisting of R, G and B. Further, it is possible to enlarge the size of the pixels without requiring the special signal processing.

This can be easily realized by setting the size of the pixels in the high transmissivity region HTPT to 3n times (n being an integer) of the size of the pixels in the neighboring non-high-transmissivity region. Here, the size of the pixels in at least one of the longitudinal direction and the lateral direction is set 3n times larger than the size of the pixels in the non-high-transmissivity region. It is more preferable to set the size of the pixels in both of the longitudinal direction and the lateral direction 3n times larger than the size of the pixels in the non-high-transmissivity region.

Figure 34B:
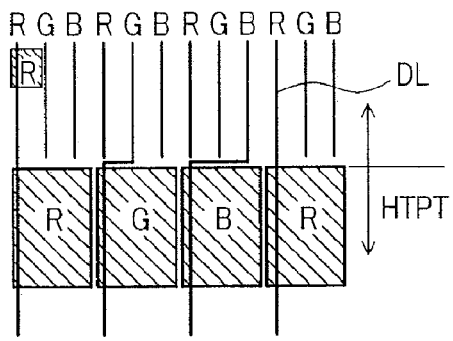

FIG. 34B shows an improvement of the constitution shown in FIG. 34A. In the drawing, when the drain signal lines DL to which the video signals of colors corresponding to respective pixels in the high transmissivity region HTPT are supplied are extended from other regions except for the high transmissivity region HTPT, to position the drain signal lines DL at one side of the pixels, the drain signal lines DL are bent.

In this case, some drain signal lines DL in the high transmissivity region HTPT may be formed by directly extending the drain signal lines DL from other regions except for the high transmissivity region HTPT, other drain signal lines DL in the high transmissivity region HTPT are formed by once bending the drain signal lines DL from other regions by 90° and extending in a horizontal direction in the vicinity of the pixels in the high transmissivity region HTPT and, thereafter, by further bending these drain signal lines DL by 90° such that these drain signal lines DL extend along one side of the pixels.

Due to such a constitution, it is possible to make the respective pixels in the high transmissivity region HTPT have the same constitution whereby it is possible to obtain an advantageous effect that numerical apertures of respective pixels can be made uniform.

Figure 34C:
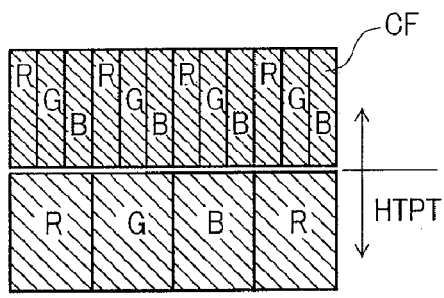

FIG. 34C shows an embodiment in which, in the constitution shown in FIG. 34A and FIG. 34B, the arrangement of color filters CF in respective pixels is shown such that the difference of colors of respective color filters CF becomes apparent. In this case, it is preferable that a black matrix is formed on a substrate side on which these color filters CF are formed and, using this black matrix, the color filters CF are formed in conformity with the sizes and shapes of respective pixels in the high transmissivity region HTPT and the other regions except for the high transmissivity regions HTPT.

Here, the above-mentioned display device is explained with respect to the liquid crystal display panel PNL, this embodiment is also applicable to an organic EL display panel PNL, a fluorescent display panel PNL and the like having a self luminous function, for example. For example, when a high transmissivity region is formed in the panel, the panel may adopt the constitution in FIG. 34D or FIG. 34E.

Figure 34F:
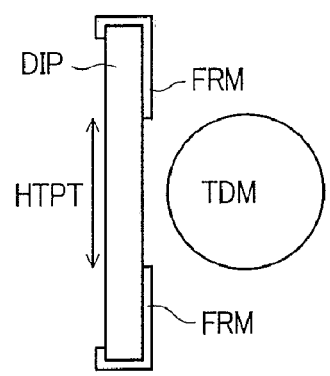
Figure 34D:
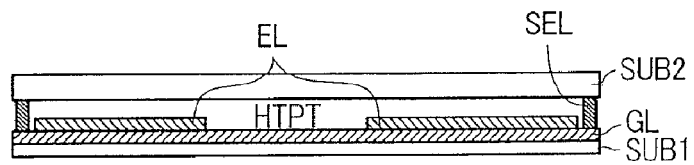
Figure 34E:
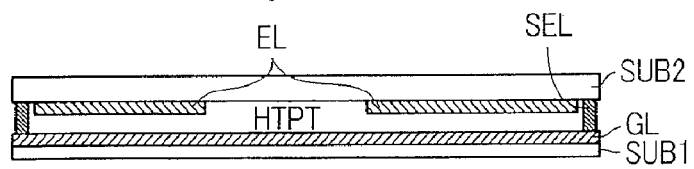

FIG. 34D shows a case in which light emitting bodies or fluorescent bodies EL are formed on the substrate SUB1 side on which the gate signal lines GL, for example, are formed, wherein the light emitting bodies or the fluorescent bodies EL which are formed in the high transmissivity region HTPT are cut out. FIG. 34E shows a case in which light emitting bodies or fluorescent bodies EL are formed on another substrate SUB2 side which is arranged to face the substrate SUB1 on which the gate signal lines GL, for example, are formed, wherein the light emitting bodies or fluorescent bodies EL which are formed in the high transmissivity region HTPT are cut out.

Further, also in these cases, as shown in FIG. 34F, a back surface of a display device DIP such as the organic EL display panel PNL, the fluorescent display panel PNL or the like is covered with a frame FRM, and a portion of the frame FRM which faces the rotary drums TDM in an opposed manner, that is, a region of the frame FRM which corresponds to the high transmissivity region HTPT may be cut out.

Embodiment 28

Figures 35A, 35B, 35C:
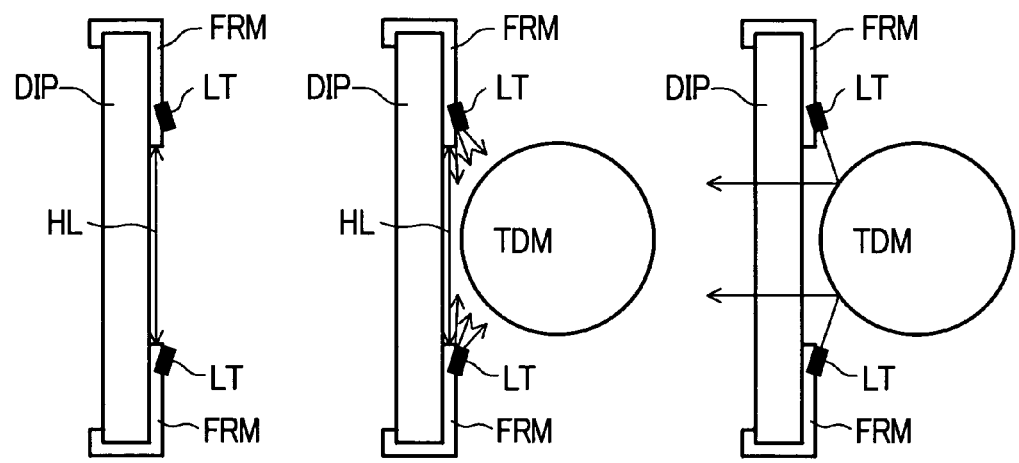
FIGS. 35A to 35G are diagrams showing another embodiment of the display device according to the present invention.

FIG. 35A shows another embodiment in which the display device DIP is arranged over the whole surface of the rotary drums TDM and the side surfaces of the rotary drums TDM are arranged at the back surface of the display device DIP. That is, this embodiment is configured such that portions of the rotary drums TDM which a player can observe through the display device DIP with naked eyes are illuminated by light sources LT.

The light sources LT are respectively provided at upper and lower portions of a visible region of the rotary drums TDM of the display device DIP, for example. A light irradiation angle has a fixed elevation angle and, as shown in FIG. 35B, light is irradiated to the side surfaces of the rotary drums TDM.

The reason only the optical transmissivity of the visible region of the rotary drums TDM in the display device DIP is increased is to make pictures or patterns depicted on the side surfaces of the rotary drums TDM arranged at the back surface of the display device DIP more visible. Accordingly, by illuminating and brightening the rotary drums TDM using the light sources LT, it is possible, as shown in FIG. 35C, to obtain an advantageous effect that the player can explicitly recognize the pictures or patterns.

In this case, it is needless to say that along with the provision of the light sources LT, the display device DIP may also have the constitution which, as described in the previous embodiment, can enhance the high resolution in the visible region of the rotary drums TDM.

Figures 35D, 35E, 35F, 35G:
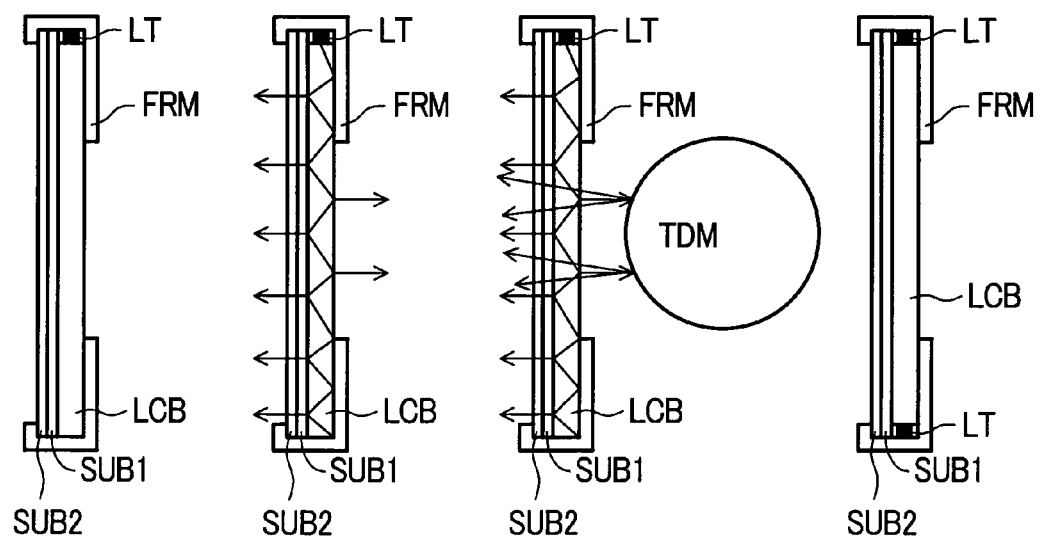

FIG. 35D shows a modification of this embodiment. That is, in the display device DIP, a light guide plate LCB is arranged at a back surface of the display panel PNL and a frame FRM which forms the light guide plate LCB and the display panel PNL into a module is provided at a back surface of the light guide plate LCB, wherein a portion of the frame FRM which corresponds to the visible regions of the rotary drums TDM is cut out.

The light guide plate LCB has a light source LT at least one side surface thereof. As shown in FIG. 35E, the light from the light source LT is irradiated to the display panel PNL side through the light guide plate LCB and, at the same time, the light is irradiated to the outside through the cut out portion of the frame FRM.

In this case, the light which is irradiated to the outside through the cut out portion of the frame FRM can easily obtain the uniform illuminance. As shown in FIG. 35F, after uniformly irradiating the side surfaces of the rotary drums TDM which are arranged at the back surface of the frame FRM, the reflection light reaches the player through the cut out portion of the frame FRM, the light guide plate LCB and the display panel PNL. Accordingly, it is possible to have an advantageous effect that the pictures or patterns which are depicted on the side surfaces of the rotary drums TDM can be clearly recognized.

FIG. 35G shows a further improvement of the constitution shown in FIG. 35D, wherein the light sources LT which are arranged at the side wall surfaces of the light guide plate LCB are respectively arranged at upper and lower positions of the game machine.

By providing a pair of light sources LT which face each other in an opposed manner by way of the light guide plate LCB, a light quantity at a center portion of the light guide plate LCB can be increased and hence, even when the light is irradiated to the rotary drums TDM side, it is possible to obviate lowering of the light at the display panel PNL side.

Further, as shown in FIG. 35D, when the light source LT is formed at one side wall surface side of the light guide plate LCB, to uniformly propagate the light from the light source LT to another side of the light guide plate LCB, due to the presence of the cut out portion of the frame FRM in the midst of an optical path, the propagation efficiency of light is changed and hence, it is necessary to take the deliberation such as the arrangement of a reflection sheet on an upper surface of the light guide plate LCB whereby the designing becomes complicated. By providing the light source LT also at the opposing side of the light guide plate LCB as shown in FIG. 35G, the propagation of light from both directions are combined and hence, the light from the display device has little irregularities and becomes uniform in the plane. Further, it is also possible to have an advantageous effect that the designing can be performed simply and accurately.

Here, with respect to the constitutions illustrated in FIG. 35A to FIG. 35F, by providing the light sources at both sides of the light guide plate LCB, as shown in FIG. 35G, the above-mentioned advantageous effect can be achieved in combination with respective advantageous effects obtained by the respective constitutions.

Embodiment 29

FIG. 36A shows another embodiment which includes the light guide plate LCB on a back surface of the display panel PNL, wherein the light from the light guide plate LCB is irradiated through one region formed on the back surface of the light guide plate LCB.

That is, the reflection sheet RS is arranged at the back surface of the light guide plate LCB, that is, the side opposite to the display surface of the display device and the reflectance is made different between some regions and other regions of the reflection sheet RS.

As shown in FIG. 36B, with respect to the reflection sheet RS as viewed in plan view, a large number of scattered reflection points are indicted by black dots. The density of the reflection points is small in a region which allows the illumination of the back surface side and the density of the reflection points is large in a region which inhibits the illumination of the back surface side.

Due to such a constitution, the reflection sheet RS realizes the illumination of the back surface side in the region which allows the light irradiation to the back surface and, at the same time, performs a function of efficiently transmitting the reflection light from the game machine to the display surface side.

When the formation of the reflection portions on the reflection sheet RS can be realized by forming, for example, a white printed pattern or a molded light diffusion shape pattern on a surface of the reflection sheet RS.

In this case, the density of the reflection portions is made different between the region having the high reflectance and the region where having the low reflectance. However, it is needless to say that sizes of the reflection portions of the region having the high reflectance and the reflection portions of the region having the low reflectance may be made different from each other, wherein the total area of the respective reflection portions is made small in the region which allows the illumination of the back surface side and the total area of the respective reflection portions is made large in the region which inhibits the illumination of the back surface side.

Further, FIG. 36C shows another embodiment in which, in the same manner as described above, the light guide plate LCB is provided at the back surface of the display panel PNL, wherein the light from the light guide plate LCB is irradiated through some regions of the back surface of the light guide plate LCB.

In this embodiment, reflection sheets RS1, RS2 are arranged at front and back surfaces of the light guide plate LCB. The reflection sheet RS1 which is arranged at the back surface of the light guide plate LCB is shown in FIG. 36D and the reflection sheet RS2 which is arranged at the front surface of the light guide plate LCB is shown in FIG. 36E.

The reflection sheet RS1 shown in FIG. 36D has a function similar to the function explained in conjunction with FIG. 36B, the reflection sheet RS2 shown in FIG. 36E has the larger density of reflection portions in the region which allows the illumination of the back surface side than other regions.

Then, in the regions except for the region which allows the illumination of the back surface side, the density of the reflection portions formed on the reflection sheet RS1 on the back surface of the light guide plate LCB is set larger than the density of the reflection portions formed on the reflection sheet RS2 on the front surface of the light guide plate LCB. Due to such a constitution, the propagation of the light in the inside of the light guide plate LCB can be conducted efficiently.

Further, in the region which allows the illumination of the back surface side, the density of the reflection portions formed on the reflection sheet RS1 on the back surface of the light guide plate LCB is set smaller than the density of the reflection portions formed on the reflection sheet RS2 on the front surface of the light guide plate LCB. Due to such a constitution, it is possible to irradiate a large quantity of light to the back surface of the light guide plate LCB.

Also, in this case, it is needless to say that sizes of the reflection portions of the region having the high reflectance and the reflection portions of the region having the low reflectance may be made different from each other, wherein the total area of the respective reflection portions is made small in the region which allows the illumination of the back surface side and the total area of the respective reflection portions is made large in the region which inhibits the illumination of the back surface side.

In the cases shown in FIG. 36A and FIG. 36C, the above-mentioned provision is applied to the reflection sheet RS which constitutes a member different from the light guide plate LCB. However, the embodiment is not limited to such cases. For example, as shown in FIG. 36F, by forming an uneven surface on one surface of the light guide plate LCB corresponding to the reflection portions or, as shown in FIG. 36G, by forming an uneven surface on the respective surfaces of the light guide plate LCB corresponding to the reflection portions, it is possible to obtain the substantially equal advantageous effects. In this case, by forming the uneven surface on the light guide plate LCB, it is possible to impart the light scattering property and the light reflection property to the light guide plate LCB. Further, it is possible to make other members to perform the reflection function besides their original functions.

Embodiment 30

Figure 37A:
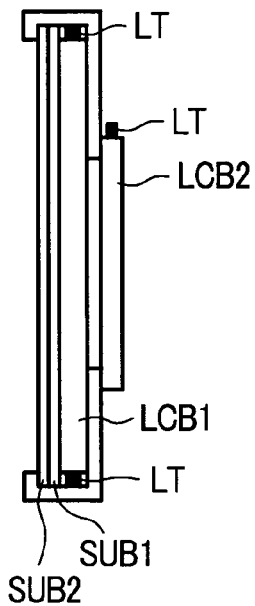
FIGS. 37A to 37F are diagrams showing another embodiment of the display device according to the present invention.

FIG. 37A shows another embodiment in which the light guide plate LCB is provided at the back surface of the display panel PNL and the light from the light guide plate LCB is irradiated through some regions of the back surface of the light guide plate LCB.

That is, the light guide plate LCB is constituted of a first light guide plate LCB1 which is used for irradiating the light to the display panel PNL side and a second light guide plate LCB2 which is served for irradiating the light to the side opposite to the display panel PNL.

Further, the display panel PNL and the light guide plate LCB are formed into a module using a frame FRM which is arranged at the back surface of the light guide plate LCB and a cutout portion is formed at a portion of the frame FRM which faces the rotary drums TDM not shown in the drawing in an opposed manner.

Then, the second light guide plate LCB2 is mounted on the frame FRM such that the second light guide plate LCB2 covers the cutout portion of the frame FRM.

Figure 37B:
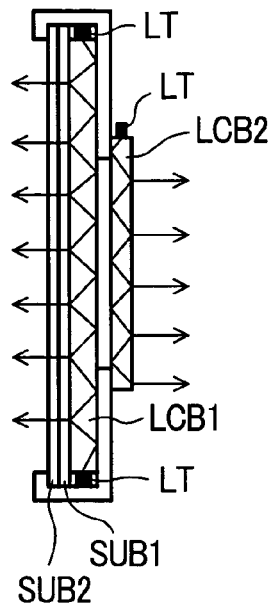

The light sources LT are respectively provided to the first light guide plate LCB1 and the second light guide plate LCB2. As shown in FIG. 37B, from the light sources LT provided to the first light guide plate LCB1, the light is irradiated to the display panel PNL side through the first light guide plate LCB1, while from the light source LT provided to the second light guide plate LCB2, the light is irradiated to the rotary drum TDM side not shown in the drawing through the second light guide plate LCB2.

Figure 37C:
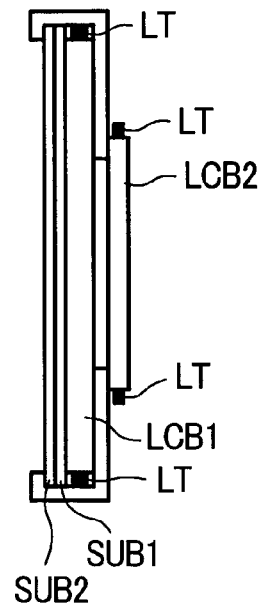

While FIG. 37A shows the constitution in which one light source LT is provided to the second light guide plate LCB2, FIG. 37C shows the constitution in which two light sources LT are provided to the second light guide plate LCB2 in a state that these light sources LT are arranged to face each other in an opposed manner with the second light guide plate LCB2 therebetween.

In this manner, by increasing the number of the light sources LT or the brightness of the second light guide plate LCB2, it is possible to selectively increase the light for irradiating light to the back surface apart from the light to the display panel PNL side.

Here, a portion of the light from the second light guide plate LCB2 passes to the display panel PNL side and some portions of the display panel PNL become bright in appearance. However, such a region is a region through which the player observes the rotary drums TDM, that is, an interest region to which the player focuses his attention during the game and hence, there arises no practical drawback with respect to a phenomenon that the region becomes further brighter than other regions.

Figure 37D:
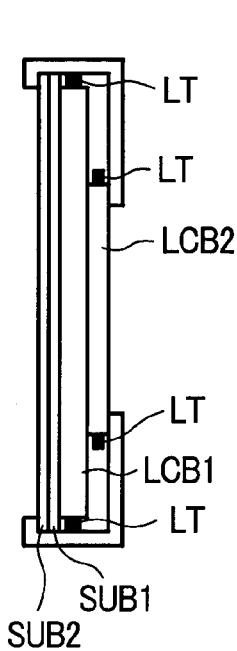
Figure 37E:
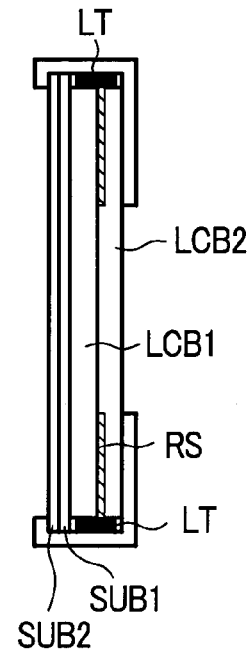

FIG. 37D shows a constitution in which the display panel PNL having the first light guide plate LCB1 and the second light guide plate LCB2 is formed into a module. FIG. 37A shows the constitution in which the display panel PNL, the first light guide plate LCB1 and the second light guide plate LCB2 are covered with the frame FRM and hence, the second light guide plate LCB2 is formed in a size which is sufficient to allow the observation of the rotary drums TDM with naked eyes. In FIG. 37E, although the second light guide plate LCB2 is also formed into the module by the frame FRM, the second light guide plate LCB2 has the substantially same size as the first light guide plate LCB1. Due to such a constitution, the light sources LT are used in common by the first light guide plate LCB1 and the second light guide plate LCB2. To the contrary, in FIG. 37F, the light sources LT for the first light guide plate LCB1 and the light sources LT for the second light guide plate LCB2 are constituted separately.

Figure 37F:
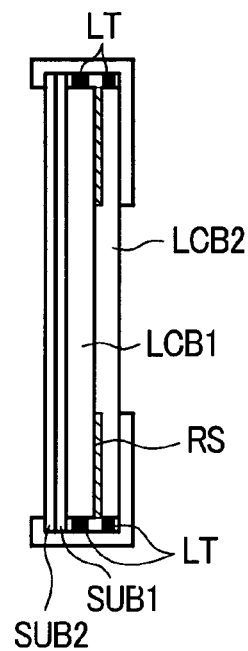

Here, with respect to the constitutions shown in FIG. 37E and FIG. 37F, to effectively introduce the light to the back surface side, it is preferable to provide a light reflection layer RS in regions between the first light guide plate LCB1 and the second light guide plate LCB2 except for the back surface irradiation region.

Further, the light reflection layer RS may be formed as a reflection sheet or a surface shape of the light guide plates LCB may be formed in a desired shape by any desired forming.

Embodiment 31

FIGS. 38A to 38E show a constitution in which side outside surfaces of the respective rotary drums TDM can be observed with the naked eye through the light transmitting portion of the liquid crystal display panel PNL, for example, and, at the same time, attention attracting marks or the like are displayed on the liquid crystal display panel PNL at the light transmitting portion so that lucky numbers or the like of the rotary drums TDM can be easily recognized.

Figure 38A:
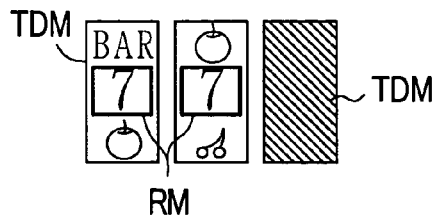
FIGS. 38A to 38F are diagrams showing one embodiment of a display mode of the display device according to the present invention.
Figure 38B:
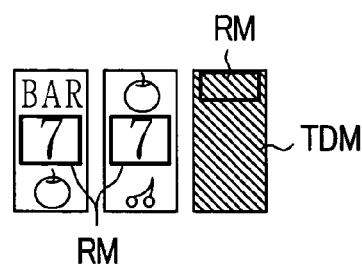
Figure 38C:
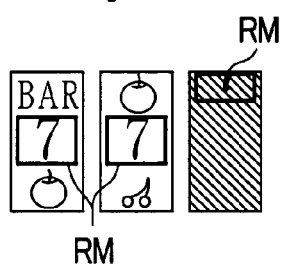
Figure 38D:
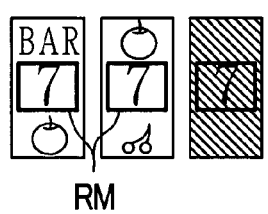
Figure 38E:
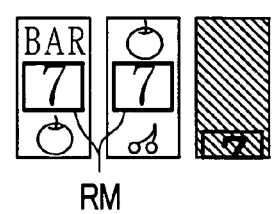

In FIG. 38A, for example, among three rotary drums TDM, two left rotary drums TDM are already stopped and, at the same time, both of two rotary drums TDM show the lucky numbers of "7". The remaining one rotary drum TDM is ready for stopping but still is continuously rotated.

In this case, the lucky number "7" on the rotary drums TDM is a mark to be watched carefully by the player and hence, on the liquid crystal display panel PNL, for example, frame bodies RM which surround the number are displayed.

On the other hand, also with respect to the rotary drum TDM which is still rotated, the player wishes that the lucky number "7" will be displayed on the rotary drum TDM and hence, as shown in FIG. 38B to FIG. 38E, the frame body RM which surrounds the number is displayed along with the rotation of the rotary drum TDM on the liquid crystal display panel PNL so that the course of movement of the lucky number "7" on the rotary drum TDM can be easily observed with naked eyes.

Figure 38F:
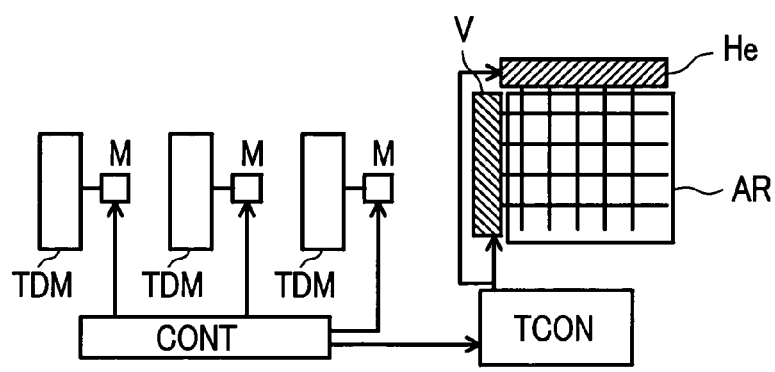

FIG. 38F is a view showing the constitution in which the above-mentioned display (frame bodies RM which surround the number, for example) on the liquid crystal display panels PNL is performed in response to signals obtained from motors (stepping motors) which rotate the respective rotary drums TDM.

As shown in FIG. 38F, the rotations including the rotational positions of the respective motors M which rotate the respective rotary drums TDM are controlled by a controller CONT disposed in the inside of the game machine. Further, the rotational positions are also detected by the controller CONT.

In other words, with respect to each rotary drum TDM, even when the rotary drum TDM is rotating, the controller CONT can always recognize the position of the lucky number "7" and make the controller CONT output the information of the position to the controller TCON of the liquid crystal display panel PNL.

The liquid crystal display panel PNL is configured to perform the display such that, in the predetermined region (region where the rotary drum TDM can be observed with naked eyes) of the display region AR, in response to the information from the controller CONT, the frame bodies RM move in such a manner that the frame bodies RM follow the rotation of the rotary drums TDM and face the lucky number "7" in an opposed manner.

Accordingly, the amusement of the game machine can be considerably enhanced.

Embodiment 32

FIGS. 39A to 39F show another embodiment of the constitution in which the outside surfaces of the respective rotary drums TDM can be observed with the naked eye through the light transmitting portion of the liquid crystal display panel PNL, for example, and, at the same time, the attention marks or the like are displayed on the liquid crystal display panel PNL at the light transmitting portion.

Figure 39A:
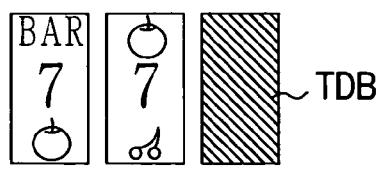

In FIG. 39A, for example, among three rotary drums TDM, two left rotary drums TDM are already stopped and, at the same time, the lucky numbers of both rotary drums TDM are set to "7". One remaining rotary drum TDM is ready for stopping but is still continuously rotated.

In this case, the display of the liquid crystal display panel PNL is performed such that a specified color is applied to the whole region where one remaining rotary drum TDM on the liquid crystal display panel PNL is visible. This provision can make a player recognize that he is now in an almost luckiness obtainable state by the display of the specified color and hence, the excitement of the player is enhanced.

Figure 39B:
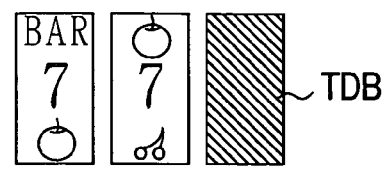

Although FIG. 39B shows substantially the same constitution as the constitution shown in FIG. 39A, FIG. 39B is constituted such that, in place of the above-mentioned colored portion, a change of mode of the game is displayed by blinking. As means for generating the blinking state, a method which time-sequentially changes the color or a method which changes the brightness while holding the same color are adopted.

Figure 39C:
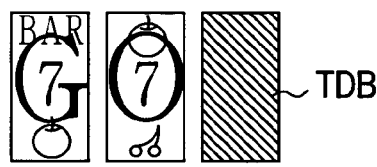
FIG. 39C is a schematic diagram showing another embodiment of the display device according to the present invention.
Figure 39D:
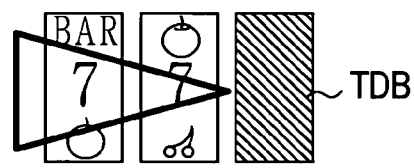
Figure 39E:
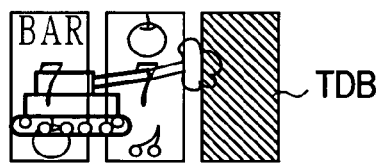

Further, FIG. 39C shows the constitution in which, when the player is in the almost luckiness obtainable state as explained above, an image (for example, letters) is displayed on the liquid crystal display panel PNL in such a manner that the image overlaps the upper surfaces of at least already stopped rotary drums TDM. Further, FIG. 39D shows the constitution in which line drawings or symbols are displayed as the above-mentioned image. Further, FIG. 39E shows the constitution in which a vehicle is displayed as the image. Other images, such as numbers, animals, men, designed characters appearing in stories or the like may be used. Further, the image is not limited to a still picture and may be a motion picture.

Figure 39F:
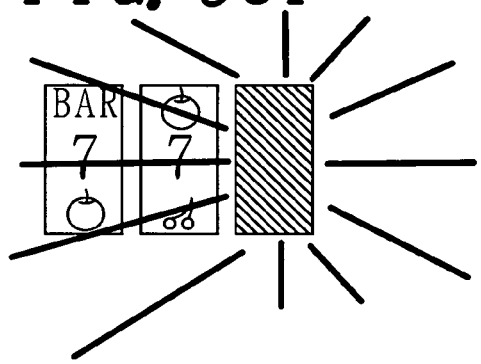

Further, FIG. 39F also shows that the player is in possibly lucky state and, the liquid crystal display panel PNL displays a large number of line drawings which extend radially in a state that the line drawings overlap the still rotating remaining rotary drum TDM.

Embodiment 33

Figure 40A:
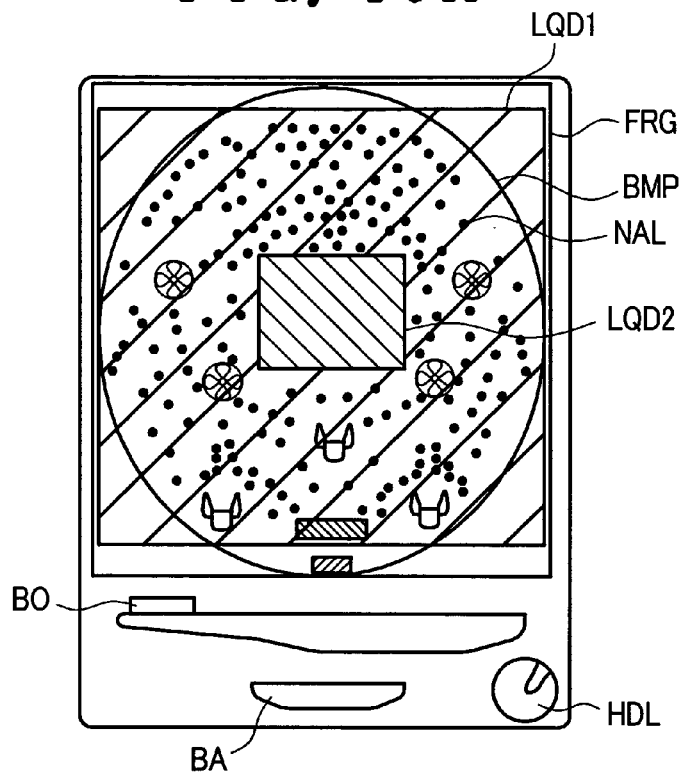
FIG. 40A is a front plan view and FIGS. 40B to 40D are diagrams showing another embodiment of the pachinko game machine according to the present invention.

FIG. 40A is a view which shows another embodiment of the pachinko game machine according to the present invention and corresponds to FIG. 1.

Substantially in the same manner as the constitution shown in FIG. 1, a display device is arranged on most of or the whole region of a range in which the pachinko balls can move and a large number of scattered nails NAL are driven in the region except for a center portion thereof.

Here, the constitution shown in FIG. 40A differs from the constitution shown FIG. 1 in that another display device different from the above-mentioned liquid crystal display device is arranged in the region of the center portion where the nails are not driven. Accordingly, in this embodiment, as one example which uses liquid crystal display devices as these display devices, the former display device is referred to as the first liquid crystal display device LQD1 and the latter display device is referred to as the second liquid crystal display device LQD2.

Due to such a constitution, it is possible to make the first liquid crystal display device LQD1 and the second liquid crystal display device LQD2 have functions independent from each other and hence, the first liquid crystal display device LQD1 and the second liquid crystal display device LQD2 can perform displays suitable for the respective regions where they are arranged.

Figure 40B:
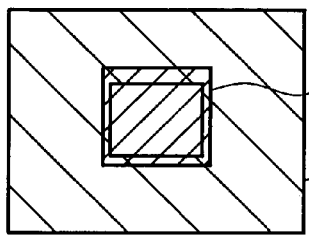
Figure 40C:
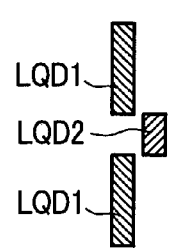

FIG. 40B is a plan view showing the positional relationship between the first liquid crystal display device LQD1 and the second liquid crystal display device LQD2. A hole HL is formed in the first liquid crystal display device LQD1 which is arranged at the player side, while the second liquid crystal display device LQD2 is arranged at a back surface of the first liquid crystal display device LQD1. Further, a center axis of the second liquid crystal display device LQD2 is substantially aligned with a center axis of the hole HL formed in the first liquid crystal display device LQD1 and a periphery of the second liquid crystal display device LQD2 is overlapped to the first liquid crystal display device LQD1 at a periphery of the hole HL. Here, FIG. 40C is a cross-sectional view taken along a line c-c in FIG. 40B.

Figure 40D:
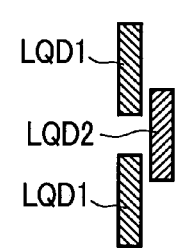

Further, in this case, as shown in FIG. 40D, it is needless to say that a size of the second liquid crystal display device LQD2 may be substantially same as a size of the hole HL formed in the first liquid crystal display device LQD1.

Here, it is needless to say that the fore-and-aft relationship of the arrangement between this first liquid crystal display device LQD1 and the second liquid crystal display device LQD2 is not limited to the above-mentioned constitution and the second liquid crystal display device LQD2 may be arranged in front of the first liquid crystal display device LQD1 as viewed from the player side.

Embodiment 34

Figure 41A:
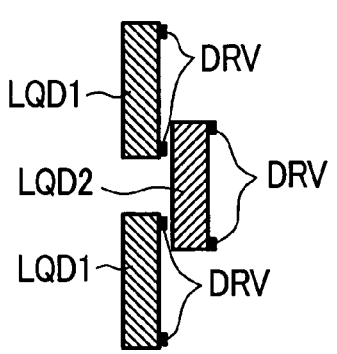
FIGS. 41A to 41E are cross-sectional views showing another embodiment of the display device according to the present invention.

FIG. 41A is a view showing the constitution in which, for example, when the first liquid crystal display panel PNL1 and the second liquid crystal display panel PNL2 are arranged as shown in FIG. 40C, liquid crystal drive circuits are mounted on the respective liquid crystal display panels PNL.

In this case, the player observes from the right side in the drawing and the first liquid crystal display panel PNL1 is arranged at the back surface of the second liquid crystal display panel PNL2 and, at the same time, the liquid crystal drive circuits DRV of the first liquid crystal display panel PNL1 are formed on the surface of the first liquid crystal display panel PNL1 at the second liquid crystal display panel PNL2 side, while the liquid crystal drive circuits DRV of the second liquid crystal display panel PNL2 are formed on a surface of the second liquid crystal display panel PNL2 at the side opposite to the first liquid crystal display panel PNL1 side.

Due to such a constitution, at least signal lines which transmit signals to the liquid crystal drive circuit DRV of the second liquid crystal display panel PNL2 can be arranged through the hole HL which is formed in the first liquid crystal display panel PNL1 and hence, the signal line can be arranged such that the player can hardly observe the signal lines with his naked eyes. In other words, the signal lines can be pulled around from the back surface side of the first liquid crystal display panel PNL1 through the hole HL which is formed in the first liquid crystal display panel PNL1 and can be connected to the liquid crystal drive circuit DRV of the second liquid crystal display panel PNL2.

In the same manner, with respect to the constitution which the player observes from the left side in the drawing, at least signal lines which transmit signals to the liquid crystal drive circuits DRV of the first liquid crystal display panel PNL1 can be arranged through the hole HL which is formed in the second liquid crystal display panel PNL2 and the signal lines can be arranged such that the player can hardly observe the signal lines with the naked eye.

When the liquid crystal drive circuits DRV are mounted in the periphery of the hole HL of the first liquid crystal display panel PNL1, the signal lines which transmits signals to the liquid crystal drive circuit DRV are also arranged through the hole HL which is formed in the first liquid crystal display panel PNL1.

Figure 41B:
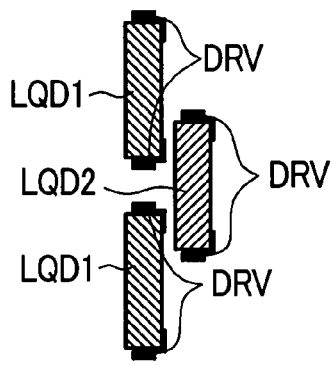

FIG. 41B shows a modification of the constitution shown in FIG. 41A. That is, FIG. 41B shows that a semiconductor device which is formed by a so-called film carrier method is used as the liquid crystal drive circuits DRV. Here, the film-carrier type semiconductor device indicates a semiconductor device in which a semiconductor chip is mounted on a flexible board and respective bumps of the semiconductor chips are pulled out to respective opposing sides of the flexible board through wiring layers formed on the flexible board.

In this manner, by using the film carrier type semiconductor devices as the liquid crystal drive circuits DRV, the semiconductor devices can be respectively bent and arranged to face the side surface of the liquid crystal display panel PNL and input terminals of the semiconductor devices can be directed to the back surface side of the first liquid crystal display panel PNL1. Accordingly, the pull-around wiring of the signal lines can be facilitated.

Figure 41C:
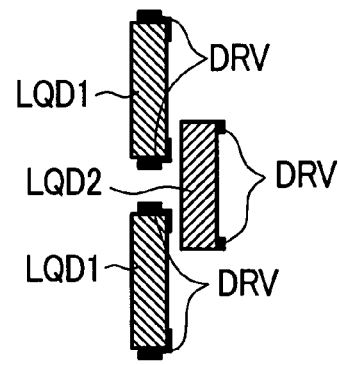

FIG. 41C is a hybrid of the constitution shown in FIG. 41A and the constitution shown in FIG. 41B. The liquid crystal drive circuits DRV of the second liquid crystal display panel PNL2 are constituted of a circuit which uses MIS (Metal Insulator Semiconductor) transistors which are directly formed on a substrate surface of the second liquid crystal display panel PNL2 or the like as main parts. A semiconductor layer of the MIS transistor may be formed of polysilicon (p-Si) which is formed at a low temperature, for example.

In this case, semiconductor layers of thin film transistors which are respectively formed on respective pixels of the second liquid crystal display panel PNL2 are also usually formed of polysilicon (p-Si).

In the first liquid crystal display panel PNL1, semiconductor layers of the respective thin film transistors which are formed on the respective pixels thereof are formed of amorphous silicon (a-Si).

Due to such a constitution, the resolution of the second liquid crystal display panel PNL2 can be set larger than the resolution of the first liquid crystal display panel PNL1 and hence, a cost for manufacturing the first liquid crystal display panel PNL1 can be reduced.

Figure 41D:
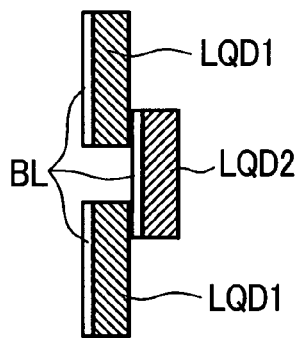

FIG. 41D is a view showing a constitution in which, for example, when the first liquid crystal display panel PNL1 and the second liquid crystal display panel PNL2 are arranged as shown in FIG. 41A, the respective display panels PNL are provided with different backlights BL. In other words, FIG. 41D shows the constitution which can control the brightness of the backlight BL at the first liquid crystal display panel PNL1 and the brightness of the backlight BL at the second liquid crystal display panel PNL2 independently from each other.

With this constitution, when it is necessary to increase the brightness of the display at the second liquid crystal display panel PNL2 than the brightness of the display at the first liquid crystal display panel PNL1, the brightness of the display at the second liquid crystal display panel PNL2 can be easily increased. That is, the region of the second liquid crystal display panel PNL2 is a region where the player pays a special attention during the game. By increasing the brightness of the region, versatile expressions including an intentional modulation of brightness becomes possible and hence, the amusement property of the game can be enhanced.

Figure 41E:
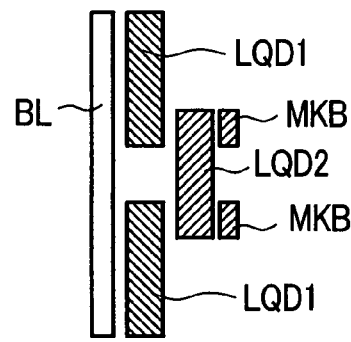

Further, the backlights BL of the respective liquid crystal display panels PNL may not be formed on the respective liquid crystal display panel PNL. That is, as shown in FIG. 41E, for example, by arranging a backlight BL on the back surface of the first liquid crystal display panel PNL1 and by making backlight BL exhibit a function thereof with respect to a portion which faces the hole HL formed in the first liquid crystal display panel PNL1, the light from the backlight BL can be transmitted also to the second liquid crystal display panel PNL2.

In this case, at a portion where the first liquid crystal display panel PNL1 and the second liquid crystal display panel PNL2 are overlapped to each other, light from the backlight is attenuated and hence, it is desirable to form an ornamental region at this portion.

The ornamental region may be constituted of a light shielding layer which is formed in the inside of the liquid crystal display panel PNL (liquid crystal side surface of one substrate out of respective substrates which are arranged to face each other in an opposed manner with liquid crystal therebetween).

Further, printing or parts may be applied to an outer portion of the liquid crystal display panel PNL (surface opposite to liquid-crystal-side surface of one of respective substrates which are arranged to face each other in an opposed manner with liquid crystal therebetween). Further, on the upper surface of the liquid crystal display panel PNL, an ornamental member MKB may be arranged in such a manner that the ornamental member MKB overlaps the upper surface of the liquid crystal display panel PNL.

Embodiment 35

Figure 42A:
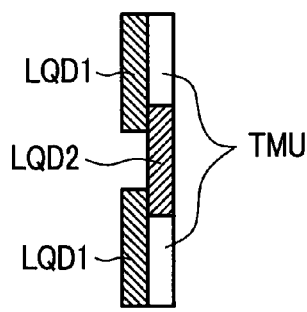
FIGS. 42A to 42H are cross-sectional views showing another embodiment of the display device according to the present invention.

FIG. 42A is a view showing a constitution in which, in the arrangement of the second liquid crystal display panel PNL2 and the first liquid crystal display panel PNL1 with which the second liquid crystal display panel PNL2 is arranged in front of a player, a transparent ornamental plate TMU is arranged on the upper surface of the first liquid crystal display panel PNL1 in a state that a transparent ornamental plate TMU surrounds the second liquid crystal display panel PNL2 having a small area.

In such a constitution, a hole is formed in the transparent ornamental plate TMU at the portion where the second liquid crystal display panel PNL2 is arranged and a player side surface of the transparent ornamental plate TMU and a player side surface of the second liquid crystal display panel PNL2 are made substantially coplanar.

Here, in such a constitution, it is needless to say that the first liquid crystal display panel PNL1, the second liquid crystal display panel PNL2 and the transparent ornamental plate TMU may be formed into a module.

Due to such a constitution, a surface on which the pachinko balls move can be leveled and, at the same time, the transparent ornamental plate TMU functions as a protective plate which protects the first liquid crystal display panel PNL1 from damages.

Figure 42B:
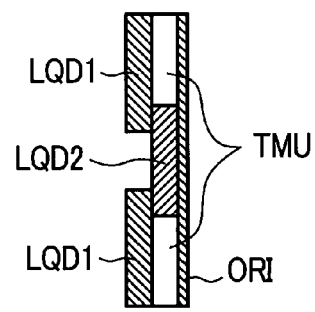

FIG. 42B shows a constitution in which, in the constitution shown in FIG. 42A, a polarizer ORI is formed on a surface of the transparent ornamental plate TMU and a surface of the second liquid crystal display panel PNL2. Not to mention that this polarizer ORI functions as a polarizer for the second liquid crystal display panel PNL2, the polarizer ORI also functions as a polarizer ORI for the first liquid crystal display panel PNL1.

Due to such a constitution, a connecting portion between the transparent ornamental plate TMU and the second liquid crystal display panel PNL2 can be made smooth and the influence of the light scattering at the connecting portion can be decreased.

Figure 42C:
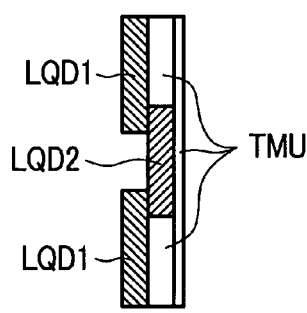

FIG. 42C shows a constitution which can obtain the above-mentioned advantageous effect by using a second transparent ornamental plate TMU in place of the polarizer ORI shown in FIG. 42B.

In this case, the respective polarizers for the first liquid crystal display panel PNL1 and the second liquid crystal display panel PNL2 are not shown in the drawing. However, the polarizers are formed on surfaces of the first liquid crystal display panel PNL1 and the second liquid crystal display panel PNL2.

Figure 42D:
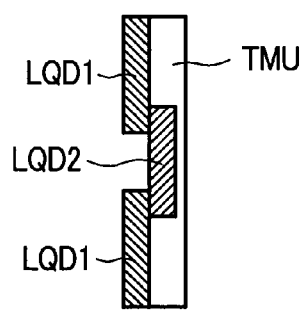

FIG. 42D is a view showing a constitution in which, as the first transparent ornamental plate TMU and the second transparent ornamental plate TMU shown in FIG. 42C, the first transparent ornamental plate TMU and the second transparent ornamental plate TMU are used in a state that these ornamental plates are integrally formed with each other.

Figure 42E:
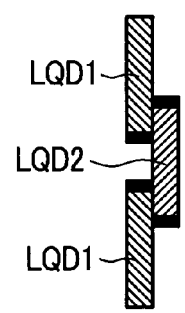

FIG. 42E is a view showing a constitution in which, the second liquid crystal display panel PNL2 is arranged on the player side surface of the first liquid crystal display panel PNL1 in which a hole is formed in a state that the second liquid crystal display panel PNL2 closes the hole. Further, coloring is applied to at least a side wall surface of the hole formed in the first liquid crystal display panel PNL1 and a side wall surface of the second liquid crystal display panel PNL2.

This constitution is provided for eliminating a drawback that scattering of light from the side wall surface of the hole formed in the first liquid crystal display panel PNL1 is observed by a player through the second liquid crystal display panel PNL2 and a drawback that scattering of light from the side wall surface of the second liquid crystal display panel PNL2 makes images on the display surface of the first liquid crystal display panel PNL1 difficult to be observed.

Figure 42F:
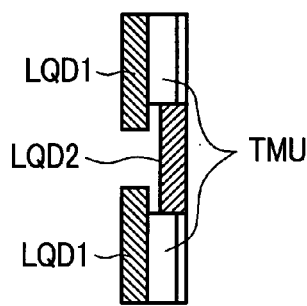

FIG. 42F is a view showing a constitution in which the second liquid crystal display panel PNL2 is arranged on the player side surface of the first liquid crystal display panel PNL1 in which a hole is formed in a state that the second liquid crystal display panel PNL2 closes the hole. Further, the transparent ornamental plate TMU having a multilayered structure is arranged outside the second liquid crystal display panel PNL2 and on the upper surface of the first liquid crystal display panel PNL1.

The transparent ornamental plate TMU is formed such that an upper layer thereof at the player side surface is soft and a lower layer thereof is hard.

Figure 42G:
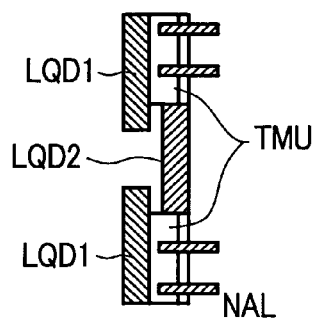

With such a constitution, as shown in FIG. 42G, it is possible to obtain an advantageous effect in that when the nails NAL are driven into the transparent ornamental plate TMU, for example, both the easiness of driving nails NAL and the stability of the nails NAL can be ensured.

Figure 42H:
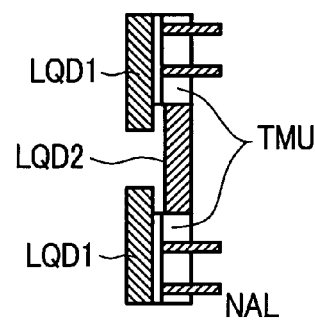

With respect to the constitution shown in FIG. 42G, the thickness of the upper layer of the transparent ornamental plate TMU is set smaller than the thickness of the lower layer of the transparent ornamental plate TMU. However, as shown in FIG. 42H, it is needless to say that the thickness of the upper layer may be set larger than the thickness of the lower layer.

Embodiment 36

Figures 43A, 43B:
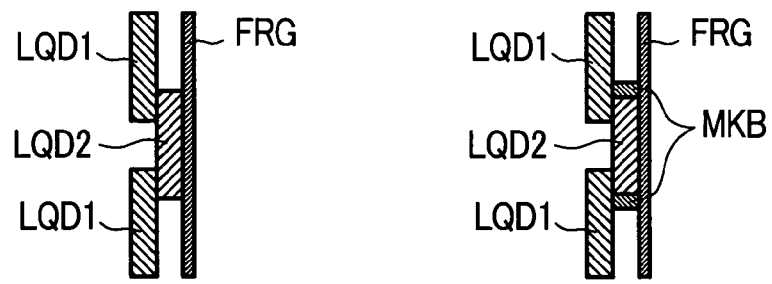
FIGS. 43A and 43B are cross-sectional views showing another embodiment of the display device according to the present invention and FIG. 43C is a front plan view showing another embodiment of the pachinko game machine.

FIG. 43A is a view showing the constitution of a pachinko game machine in which the second liquid crystal display device LQD2 is arranged on the player side surface of the first liquid crystal display device LQD1 in which a hole is formed in a state that the second liquid crystal display device LQD2 closes the hole. Further, a glass plate of a glass door portion FRG of the pachinko game machine and the second liquid crystal display device LQD2 define a slight gap therebetween and, at the same time, the first liquid crystal display device LQD1 and the glass plate have the positional relationship which defines a gap therebetween which is enough for pachinko balls to move therethrough.

Accordingly, the thickness of the second liquid crystal display device LQD2 is set substantially equal or larger than the diameter of the pachinko ball.

FIG. 43B is a view showing a constitution in which, in the constitution of FIG. 43A, an ornamental member MKB is arranged on an outer side surface of the second liquid crystal display device LQD2 to an extent that the ornamental member MKB comes into contact with the second liquid crystal display device LQD2.

Figure 43C:
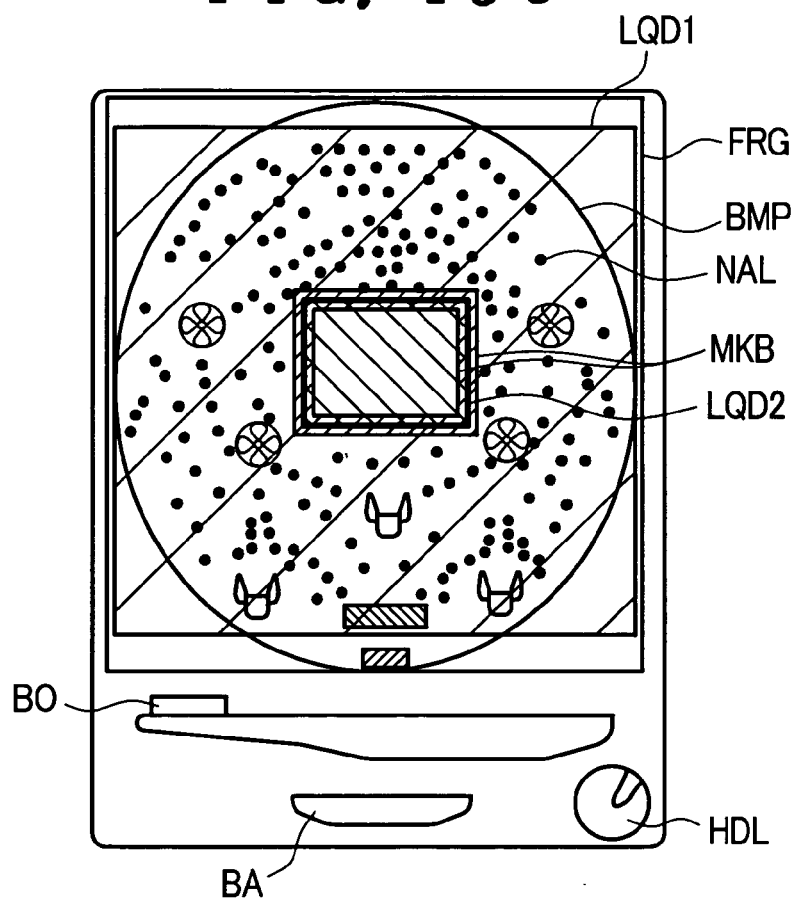

In the pachinko game machine having the liquid crystal display devices LQD shown in FIG. 43B, as shown in FIG. 43C, the ornamental member MKB is observed with naked eyes and hence, a player can enjoy image displays inside and outside a frame of the ornamental member MKB respectively.

Embodiment 37

Figure 44A:
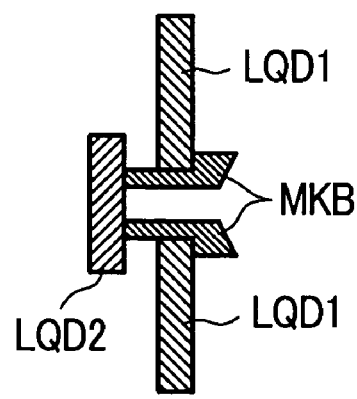
FIGS. 44A and 44B are cross-sectional views showing another embodiment of the display device according to the present invention.

FIG. 44A is a view showing the constitution of a pachinko game machine in which the second liquid crystal display device LQD2 is arranged on the back surface (as viewed from the player side) of the first liquid crystal display device LQD1 in which a hole is formed in a state that the second liquid crystal display device LQD2 closes the hole. Further, the second liquid crystal display device LQD2 is fixed to the first liquid crystal display device LQD1 by way of an ornamental member MKB.

The ornamental member MKB is formed in a periphery of the hole formed in the first liquid crystal display device LQD1 and an extended portion of the ornamental member MKB is fixed to a display surface side of the second liquid crystal display device LQD2 such that the extended portion comes into contact with a side wall surface of the hole.

Accordingly, the distance in the depth direction of the second liquid crystal display device LQD2 with respect to the first liquid crystal display device LQD1 can be arbitrarily set based on a shape of the ornamental member MKB.

Figure 44B:
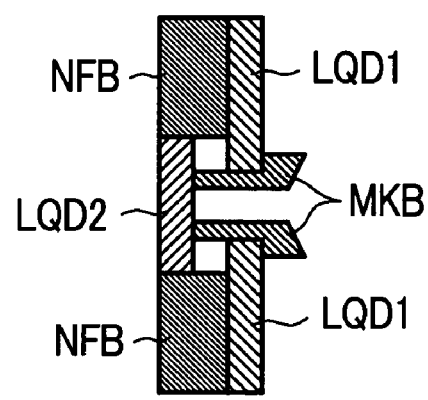

FIG. 44B shows a constitution in which, in the constitution shown in FIG. 44A, a nail fixing member NFB is arranged on the back surface of the first liquid crystal display device LQD1 and the second liquid crystal display device LQD2 is arranged in a hole formed in the nail fixing member NFB.

Due to such a constitution, by setting the back surface of the nail fixing member NFB and the back surface of the second liquid crystal display device coplanar, it is possible to obtain an advantageous effect that the nail fixing member NFB and the second liquid crystal display device LQD2 can be easily formed into a module.

Embodiment 38

In driving the nails NAL in the display portion of the liquid crystal display device LQD in the pachinko game machine, it is necessary to clearly determine driving positions thereof. Therefore, marks are necessary as references for driving the nails NAL in the liquid crystal display device LQD at proper positions.

In this embodiment, alignment marks which are necessary for assembling the members during a manufacturing process of the liquid crystal display device LQD are also used as the above-mentioned marks.

Figure 45A:
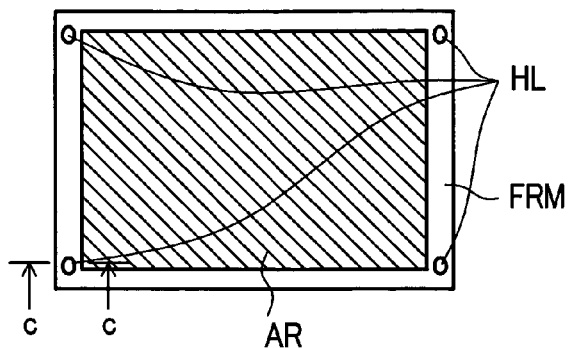
FIGS. 45A to 45F are diagrams showing another embodiment of the display device according to the present invention.
Figure 45B:
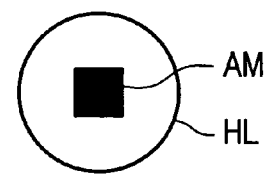

FIG. 45A shows a plan view of the liquid crystal display device LQD which is formed into a module by the frame FRM as viewed from the display surface side thereof. The drawing also shows the constitution in which, through holes HL formed in the frame FRM, the alignment marks AM formed on the liquid crystal display panel PNL which is incorporated into the back surface of the frame FRM can be observed with naked eyes as shown in FIG. 45B.

Although the alignment marks AM are formed at four corners of the liquid crystal display device LQD, it is desirable that at least a pair of alignment marks is provided. This is because that the accuracy of alignment must be ensured two-dimensionally.

Due to such a constitution, with respect to the liquid crystal display panel PNL, using the alignment marks AM as references, portions where the respective pixels and nails NAL are driven are also formed and hence, the positions where the nails NAL are driven can be accurately decided using the alignment marks as references.

Figure 45C:
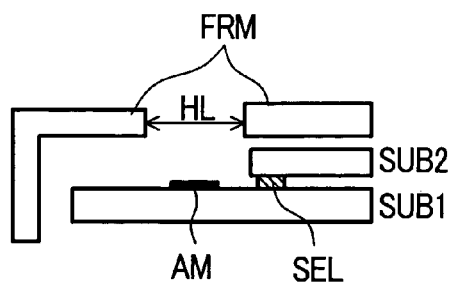

FIG. 45C shows a cross-sectional view taken along a line b-b of FIG. 45A and the hole HL is formed in the frame FRM at a center axis of the alignment mark AM which is formed on the liquid crystal display panel PNL and a diameter of the hole HL is set larger than a diameter of the alignment mark AM.

Here, the alignment marks AM are utilized by a client when a considerably long time has passed after the completion of the liquid crystal display device LQD and hence, it is necessary to take special deliberation on the reliability thereof.

Figure 45D:
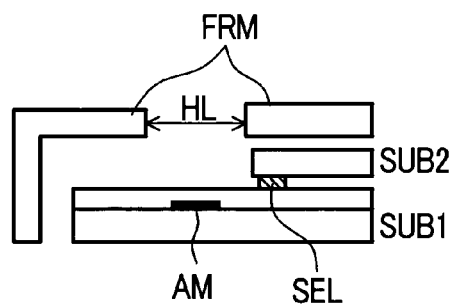

Accordingly, FIG. 45D is a view of another embodiment showing the constitution in which, the alignment mark AM used in the constitution shown in FIG. 45C is covered with a protective film PAS. The protective film PAS is formed by extending the protective film PAS which is used for protecting the display region AR.

Figure 45E:
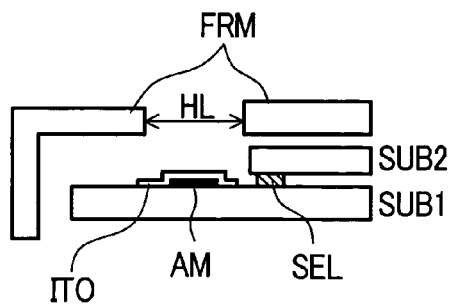

Further, FIG. 45E is a view of another embodiment showing the constitution in which, the alignment mark AM used in the constitution of FIG. 45C is covered with a transparent conductive film ITO. Since the transparent conductive film ITO is a material which is difficult to be oxidized, the transparent conductive film ITO can sufficiently protect the alignment mark AM from oxidization.

Figure 45F:
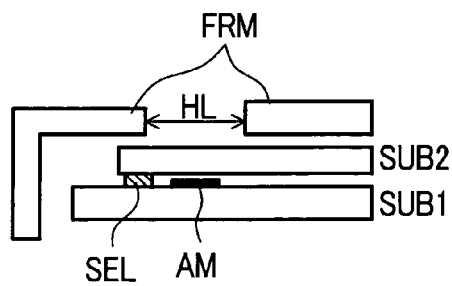

Further, FIG. 45F differs from FIG. 45C with respect to the constitution in that the alignment marks AM are formed within the display region AR. Since the alignment marks AM are arranged in the liquid crystal display panel PNL in which liquid crystal is filled, there is no possibility that the alignment marks AM are peeled off or the like attributed to external factors.

Here, this embodiment can be applied not only to the game machine but also to the liquid crystal display device which requires the realization of efficient adjustment after completion of the liquid crystal display device. For example, this embodiment is applicable to a case that short-circuiting occurs during an electricity supply test before shipping and a normal operation is to be restored by separating a short-circuited part using a laser. In this manner, a yielding rate can be enhanced.

It is needless to say that the respective embodiments which have been explained heretofore may be used in a single form or used in combination with other embodiments in the above-mentioned game machine.

Further, although, as the display device, the liquid crystal display device has been mainly described as an example, even when the present invention is applied to other display device such as, for example, an organic or inorganic EL display device, a field emission type display device (FED) or the like in place of the liquid crystal display device, such an application falls within a scope of the present invention so long as the application conforms to the present invention.

As can be clearly understood from the foregoing explanation, with the use of the display device or the game machine according to the present invention, the interest of the player can be further enhanced.

What is claimed is:

1. A display device comprising:
    a pair of substrates arranged to face each other in an opposed manner with a liquid crystal therebetween;
    a backlight having a light guide plate and a light source, the light source being arranged in a side wall of the light guide plate;
    a display region formed with a plurality of pixels;
    polarizers formed on surfaces of respective ones of the pair of substrates which are opposite the liquid crystal; and
    a high transmissivity region formed in a portion of the display region; and
    the portion of the display region corresponding to the high transmissivity region being a portion where no pixels are formed and having an area at least equal to an area which would be occupied by plural pixels of the plurality of pixels of the display region;
    wherein the light guide plate is cut out at a portion corresponding to the high transmissivity region.

2. A display device according to claim 1, wherein a polarization layer of at least one of the polarizers is cut out at a portion thereof corresponding to the high transmissivity region.

3. A display device according to claim 1, wherein color filters are formed on a liquid-crystal-side surface of one substrate of the pair of substrates, and a polarization layer of at least one of polarizers and the color filters are cut out at a portion corresponding to the high transmissivity region.

4. A display device according to claim 1, wherein color filters are formed on a liquid-crystal-side surface of one substrate of the pair of substrates, and the color filters are cut out at a portion corresponding to the high transmissivity region.

5. A display device according to claim 1, wherein at least one of polarizers at one portion corresponding to the high transmissivity region has a number of layers which is smaller than a number of layers of the polarizer in another portion thereof.

6. A display device according to claim 1, wherein the polarizers have UV light shielding layers which absorb an ultraviolet ray and allow visible light to pass therethrough in a portion which corresponds to the high transmissivity region.

7. A display device according to claim 6, wherein polarization layers of at least one of the polarizers at a portion thereof corresponding to the high transmissivity region are cut out.

8. A display device according to claim 5, wherein the display device includes color filters on the liquid-crystal-side surface of one substrate of the pair of substrates, and the color filters are cut out in the high transmissivity region.

* * * * *